United States Patent
Lee et al.

(10) Patent No.: US 7,526,741 B2
(45) Date of Patent: Apr. 28, 2009

(54) MICROFLUIDIC DESIGN AUTOMATION METHOD AND SYSTEM

(75) Inventors: Michael Lee, Lake Oswego, OR (US); Gajus Worthington, Portola Valley, CA (US); Gregory Harris, Longmont, CO (US); James Montgomery, Longmont, CO (US)

(73) Assignee: Fluidigm Corporation, South San Francisco, CA (US)

( * ) Notice: Subject to any disclaimer, the term of this patent is extended or adjusted under 35 U.S.C. 154(b) by 578 days.

(21) Appl. No.: 10/976,643

(22) Filed: Oct. 29, 2004

(65) Prior Publication Data

US 2005/0065735 A1 Mar. 24, 2005

Related U.S. Application Data

(62) Division of application No. 09/894,857, filed on Jun. 27, 2001, now Pat. No. 6,829,753.

(60) Provisional application No. 60/214,595, filed on Jun. 27, 2000.

(51) Int. Cl.
G06F 17/50 (2006.01)
G06F 7/60 (2006.01)
G06G 7/50 (2006.01)
G06G 7/57 (2006.01)

(52) U.S. Cl. ............... 716/5; 716/13; 703/2; 703/9; 703/16

(58) Field of Classification Search .............. 716/5, 716/13; 703/9, 16, 2
See application file for complete search history.

(56) References Cited

U.S. PATENT DOCUMENTS 2,656,508 A 10/1953 Coulter (Continued)

FOREIGN PATENT DOCUMENTS

EP 0 592 094 A2 4/1994

(Continued)

OTHER PUBLICATIONS

"Biochips," Nature Biotechnology, vol. 18, Supplement 2000, pp. IT43-IT44, 2000.

(Continued)

Primary Examiner—Phallaka Kik
(74) Attorney, Agent, or Firm—Townsend and Townsend and Crew LLP

(57) ABSTRACT

The present invention generally relates to microfluidics and more particularly to the design of customized microfluidic systems using a microfluidic computer aided design system. In one embodiment of the present invention a microfluidic circuit design method is provided. The method includes developing synthesizable computer code for a design. Next, a microfluidic circuit schematic, including a plurality of symbols for microfluidic components, is generated either interactively or using the synthesizable computer code. The microfluidic circuit schematic is then functionally simulated. The microfluidic components are placed and routed on a template to form a physical layout. Then the physical layout is physically simulated using dynamic simulation models of the microfluidic components; and the physical layout is written to a layout file.

23 Claims, 23 Drawing Sheets

U.S. PATENT DOCUMENTS

| | | |
|---|---|---|
| 3,570,515 A | 3/1971 | Kinner |
| 3,747,628 A | 7/1973 | Holster et al. |
| 3,839,176 A | 10/1974 | McCoy et al. |
| 3,915,652 A | 10/1975 | Natelson |
| 3,984,307 A | 10/1976 | Kamentsky et al. |
| 4,046,159 A | 9/1977 | Pegourie |
| 4,119,368 A | 10/1978 | Yamazaki |
| 4,153,855 A | 5/1979 | Feingold |
| 4,245,673 A | 1/1981 | Bouteille et al. |
| 4,373,527 A | 2/1983 | Fischell |
| 4,399,219 A | 8/1983 | Weaver |
| 4,434,704 A | 3/1984 | Surjaatmadja |
| 4,575,681 A | 3/1986 | Grosso et al. |
| 4,581,624 A | 4/1986 | O'Connor |
| 4,585,209 A | 4/1986 | Aine et al. |
| 4,662,710 A | 5/1987 | ten Berge |
| 4,675,300 A | 6/1987 | Zare et al. |
| 4,786,165 A | 11/1988 | Yamamoto et al. |
| 4,797,842 A | 1/1989 | Nackman et al. |
| 4,876,504 A | 10/1989 | Blake et al. |
| 4,898,582 A | 2/1990 | Faste |
| 4,908,112 A | 3/1990 | Pace |
| 4,936,465 A | 6/1990 | Zold |
| 4,963,498 A | 10/1990 | Hillman et al. |
| 4,965,743 A | 10/1990 | Malin et al. |
| 4,992,312 A | 2/1991 | Frisch |
| 5,032,381 A | 7/1991 | Bronstein et al. |
| 5,085,562 A | 2/1992 | van Lintel |
| 5,088,515 A | 2/1992 | Kamen |
| 5,096,388 A | 3/1992 | Weinberg |
| 5,100,627 A | 3/1992 | Buican et al. |
| 5,126,022 A | 6/1992 | Soane et al. |
| 5,126,115 A | 6/1992 | Fujita et al. |
| 5,164,558 A | 11/1992 | Huff et al. |
| 5,171,132 A | 12/1992 | Miyazaki |
| 5,171,764 A | 12/1992 | Katayama et al. |
| 5,224,843 A | 7/1993 | Van Lintel |
| 5,259,737 A | 11/1993 | Kamisuki et al. |
| 5,265,327 A | 11/1993 | Faris et al. |
| 5,290,240 A | 3/1994 | Horres, Jr. |
| 5,307,186 A | 4/1994 | Izumi et al. |
| 5,336,062 A | 8/1994 | Richter |
| 5,346,372 A | 9/1994 | Naruse et al. |
| 5,375,979 A | 12/1994 | Trah |
| 5,376,252 A | 12/1994 | Ekstrom |
| 5,400,741 A | 3/1995 | DeTitta et al. |
| 5,423,287 A | 6/1995 | Usami et al. |
| 5,434,047 A | 7/1995 | Arnold et al. |
| 5,452,878 A | 9/1995 | Gravesen et al. |
| 5,454,472 A | 10/1995 | Benecke et al. |
| 5,487,003 A | 1/1996 | Iwasawa et al. |
| 5,496,009 A | 3/1996 | Farrell et al. |
| 5,498,392 A | 3/1996 | Wilding et al. |
| 5,500,071 A | 3/1996 | Kaltenbach et al. |
| 5,512,131 A | 4/1996 | Kumar et al. |
| 5,525,464 A | 6/1996 | Drmanac et al. |
| 5,529,465 A | 6/1996 | Zengerle et al. |
| 5,558,998 A | 9/1996 | Hammond et al. |
| 5,571,410 A | 11/1996 | Swedberg et al. |
| 5,574,893 A | 11/1996 | Southgate et al. |
| 5,580,523 A | 12/1996 | Bard |
| 5,587,128 A | 12/1996 | Wilding et al. |
| 5,589,136 A | 12/1996 | Northrup et al. |
| 5,593,130 A | 1/1997 | Hansson et al. |
| 5,595,650 A | 1/1997 | Manz |
| 5,608,519 A | 3/1997 | Gourley |
| 5,632,876 A | 5/1997 | Zanzucchi et al. |
| 5,641,400 A | 6/1997 | Kaltenbach et al. |
| 5,642,015 A | 6/1997 | Whitehead et al. |
| 5,656,155 A | 8/1997 | Norcross et al. |
| 5,659,171 A | 8/1997 | Young et al. |
| 5,660,370 A | 8/1997 | Webster |
| 5,661,222 A | 8/1997 | Hare |
| 5,665,070 A | 9/1997 | McPhee |
| 5,681,024 A | 10/1997 | Lisec et al. |
| 5,702,618 A | 12/1997 | Saaski et al. |
| 5,705,018 A | 1/1998 | Hartley |
| 5,716,852 A | 2/1998 | Yager et al. |
| 5,726,751 A | 3/1998 | Altendorf et al. |
| 5,750,015 A | 5/1998 | Soane et al. |
| 5,757,482 A | 5/1998 | Fuchs et al. |
| 5,759,014 A | 6/1998 | Van Lintel |
| 5,775,371 A | 7/1998 | Pan et al. |
| 5,779,868 A | 7/1998 | Parce et al. |
| 5,788,468 A | 8/1998 | Dewa et al. |
| 5,800,690 A | 9/1998 | Chow et al. |
| 5,802,349 A * | 9/1998 | Rigg et al. .................. 716/2 |
| 5,807,522 A | 9/1998 | Brown et al. |
| 5,812,394 A | 9/1998 | Lewis et al. |
| 5,833,926 A | 11/1998 | Wurzel et al. |
| 5,836,750 A | 11/1998 | Cabuz |
| 5,837,200 A | 11/1998 | Diessel et al. |
| 5,839,722 A | 11/1998 | Berlin et al. |
| 5,842,787 A | 12/1998 | Kopf-Sill et al. |
| 5,852,495 A | 12/1998 | Parce |
| 5,854,684 A | 12/1998 | Stabile et al. |
| 5,856,174 A | 1/1999 | Lipshutz et al. |
| 5,858,187 A | 1/1999 | Ramsey et al. |
| 5,858,649 A | 1/1999 | Asgari et al. |
| 5,863,502 A | 1/1999 | Southgate et al. |
| 5,863,801 A | 1/1999 | Southgate et al. |
| 5,867,399 A | 2/1999 | Rostoker et al. |
| 5,869,004 A | 2/1999 | Parce et al. |
| 5,872,010 A | 2/1999 | Karger et al. |
| 5,875,817 A | 3/1999 | Carter |
| 5,876,187 A | 3/1999 | Afromowitz et al. |
| 5,880,071 A | 3/1999 | Parce et al. |
| 5,885,470 A | 3/1999 | Parce et al. |
| 5,904,824 A | 5/1999 | Oh |
| 5,932,799 A | 8/1999 | Moles |
| 5,942,443 A | 8/1999 | Parce et al. |
| RE36,350 E | 10/1999 | Swedberg et al. |
| 5,971,355 A | 10/1999 | Biegelsen et al. |
| 5,994,696 A | 11/1999 | Tai et al. |
| 5,997,961 A | 12/1999 | Feng et al. |
| 6,004,442 A | 12/1999 | Choulga et al. |
| 6,007,309 A | 12/1999 | Hartley |
| 6,042,709 A | 3/2000 | Parce et al. |
| 6,043,080 A | 3/2000 | Lipshutz et al. |
| 6,048,498 A | 4/2000 | Kennedy |
| 6,056,428 A | 5/2000 | Devoino et al. |
| 6,089,534 A | 7/2000 | Biegelsen et al. |
| 6,103,537 A | 8/2000 | Ullman et al. |
| 6,107,044 A | 8/2000 | Nikiforov |
| 6,116,766 A * | 9/2000 | Maseeh et al. ................ 700/97 |
| 6,123,769 A | 9/2000 | Sanjoh |
| 6,132,685 A | 10/2000 | Kercso et al. |
| 6,149,787 A | 11/2000 | Chow et al. |
| 6,149,870 A | 11/2000 | Parce et al. |
| 6,155,282 A | 12/2000 | Zachary et al. |
| 6,167,910 B1 | 1/2001 | Chow |
| 6,174,365 B1 | 1/2001 | Sanjoh |
| 6,182,020 B1 | 1/2001 | Fairbanks |
| 6,221,654 B1 | 4/2001 | Quake et al. |
| 6,235,175 B1 | 5/2001 | Dubrow et al. |
| 6,246,330 B1 | 6/2001 | Nielsen |
| 6,274,337 B1 | 8/2001 | Parce et al. |
| 6,296,673 B1 | 10/2001 | Santarsiero et al. |
| 6,321,791 B1 | 11/2001 | Chow |
| 6,329,209 B1 | 12/2001 | Wagner et al. |
| 6,345,502 B1 | 2/2002 | Tai et al. |
| 6,358,387 B1 | 3/2002 | Kopf-Sill et al. |
| 6,375,871 B1 | 4/2002 | Bentsen et al. |
| 6,376,971 B1 | 4/2002 | Petrine et al. |

| | | |
|---|---|---|
| 6,408,878 B2 | 6/2002 | Unger et al. |
| 6,409,832 B2 | 6/2002 | Weigl et al. |
| 6,470,904 B1 * | 10/2002 | Tai et al. .................. 137/15.18 |
| 6,488,832 B2 | 12/2002 | Heller |
| 6,488,872 B1 | 12/2002 | Beebe et al. |
| 6,500,323 B1 | 12/2002 | Chow et al. |
| 6,508,988 B1 | 1/2003 | Van Dam et al. |
| 6,520,936 B1 | 2/2003 | Mann |
| 6,528,249 B1 | 3/2003 | Short |
| 6,530,065 B1 * | 3/2003 | McDonald et al. ............. 716/4 |
| 6,533,914 B1 | 3/2003 | Liu |
| 6,537,799 B2 | 3/2003 | Chow et al. |
| 6,540,895 B1 | 4/2003 | Quake et al. |
| 6,541,071 B1 | 4/2003 | Bookbinder et al. |
| 6,563,111 B1 | 5/2003 | Moon et al. |
| 6,569,382 B1 | 5/2003 | Edman et al. |
| 6,581,441 B1 | 6/2003 | Paul |
| 6,585,939 B1 | 7/2003 | Dapprich |
| 6,596,545 B1 | 7/2003 | Wagner et al. |
| 6,605,472 B1 | 8/2003 | Skinner et al. |
| 6,627,076 B2 | 9/2003 | Griffiths |
| 6,637,463 B1 | 10/2003 | Lei et al. |
| 6,662,818 B2 | 12/2003 | Paul et al. |
| 6,664,104 B2 | 12/2003 | Pourahmadi et al. |
| 6,667,124 B2 | 12/2003 | Suenaga et al. |
| 6,677,131 B2 | 1/2004 | Yuen |
| 6,689,473 B2 | 2/2004 | Guire et al. |
| 6,713,327 B2 | 3/2004 | Leedy |
| 6,716,378 B2 | 4/2004 | Yang et al. |
| 6,736,978 B1 | 5/2004 | Porter et al. |
| 6,749,814 B1 | 6/2004 | Bergh et al. |
| 6,752,922 B2 | 6/2004 | Huang et al. |
| 6,765,279 B2 | 7/2004 | Leedy |
| 6,767,706 B2 | 7/2004 | Quake et al. |
| 6,829,753 B2 | 12/2004 | Lee et al. |
| 6,847,153 B1 | 1/2005 | Balizer |
| 6,866,785 B2 | 3/2005 | Zare et al. |
| 6,884,346 B2 | 4/2005 | Zare et al. |
| 6,885,982 B2 | 4/2005 | Harris et al. |
| 6,898,561 B1 * | 5/2005 | Liu et al. ...................... 703/14 |
| 6,960,437 B2 | 11/2005 | Enzelberger et al. |
| 2001/0027745 A1 | 10/2001 | Weigl et al. |
| 2001/0041357 A1 | 11/2001 | Fouillet et al. |
| 2002/0005354 A1 | 1/2002 | Spence et al. |
| 2002/0014673 A1 | 2/2002 | Leedy |
| 2002/0037499 A1 | 3/2002 | Quake et al. |
| 2002/0045297 A1 | 4/2002 | Leedy |
| 2002/0058332 A1 | 5/2002 | Quake et al. |
| 2002/0064885 A1 | 5/2002 | Bedingham et al. |
| 2002/0108096 A1 | 8/2002 | Lee et al. |
| 2002/0108097 A1 | 8/2002 | Harris et al. |
| 2002/0109114 A1 | 8/2002 | Driggs et al. |
| 2002/0127736 A1 | 9/2002 | Fu et al. |
| 2002/0145231 A1 | 10/2002 | Hansen et al. |
| 2002/0158022 A1 | 10/2002 | Huang et al. |
| 2002/0197603 A1 | 12/2002 | Chow et al. |
| 2003/0008308 A1 | 1/2003 | Enzelberger et al. |
| 2003/0049659 A1 | 3/2003 | Lapidus et al. |
| 2003/0134129 A1 | 7/2003 | Lammertink et al. |
| 2003/0143120 A1 | 7/2003 | Ruediger et al. |
| 2003/0175947 A1 | 9/2003 | Liu et al. |
| 2004/0072278 A1 | 4/2004 | Chou et al. |
| 2004/0096960 A1 | 5/2004 | Burd Mehta et al. |
| 2004/0141887 A1 | 7/2004 | Mainquist et al. |
| 2004/0209354 A1 | 10/2004 | Mathies et al. |
| 2004/0248167 A1 | 12/2004 | Quake et al. |
| 2005/0000900 A1 | 1/2005 | Huang et al. |
| 2005/0019792 A1 | 1/2005 | McBride et al. |
| 2005/0053952 A1 | 3/2005 | Hong et al. |
| 2005/0084421 A1 | 4/2005 | Unger et al. |
| 2005/0164376 A1 | 7/2005 | Balagadde et al. |
| 2005/0180891 A1 | 8/2005 | Webster |

FOREIGN PATENT DOCUMENTS

| | | |
|---|---|---|
| EP | 0 703 364 A1 | 3/1996 |
| EP | 0 706 004 A2 | 4/1996 |
| EP | 0 779 436 A2 | 6/1997 |
| EP | 0 829 360 A2 | 3/1998 |
| EP | 0 845 603 A1 | 6/1998 |
| EP | 0 999 055 A2 | 5/2000 |
| EP | 1 065 378 A2 | 1/2001 |
| GB | 2 097 692 A | 11/1982 |
| GB | 2 155 152 A | 9/1985 |
| GB | 2 308 460 A | 6/1997 |
| WO | WO 98/07069 A1 | 2/1998 |
| WO | WO 98/39645 A1 | 9/1998 |
| WO | WO 98/52691 A1 | 11/1998 |
| WO | WO 99/00655 A2 | 1/1999 |
| WO | WO 99/04361 A1 | 1/1999 |
| WO | WO 99/17093 A1 | 4/1999 |
| WO | WO 99/52633 A1 | 10/1999 |
| WO | WO 99/61888 A2 | 12/1999 |
| WO | WO 00/00678 A1 | 1/2000 |
| WO | WO 00/21666 A1 | 4/2000 |
| WO | WO 00/22409 A2 | 4/2000 |
| WO | WO 00/30167 A1 | 5/2000 |
| WO | WO 00/43748 A1 | 7/2000 |
| WO | WO 00/60345 A1 | 10/2000 |
| WO | WO 01/01025 | 1/2001 |
| WO | WO 01/06529 A1 | 1/2001 |
| WO | WO 01/06575 A1 | 1/2001 |
| WO | WO 01/09595 A2 | 2/2001 |
| WO | WO 01/09595 A3 | 2/2001 |
| WO | WO 01/53794 A1 | 7/2001 |
| WO | WO 01/94635 A2 | 12/2001 |
| WO | WO 02/30486 A2 | 4/2002 |
| WO | WO 02/43615 A2 | 6/2002 |
| WO | WO 02/060582 A3 | 8/2002 |
| WO | WO 02/082047 A2 | 10/2002 |
| WO | WO 03/037781 A1 | 5/2003 |

OTHER PUBLICATIONS

"Chapter 9: Microfluidic Devices," Micromachined Transducers Sourcebook, pp. 779-882, 1998.

"Last Chance For Micromachines," The Economist Technology Quarterly, 8 pages, Dec. 7, 2000.

Ahn, Chong H. et al., "Fluid Micropumps Based On Rotary Magnetic Actuators," Proceedings of 1995 IEEE Micro Electro Mechanical Systems Workshop (MEMS '95), Amsterdam, Netherlands, pp. 408-412, Jan. 29-Feb. 2, 1995.

Anderson, Janelle R. et al., "Fabrication Of Topologically Complex Three-Dimensional Microfluidic Systems in PDMS By Rapid Prototyping," Analytical Chemistry, vol. 72, No. 14, pp. 3158-3164, Jul. 15, 2000.

Anderson, Rolfe C. et al., "Microfluidic Biochemical Analysis System," Transducers '97, 1997 International Conference on Solid-State Sensors and Actuators, Chicago, Illinois, pp. 477-480, Jun. 16-19, 1997.

Angell, James B. et al., "Silicon Micromechanical Devices," Scientific American, pp. cover, 44-55, Apr. 1983.

Armani, Deniz et al., "Re-Configurable Fluid Circuits By PDMS Elastomer Micromachining," IEEE Int. Conf. Micro Electro Mech. Syst. Tech. Digest, vol. 12, pp. 222-227, 1999.

Ballantyne, J. P. et al., "Selective Area Metallization By Electron-Beam Controlled Direct Metallic Disposition," J. Vac. Sci. Technol., vol. 10, No. 6, pp. 1094-1097, Nov. 1973.

Benard, W. L. et al., "A Titanium-Nickel-Shape-Memory Alloy Actuated Micropump," Transducers '97, 1997 International Conference on Solid-State Sensors and Actuators, Chicago, Illinois, pp. 361-364, Jun. 16-19, 1997.

Bloomstein, T. M. et al., "Laser-Chemical Three-Dimensional Writing For Microelectromechanics And Application To Standard-Cell Microfluidics," J. Vac. Sci. Technol. B, vol. 10, No. 6, pp. 2671-2674, Nov. 1992.

Bousse, Luc et al., "Electrokinetically Controlled Microfluidic Analysis Systems," Annu. Rev. Biophys. Biomol. Struct., vol. 29, pp. 155-181, 2000.

Brechtel, R. et al., "Control Of The Electroosmotic Flow By Metal-Salt-Containing Buffers," Journal of Chromatography A, vol. 716, pp. 97-105, 1995.

Bryzek, Janusz et al., "Micromachines On The March", IEEE Spectrum, vol. 31, No. 5, pp. 20-31, May 1994.

Buchaillot, Lionel et al., "Silicon Nitride Thin Films Young's Modulus Determination By An Optical Non Destructive Method," Jpn. J. Appl. Phys., vol. 36, Part 2, No. 6B, pp. L794-L797, Jun. 15, 1997.

Burbaum, Jonathan J. et al., "New Technologies For High-Throughput Screening," Current Opinion in Chemical Biology, vol. 1, pp. 72-78, 1997.

Busch, J. et al., Methods For The Differentiation Of Microorganisms, Journal of Chromatography B, vol. 722, pp. 263-278, 1999.

Cai, Weiwen, et al., "High-Resolution Restriction Maps Of Bacterial Artificial Chromosomes Constructed By Optical Mapping," Proc. Natl. Acad. Sci. USA, vol. 95, pp. 3390-3395, Mar. 1998.

Calkins, Kathryn, "Mycometrix: Rubber Chips," BioCentury, 2 pages, Oct. 16, 2000.

Castro, Alonso et al., "Fluorescence Detection And Size Measurement Of Single DNA Molecules," Analytical Chemistry, vol. 85, No. 7, pp. 849-852, Apr. 1, 1993.

Chan, Jason H. et al., "Microfabricated Polymer Devices For Automated Sample Delivery Of Peptides For Analysis By Electrospray Ionization Tandem Mass Spectrometry," Analytical Chemistry, vol. 71, No. 20, pp. 4437-4444, Oct. 15, 1999.

Chiang, Yuh-Min et al., "Characterizing The Process Of Cast Molding Microfluidic Systems," SPIE, vol. 3877, pp. 303-311, Sep. 1999.

Chiu, Chi-Sung et al., "Single Molecule Measurements Calibrate Green Fluorescent Protein Surface Densities On Transparent Beads For Use With 'Knock-In' Animals And Other Expression Systems," Journal of Neuroscience Methods, vol. 105, pp. 55-63, 2001.

Chiu, Daniel T. et al., "Patterned Deposition Of Cells And Proteins Onto Surfaces By Using Three-Dimensional Microfluidic Systems," PNAS, vol. 97, No. 6, pp. 2408-2413, Mar. 14, 2000.

Chou, Hou-Pu et al., "A Microfabricated Device For Sizing And Sorting DNA Molecules," Proc. Natl. Acad. Sci., vol. 96, pp. 11-13, Jan. 1999.

Chou, Hou-Pu et al., "A Microfabricated Rotary Pump," Biomedical Microdevices, vol. 3, No. 4, pp. 323-330, 2001.

Chou, Hou-Pu et al., "Disposable Microdevices For DNA Analysis And Cell Sorting," Proc. Solid-State Sensor and Actuator Workshop, Hilton Head, South Carolina, pp. 11-14, Jun. 8-11, 1998.

Chou, Hou-Pu et al., "Integrated Elastomer Fluidic Lab-On-A-Chip-Surface Patterning and DNA Diagnostics," Proceedings of the Solid State Actuator And Sensor Workshop, Hilton Head, South Carolina, 4 pages, 2000.

Chou, Hou-Pu et al., "Microfabricated Devices For Sizing DNA And Sorting Cells," Micro- and Nanofabricated Structures and Devices for Biomedical Environmental Applications, Proceedings of SPIE, vol. 3258, pp. 181-187, 1998.

Chou, Hou-Pu et al., "Multiple Disease Diagnostics On A Single Chip," Biophysics Lab, Caltech, pp. 1-4, Mar. 1, 2000.

Delamarche, Emmanuel et al., "Patterned Delivery Of Immunoglobulins To Surfaces Using Microfluidic Networks," Science, vol. 276, pp. 779-781, May 2, 1997.

Dharmatilleke, Saman et al., "Three-Dimensional Silicone Device Fabrication And Interconnection Scheme For Microfluidic Applications Using Sacrificial Wax Layers," Micro-Electro-Mechanical Systems (MEMS), vol. 2, pp. 413-418, 2000.

Duffy, David C. et al., "Patterning Electroluminescent Materials With Feature Sizes As Small As 5μm Using Elastomeric Membranes As Masks For Dry Lift-Off," Advanced Materials, vol. 11, No. 7, pp. 546-552, 1999.

Duffy, David C. et al., "Rapid Prototyping Of Microfluidic Switches In Poly(dimethyl siloxane) And Their Actuation By Electro-Osmotic Flow," J. Micromech. Microeng., vol. 9, pp. 211-217, 1999.

Duffy, David C. et al., "Rapid Prototyping Of Microfluidic Systems In Poly(dimethylsiloxane)," Analytical Chemistry, vol. 70, No. 23, pp. 4974-4984, Dec. 1, 1998.

Effenhauser, Carlo S. et al., "Integrated Capillary Electrophoresis On Flexible Silicone Microdevices: Analysis Of DNA Restriction Fragments And Detection Of Single DNA Molecules On Microchips," Analytical Chemistry, vol. 69, No. 17, pp. 3451-3457, Sep. 1, 1997.

Effenhauser, Carlo S. et al., "Integrated Chip-Based Capillary Electrophoresis," Electrophoresis, vol. 18, pp. 2203-2213, 1997.

Ericson, Christer et al., "Electroosmosis- And Pressure-Driven Chromatography In Chips Using Continuous Beds," Analytical Chemistry, vol. 72, No. 1, pp. 81-87, Jan. 1, 2000.

Fahrenberg, J. et al., "A Microvalve System Fabricated By Thermoplastic Molding," J. Micromech. Microeng., vol. 5, pp. 169-171, 1995.

Fettinger, J. C. et al., "Stacked Modules For Micro Flow Systems In Chemical Analysis: Concept And Studies Using An Enlarged Model," Sensors And Actuators B, vol. 17, pp. 19-25, 1993.

Fiedler, Stefan et al., "Dielectrophoretic Sorting of Particles And Cells In A Microsystem," Analytical Chemistry, vol. 70, No. 9, pp. 1909-1915, May 1, 1998.

Figeys, Daniel et al., "An Integrated Microfluidics-Tandem Mass Spectrometry System For Automated Protein Analysis," Analytical Chemistry, vol. 70, No. 18, pp. 3728-3734, Sep. 15, 1998.

Figeys, Daniel et al., "Nanoflow Solvent Gradient Delivery From A Microfabricated Device For Protein Identifications By Electrospray Ionization Mass Spectrometry," Analytical Chemistry, vol. 70, No. 18, pp. 3721-3727, Sep. 15, 1998.

Folch, A. et al., "Molding Of Deep Polydimethylsiloxane Microstructures For Microfluidics And Biological Applications," Journal of Biomechanical Engineering, vol. 121, pp. 28-34, Feb. 1999.

Fu, Anne Y. et al., "A Microfabricated Fluorescence-Activated Cell-Sorter," Nature Biotechnology, vol. 17, pp. 1109-1111, Nov. 1999.

Fulwyler, M. J., "Electronic Separation Of Biological Cells By Volume," Science, pp. 910-911, Nov. 1965.

Galambos, Paul et al., "Electrical And Fluidic Packaging Of Surface Micromachined Electro-Microfluidic Devices," 8 pages, no date.

Gao, Jun et al., "Integrated Microfluidic System Enabling Protein Digestion, Peptide Separation, And Protein Identification," Analytical Chemistry, vol. 73, No. 11, pp. 2648-2655, Jun. 1, 2001.

Gass, V. et al., "Integrated Flow-Regulated Silicon Micropump," Sensors and Actuators A, vol. 43, pp. 335-338, 1994.

Gerlach, Torsten, "Pumping Gases By A Silicon Micro Pump With Dynamic Passive Valves," Transducers '97, 1997 International Conference on Solid-State Sensors and Actuators, Chicago, Illinois, pp. 357-360, Jun. 16-19, 1997.

Ginsberg, Michael A., "New Laser System Measure DNA Fragments," Biophotonics International, p. 20, Nov./Dec. 1996.

Goll, C. et al., "Microvalves With Bistable Buckled Polymer Diaphrams," J. Micromech. Microeng., vol. 6, pp. 77-79, 1996.

Goodwin, Peter M. et al., "Rapid Sizing Of Individual Fluorescently Stained DNA Fragments By Flow Cytometry," Nucleic Acids Research, vol. 21, No. 4, pp. 803-806, 1993.

Gravesen, Peter et al., "Microfluidics—A Review," J. Micromech. Microeng., vol. 3, pp. 168-192, 1993.

Greene, Chana, "Characterizing The Properties Of PDMS," pp. 1-11, Summer 2000.

Guérin, L. J. et al., "Simple And Low Cost Fabrication Of Embedded Micro-Channels By Using A New Thick-Film Photoplastic," Transducers '97, 1997 International Conference on Solid-State Sensors And Actuators, Chicago, Illinois, pp. 1419-1422, Jun. 18-19, 1997.

Harrison, D. Jed et al., "Micromachining A Miniaturized Capillary Electrophoresis-Based Chemical Analysis System On A Chip," Science, vol. 261, pp. 895-897, Aug. 13, 1993.

Henion, Jack et al., "Capillary Electrophoresis/Mass Spectrometry: From One Meter Capillaries To Chip-Based Devices," 2 pages, 1999.

Hicks, Jennifer, "Genetics And Drug Discovery Dominate Microarray Research," R&D Magazine, pp. 28-33, Feb. 1999.

Hofmann, Oliver et al., "Modular Approach To Fabrication Of Three-Dimensional Microchannel Systems In PDMS—Application to Sheath Flow Microchips," Lab on a Chip, vol. 1, pp. 108-114, 2001.

Hopfgartner, Gerard et al., "Exact Mass Measurement Of Product Ions For The Structural Elucidation Of Drug Metabolites With A Tandem Quadrapole Orthogonal-Acceleration Time-Of-Flight Mass Spectrometer," Journal of The American Society for Mass Spectrometry, vol. 10, pp. cover, 1305-1314, Dec. 1999.

Horn, Howard, "Lab Chips Sector: Microtechnologies Are Changing Healthcare And More," Life Sciences, pp. 19-21, Mar. 20, 2001.

Hornbeck, Larry J. et al., "Bistable Deformable Mirror Device," Spatial Light Modulators and Applications 1988 Technical Digest Series, Summaries of papers presented at the Spatial Light Modulators and Applications Topical Meeting, Optical Society of America, vol. 8, Postconference Edition, A215, pp. 107-110, Jun. 15-17, 1988.

Hosokawa, Kazuo et al., "Droplet-Based Nano/Picoliter Mixer Using Hydrophobic Microcapillary Vent," 1999 IEEE International Conference on Micro Electro Mechanical Systems, Technical Digest, pp. 388-393, 1999.

Hosokawa, Kazuo et al., "Handling Of Picoliter Liquid Samples In A Poly(dimethylsiloxane)-Based Microfluidic Device," Analytical Chemistry, vol. 71, No. 20, pp. 4781-4785, Oct. 15, 1999.

Ikuta, Koji et al., "Three Dimensional Micro Integrated Fluid Systems (MIFS) Fabricated By Stereo Lithography," IEEE, pp. 1-6, 1994.

Jacobson, Stephen, C. et al., "High-Speed Separations On A Microship," Analytical Chemistry, vol. 66, No. 7, pp. 1114-1118, Apr. 1, 1994.

Jacobson, Stephen C. et al., "Microfluidic Devices For Electrokinetically Driven Parallel And Serial Mixing," Analytical Chemistry, vol. 71, No. 20, pp. 4455-4459, Oct. 15, 1999.

Jerman, Hal, "Electrically-Activated, Normally-Closed Diaphram Valves," Transducers '91, 1991 International Conference on Solid-State Sensors and Actuators, pp. cover, 1045-1048, 1991.

Jo, Byung-Ho et al., "Fabrication Of Three-Dimensional Microfluidic Systems By Stacking Molded Polydimethylsiloxane (PDMS) Layers" SPIE, vol. 3877, pp. 222-229, Sep. 1999.

Jo, Byung-Ho et al., "Three-Dimensional Micro-Channel Fabrication In Polydimethylsiloxane (PDMS) Elastomer," Journal of Microelectromechanical Systems, vol. 9, No. 1, pp. 76-81, Mar. 2000.

Jung D. R. et al., "Chemical And Physical Interactions At Metal/Self-Assembled Organic Monolayer Interfaces," pp. 1-54, 1994.

Kagan, C. R., "Organic-Inorganic Hybrid Materials As Semiconducting Channels In Thin-Film Field-Effect Transistors," Science, vol. 286, pp. 945-947, Oct. 29, 1999.

Kapur, Ravi et al., "Fabrication And Selective Surface Modification Of 3-Dimensionally Textured Biomedical Polymers From Etched Silicon Substrates," Journal of Biomedical Materials Research, vol. 33, pp. 205-216, 1996.

Kawano, Yasushi et al., "Rapid Isolation And Identification Of Staphylococcal Exoproteins By Reverse Phase Capillary High Performance Liquid Chromatography-Electrospray Ionization Mass Spectrometry," FEMS Microbiology Letters, vol. 189, pp. 103-108, 2000.

Keller, Richard A. et al., "Single-Molecule Fluorescence Analysis In Solution," Applied Spectroscopy, vol. 50, No. 7, pp. 12A-30A, Jul. 1996.

Kenis, Paul J. A. et al., "Microfabrication Inside Capillaries Using Multiphase Laminar Flow Patterning," Science, vol. 285, pp. 83-85, Jul. 2, 1999.

Khoo, Melvin et al., "A Novel Micromachined Magnetic Membrane Microfluid Pump," pp. 1-4, no date.

Kim, Enoch et al., "Micromolding In Capillaries: Applications In Materials Science," J. Am. Chem. Soc., vol. 118, No. 24, pp. 5722-5731, 1996.

Kim, Enoch et al., "Polymer Microstructures Formed By Moulding In Capillaries," Nature, vol. 376, pp. 581-584, Aug. 17, 1995.

Kirk-Othmer, "Concise Encyclopedia of Chemical Technology," John Wiley & Sons, 5 pages, no date.

Kopp, Martin U. et al., "Chemical Amplification: Continuous-Flow PCR On A Chip," Science, vol. 280, pp. 1046-1048, May 15, 1998.

Kuhn, Lawrence et al., "Silicon Charge Electrode Array For Ink Jet Printing," IEEE Transactions on Electron Devices, vol. ED-25, No. 10, pp. 1257-1260, Oct. 1978.

Kumar, Amit et al., "Features Of Gold Having Micrometer To Centimeter Dimensions Can Be Formed Through A Combination Of Stamping With An Elastomeric Stamp And An Alkanethiol 'Ink' Followed By Chemical Etching," Appl. Phys. Lett., vol. 63, No. 14, pp. 2002-2004, Oct. 4, 1993.

Kumar, Amit et al., "Patterning Self-Assembled Monolayers: Applications In Materials Science," Langmuir, vol. 10, pp. 1498-1511, 1994.

Lagally, Eric T. et al., "Fully Integrated PCR-Capillary Electrophoresis Microsystem For DNA Analysis," Lab On A Chip, vol. 1, pp. 102-107, 2001.

Lagally, Eric T. et al., "Monolithic Integrated Microfluidic DNA Amplification And Capillary Electrophoresis Analysis System," Sensors and Actuators B, vol. 63, pp. 138-146, 2000.

Lagally, E. T. et al., "Single-Molecule DNA Amplification And Analysis In An Integrated Microfluidic Device," Analytical Chemistry, vol. 73, No. 3, pp. 565-570, Feb. 1, 2001.

Lammerink, T. S. J. et al., "Modular Concept For Fluid Handling Systems," IEEE, pp. 389-394, 1996.

Lazar, Iulia M. et al., "Novel Microfabricated Device For Electrokinetically Induced Pressure Flow And Electrospray Ionization Mass Spectrometry," Journal of Chromatography A, vol. 892, pp. 195-201, 2000.

Lessard, Guillaume A. et al., "A Scanning Apertureless Fluorescence Microscope," 8 pages, no date.

Li, Jianjun et al., "Integration Of Microfabricated Devices To Capillary Electrophoresis-Electrospray Mass Spectrometry Using A Low Dead Volume Connection: Application To Rapid Analyses Of Proteolytic Digests," Analytical Chemistry, vol. 71, No. 15, pp. 3036-3045, Aug. 1, 1999.

Li, Paul C. H. et al., "Transport, Manipulation, And Reaction Of Biological Cells On-Chip Using Electrokinetic Effects," Analytical Chemistry, vol. 69, No. 8, pp. 1564-1568, Apr. 15, 1997.

Licklider, Larry et al., "A Micromachined Chip-Based Electrospray Source For Mass Spectrometry," Analytical Chemistry, vol. 72, No. 2, pp. 367-375, Jan. 15, 2000.

Lin, L. Y. et al., "Free-Space Micromachined Optical Switches For Optical Networking," IEEE Journal of Selected Topics in Quantum Electronics, vol. 5, No. 1, pp. 4-9, Jan. 1999.

Lin, Yuehe et al., "Laser Micromachined Isoelectric Focusing Device On Polymer Substrate For Electrospray Mass Spectrometry," SPIE, vol. 3877, pp. 28-35, Sep. 1999.

Liu, Hanghui et al., "Development Of Multichannel Devices With An Array Of Electrospray Tips For High-Throughput Mass Spectrometry," Analytical Chemistry, vol. 72, No. 14, pp. 3303-3310, Jul. 15, 2000.

Lötters, J C et al., "The Mechanical Properties Of The Rubber Elastic Polymer Polydimethylsiloxane For Sensor Applications," J. Micromech. Microeng., vol. 7, pp. 145-147, 1997.

Lucy, Charles A. et al., "Characterization Of The Cationic Surfactant Induced Reversal Of Electroosmotic Flow In Capillary Electrophoresis," Anal. Chem., vol. 68, pp. 300-305, 1996.

Maluf, N., "An Introduction To Microelectromechanical Systems Engineering," Artech House Publishers, Boston London, pp. 42-45, Dec. 1999.

Manz, A. et al., "Micromachining of Monocrystalline Silicon And Glass For Chemical Analysis Systems," Trends in Analytical Chemistry, vol. 10, No. 5, pp. 144-149, 1991.

Marshall, Sid, "Fundamental Changes Ahead For Lab Instrumentation," R&D Magazine, 5 pages, Feb. 1999.

Marsili, Ray, "Lab-On-A-Chip Poised To Revolutionize Sample Prep," R&D Magazine, 5 pages, Feb. 1999.

McDonald, J. Cooper et al., "Fabrication Of Microfluidic Systems In Poly(dimethylsiloxane)," Electrophoresis, vol. 21, pp. 27-40, 2000.

Muller, Richard S. et al., "Surface-Micromachined Microoptical Elements And Systems," Proceedings of the IEEE, vol. 86, No. 8, pp. 1705-1720, Aug. 1998.

New Objective, Inc., "What Is Electrospray," www.newobjective.com/electrospray/electrospray.html, 4 pages, 1999.

Oleschuk, Richard D. et al., "Analytical Microdevices For Mass Spectrometry," Trends In Analytical Chemistry, vol. 19, No. 6., pp. 379-388, 2000.

Olsson, Anders et al., "Simulation Studies Of Diffuser And Nozzle Elements For Valve-Less Micropumps," Transducers '97, 1997 International Conference on Solid-State Sensors and Actuators, Chicago, Illinois, pp. 1039-1042, Jun. 16-19, 1997.

Pethig, Ronald et al., "Applications Of Dielectrophoresis In Biotechnology," Tibtech, vol. 15, pp. 426-432, Oct. 1997.

Petty, Jeffrey T. et al., "Characterization Of DNA Size Determination Of Small Fragments By Flow Cytometry," Anal. Chem., vol. 67, pp. 1755-1761, 1995.

Protana website, "NanoES Products," www.protana.com/products/default.asp, 3 pages, Sep. 19, 2000.

Qin, Dong et al., "Elastomeric Light Valves," Adv. Mater., vol. 9, No. 5, pp. 407-410, 1997.

Qin, Dong et al., "Photolithography With Transparent Reflective Photomasks," J. Vac. Sci. Technol. B, vol. 16, No. 1, pp. 98-103, Jan. 1998.

Quake, Stephen R. et al., "From Micro- To Nanofabrication With Soft Materials," Science, vol. 290, pp. 1536-1540, Nov. 24, 2000.

Rapp, R. et al., "LIGA Micropump For Gases And Liquids," Sensors and Actuators A, vol. 40, pp. 57-61, Jan. 1994.

Roylance, Lynn Michelle et al., "A Batch-Fabricated Silicon Accelerometer," IEEE Transactions on Electron Devices, vol. ED-26, No. 12, pp. 1911-1917, Dec. 1979.

Samad, Akhtar et al., "Optical Mapping: A Novel, Single-Molecule Approach To Genomic Analysis," Genome Research, pp. 1-4, 1995.

Sandia National Laboratories, "Electro Microfluidic Dual In-Line Package (EMDIP)," 2 pages, no date.

Sanjoh, Akira et al., "Spatiotemporal Protein Crystal Growth Studies Using Microfluidic Silicon Devices," Journal of Crystal Growth, vol. 196, pp. 691-702, 1999.

Schasfoort, Richard B. M. et al., "Field-Effect Flow Control For Microfabricated Fluidic Networks," Science, vol. 286, pp. 942-945, Oct. 29, 1999.

Schomburg, W. K. et al., "Fabrication Of Polymer Microcomponents With The AMANDA-Process," New Materials and Directions, Eurosensors XII, pp. 711-714, Sep. 13-16, 1998.

Schueller, Olivier J. A. et al., "Fabrication Of Glassy Carbon Microstructures By Soft Lithography," Sensors and Actuators A, vol. 72, pp. 126-139, 1999.

Schwartz, David C. et al., "Optical Mapping Approaches To Molecular Genomics," Current Opinion in Biotechnology, vol. 8, pp. 70-74, 1997.

Shevchenko, Andrej et al., "Rapid 'de Novo' Peptide Sequencing By A Combination Of Nanoelectospray, Isotopic Labeling And A Quadrupole/Time-Of-Flight Mass Spectometer," Rapid Communications in Mass Spectrometry, vol. 11, pp. 1015-1024, 1997.

Shinohara, Jun et al., "A High Pressure-Resistance Micropump Using Active And Normally-Closed Valves," IEEE, pp. 86-91, 2000.

Shoji, Shuichi, "Fluids For Sensor Systems," Topics in Current Chemistry, vol. 194, pp. 163-188, 1998.

Shoji, Shuichi et al., "Smallest Dead Volume Microvalves For Integrated Chemical Analyzing Systems," Transducers '91, 1991 International Conference on Solid-State Sensors and Actuators, San Francisco, California, pp. cover, 1052-1055, 1991.

Smits, J.G., "Piezoelectric Micropump With Three Valves Working Peristaltically," Sensors and Actuators, vol. A21-A23, pp. 203-206, 1990.

Sohn, L. L. et al., "Capacitance Cytometry: Measuring Biological Cells One By One," PNAS, vol. 97, No. 20, pp. 10687-10690, Sep. 26, 2000.

Stemmer, Willem P. C. et al., "Rapid Evolution Of A Protein in vitro By DNA Shuffling," Nature, vol. 370, pp. 389-390, Aug. 4, 1994.

Sweet, Richard G., "Chapter 9—Flow Sorters For Biologic Cells," Flow Cytometry and Sorting, John Wiley & Sons, pp. 5 cover pages and 177-189, 1979.

Thompson, L. F. et al., "Introduction To Microlithography," 185th Meeting of the American Chemical Society, Seattle, WA, pp. 2 cover pages, 1-13, Mar. 20-25, 1983.

Thorsen, Todd et al., "Dynamic Pattern Formation In A Vesicle-Generating Microfluidic Device," Physical Review Letters, vol. 86, No. 18, pp. 4163-4166, Apr. 30, 2001.

Tufte, O. N. et al., "Silicon Diffused-Element Piezoresistive Diaphragms," Journal of Applied Physics, vol. 33, No. 11, pp. 3322-3327, Nov. 1962.

Ullmann's Encyclopedia of Industrial Chemistry, Sections 6 to 6.3, Topic: Carbon Black, Sixth Edition, 7 pages, 1999.

Unger, Marc A. et al., "Monolithic Microfabricated Valves And Pumps By Multilayer Soft Lithography," Science, vol. 288, pp. 113-116, Apr. 7, 2000.

Unger, Marc A. et al., "Single-Molecule Fluorescence Observed With Mercury Lamp Illumination," Biotechniques, vol. 27, No. 5, pp. 1008-1014, Nov. 1999.

Van De Pol, F.C.M. et al., "A Thermo-Pneumatic Actuation Principle For A Microminiature Pump And Other Micromechanical Devices," Sensors and Actuators, vol. 17, Nos. 1-2, pp. 139-143, May 3, 1989.

Van De Pol, F.C.M. et al., "Micro Liquid Handling Devices—A Review," Micro Systems Technologies, vol. 90, pp. 799-805, 1990.

Van Den Berg, A. et al., "Micro Total Analysis Systems," Proceedings of the μTAS '94 Workshop, University of Twente, The Netherlands, 17 pages, Nov. 21-22, 1994.

Van Dilla, Marvin A. et al., "Chapter 2—Introduction And Resume Of Flow Cytometry And Sorting," Flow Cytometry and Sorting, John Wiley & Sons, pp. 5 cover pages and 11-37, 1979.

Verpoorte, Elisabeth M. J. et al., "Three-Dimensional Micro Flow Manifolds For Miniaturized Chemical Analysis Systems," J. Micromech. Microeng., vol. 7, pp. 246-256, 1994.

Vieider, Christian et al., "A Pneumatically Actuated Micro Valve With A Silicon Rubber Membrane For Integration With Fluid Handling Systems," Transducers '95, 8th International Conference on Solid-State Sensors and Actuators and Eurosensors IX, Stockholm, Sweden, pp. 284-286, Jun. 25-29, 1995.

Washizu, Masao et al., "Molecular Dielectrophoresis Of Biopolymers," IEEE Transactions on Industry Applications, vol. 30, No. 4, pp. 835-843, Jul. 1994.

Weigl, Bernhard H., "Microfluidics-Based Lab-On-A-Chip Systems," IVD Technology Magazine, 8 pages, Nov./Dec. 2000.

Whitesides, George M. et al., "Flexible Methods for Microfluidics," Physics Today, pp. 42-48, Jun. 2001.

Whitesides, George M. et al., "Soft Lithography In Biology And Biochemistry," Annu. Rev. Biomed. Eng., vol. 3, pp. 335-373, 2001.

Wilbur, James L. et al., "Lithographic Molding: A Convenient Route To Structures With Sub-Micrometer Dimensions," Adv. Mater., vol. 7, No. 7, pp. 649-652, 1995.

Wilm, Matthias et al., "Femtomole Sequencing Of Proteins From Polyacrylamide Gels By Nano-Electrospray Mass Spectrometry," Nature, vol. 379, pp. 466-469, Feb. 1, 1996.

Xia, Younan et al., "Complex Optical Surfaces Formed By Replica Molding Against Elastomeric Masters," Science, vol. 273, pp. 347-349, Jul. 19, 1996.

Xia, Younan et al., "Micromolding Of Polymers In Capillaries: Applications In Microfabrication," Chem. Mater., vol. 8, No. 7, pp. 1559-1566, 1996.

Xia, Younan et al., "Reduction In The Size Of Features Of Patterned SAMs Generated By Microcontact Printing With Mechanical Compression Of The Stamp," Adv. Mater., vol. 7, No. 5, pp. 471-473, 1995.

Xia, Younan et al., "Soft Lithography," Angew. Chem. Int. Ed., vol. 37, pp. 551-575, 1998.

Xu, Bing et al., "Making Negative Poisson's Ratio Microstructures By Soft Lithography," Adv. Mater., vol. 11, No. 14, pp. 1186-1189, 1999.

Xu, Jingdong et al., "Room-Temperature Imprinting Method For Plastic Microchannel Fabrication," Analytical Chemistry, vol. 72, No. 8, pp. 1930-1933, Apr. 15, 2000.

Xue, Qifeng et al., "Integrated Multichannel Microchip Electrospray Ionization Mass Spectrometry: Analysis Of Peptides From On-Chip Tryptic Digestion of Melittin," Rapid Communications In Mass Spectrometry, vol. 11, 1253-1256, 1997.

Xue, Qifeng et al., "Multichannel Microchip Electrospray Mass Spectrometry," Analytical Chemistry, vol. 69, No. 3, pp. 426-430, Feb. 1, 1997.

Yang, T. J. et al., "An Apertureless Near-Field Microscope For Fluorescence Imaging," Applied Physics Letters, vol. 76, No. 3, pp. 378-380, Jan. 17, 2000.

Yang, Xing et al., "A Low Power MEMS Silicone/Parylene," Solid-State Sensor and Actuator Workshop, Hilton Head, South Carolina, 4 pages, Jun. 7-11, 1998.

Yang, Xing et al., "A MEMS Thermopneumatic Silicone Membrane Valve," IEEE 10th Annual International Workshop of Micro Electro Mechanical Systems, Nagoya, Japan, pp. cover, 114-118, Jan. 26-30, 1997.

Yazdi, Navid et al., "Micromachined Inertial Sensors," Proceedings of IEEE, vol. 86, No. 8, pp. 1640-1659, Aug. 1998.

Young, A. M. et al., "Contoured Elastic-Membrane Microvalves For Microfluidic Network Integration," Journal of Biomechanical Engineering, vol. 121, pp. 2-6, Feb. 1999.

Zengerle, R. et al., "A Micro Membrane Pump With Electrostatic Actuation," Micro Electro Mechanical Systems '92, Travemünde, Germany, pp. 19-24, Feb. 4-7, 1992.

Zengerle, R. et al., "Performance Simulation Of Microminiaturized Membrane Pumps," 7th International Conference on Solid-State Sensors and Actuators, Yokohama, Japan, pp. 2 cover pages, 106-109, Jun. 7-10, 1993.

Zhang, B. et al., "Microfabricated Devices For Capillary Electrophoresis-Electrospray Mass Spectrometry," Analytical Chemistry, vol. 71, No. 15, pp. 3258-3264, Aug. 1, 1999.

Affholter, Joseph et al., "Engineering A Revolution," Chemistry in Britain, pp. 48-51, Apr. 1999.

Arnold, Frances H., "Design By Directed Evolution," Accounts of Chemical Research, vol. 31, No. 3, pp. 125-131, 1998.

Ashkin, A. et al., "Optical Trapping And Manipulation Of Single Cells Using Infrared Laser Beams," Nature, vol. 330, No. 24, pp. 769-771, Dec. 31, 1987.

Ashkin, A. et al., "Optical Trapping And Manipulation Of Viruses And Bacteria," Science, vol. 235, pp. 1517-1520, Mar. 20, 1987.

Barron, Annelise E. et al., "Capillary Electrophoresis Of DNA In Uncross-Linked Polymer Solutions," Journal of Chromatography A, vol. 652, pp. 3-16, 1993.

Barron, Annelise E. et al., "DNA Separations By Slab Gel And Capillary Electrophoresis—Theory And Practice," Separation and Purification Methods, vol. 24, No. 1, pp. 1-118, 1995.

Barron, Annelise E. et al., "The Use Of Coated And Uncoated Capillaries For The Elecetrophoretic Separation Of DNA In Dilute Polymer-Solutions," Electrophoresis, vol. 16, pp. 64-74, 1995.

Belgrader, Phillip et al., "Rapid Pathogen Detection Using A Microchip PCR Array Instrument," Clinical Chemistry, vol. 44, No. 10, pp. 2191-2194, 1998.

Blanch, Harvey W. et al., Biochemical Engineering, pp. 2 cover pages and 305, 1996.

Blankenstein, Gert et al., "Modular Concept Of A Laboratory On A Chip For Chemical And Biochemical Analysis," Biosensors & Bioelectronics, vol. 13, Nos. 3-4, pp. 427-438, 1998.

Brush, Michael, "Automated Laboratories," The Scientist, vol. 13, No. 4, 10 pages, Feb. 15, 1999.

Budowle, Bruce et al., "Analysis Of The VNTR Locus DIS80 By The PCR Followed By High-Resolution PAGE," Am. J. Hum. Genet., vol. 48, pp. 137-144, 1991.

Buican, Tudor N. et al., "Automated Single-Cell Manipulation And Sorting By Light Trapping," Applied Optics, vol. 26, No. 24, pp. 5311-5316, Dec. 15, 1987.

Costerton, J. William et al., "Microbial Biofilms," Annu. Rev. Microbiol., vol. 49, pp. 711-745, 1995.

Cowen, S. et al., "An On-Chip Miniature Liquid Chromatography System: Design, Construction And Characterization," Micro Total Analysis Systems, Proceedings of the μTAS '94 Workshop, University of Twente, The Netherlands, pp. 2 cover pages and 295-298, 1995.

Crosland-Taylor, P. J., "A Device For Counting Small Particles Suspended In A Fluid Through A Tube," Nature, vol. 171, pp. 37-38, Jan. 3, 1953.

Delisa, Matthew P. et al., "Mapping Stress-Induced Changes In Autoinducer AI-2 Production In Chemostat-Cultivated *Escherichia coli* K-12," Journal of Bacteriology, vol. 183, No. 9, pp. 2918-2928, May 2001.

Effenhauser, Carlo S. et al., "Miniaturizing A Whole Analytical Laboratory Down To Chip Size," American Laboratory, vol. 26, No. 14, pp. cover, 15, 16, 18, 1994.

Effenhauser, Carlo S., "Integrated Chip-Based Microcolumn Separation Systems," Topics in Current Chemistry, vol. 194, pp. cover, 52-82, 1998.

Felix, Arthur M. et al., "Pegylated Peptides IV—Enhanced Biological Activity Of Site-Directed Pegylated GRF Analogs," International Journal of Peptide & Protein Research, vol. 46, pp. 253-264, 1995.

Felix, Arthur M., "Site-Specific Poly(ethylene glycol)ylation Of Peptides," Poly(Ethylene Glycol) Chemistry and Biological Applications, ACS Symposium Series 680, pp. 2 cover pages, 218-238, 1997.

Geng, Xindu et al., "Retention Model For Proteins In Reversed-Phase Liquid Chromatography," Journal of Chromatography, vol. 296, pp. 15-30, 1984.

Giusti, Alan et al., "Application Of Deoxyribonucleic Acid (DNA) Polymorphisms To The Analysis Of DNA Recovered From Sperm," Journal of Forensic Sciences, vol. 31, No. 2, pp. 409-417, Apr. 1986.

Gombotz, W. R. et al., "Pegylation: A Tool To Enhance Protein Delivery," Abstracts of Papers, American Chemical Society, vol. 217, Part 2, 2 pages, Mar. 21-25, 1999.

Gonzalez, Jesus E. et al., "Improved Indicators Of Cell Membrane Potential That Use Fluorescence Resonance Energy Transfer," Chemistry & Biology, vol. 4, No. 4, pp. 269-277, Apr. 1997.

Guerra, Patricia I. et al., "PEGylation Prevents The N-Terminal Degradation Of Megakaryocyte Growth And Development Factor," Pharmaceutical Research, vol. 15, No. 12, pp. 1822-1827, 1998.

Hancock, Robert E. W., "A Brief On Bacterial Biofilms," Nature Genetics, vol. 29, p. 360, Dec. 2001.

Hanes, Jozef, et al., "In Vitro Selection And Evolution Of Functional Proteins By Using Ribosome Display," Proc. Natl. Acad. Sci. USA, vol. 94, pp. 4937-4942, May 1997.

Harrison, D. Jed et al., "Integration Of Analytical Systems Incorporating Chemical Reactions And Electrophoretic Separation," Micro Total Analysis Systems, Proceedings of the μTAS '94 Workshop, University of Twente, The Netherlands, pp. 2 cover pages and 105-111, 1995.

Heo, Jinseok et al., "A Microfluidic Bioreactor Based On Hydrogel-Entrapped *E. coli*: Cell Viability, Lysis, and Intracellular Enzyme Reactions," Analytical Chemistry, vol. 75, No. 1, pp. 22-26, Jan. 1, 2003.

Herbert, D. et al., "The Continuous Culture Of Bacteria; A Theoretical And Experimental Study," J. Gen. Microbiol., vol. 14, pp. 601-622, 1956.

Herbert, D., "Continuous Culture Of Bacteria," The Journal of General Microbiology, vol. 15, pp. 2 cover pages and iv, 1956.

Herbert, D., "Continuous Fermentation," Chemistry and Industry, pp. 381, Mar. 29, 1958.

Hermanson, Greg T. et al., "Chapter 2—Activation Methods," Immobilized Affinity Ligand Techniques, Academic Press, pp. 2 cover pages, 51-136, 1992.

Hoffmuller, Ulrich et al., "In Vitro Evolution And Selection Of Proteins: Ribosome Display For Larger Libraries," Angew. Chem. Int. Ed., vol. 37, No. 23, pp. 3241-3243, 1998.

Ingraham, John L. et al., Growth Of The Bacterial Cell, pp. 3 cover pages and 230, 1983.

Jacobson, Ken et al., "International Workshop On The Application Of Fluorescence Photobleaching Techniques To Problems In Cell Biology," Federation Proceedings, vol. 42, No. 1, pp. 72-79, Jan. 1983.

Jacobson, Stephen C. et al., "Open Channel Electrochromatography On A Microchip," Analytical Chemistry, vol. 66, No. 14, pp. 2369-2373, Jul. 15, 1994.

Jannasch, H. W. et al., "Experimental Bacterial Ecology Studied In Continuous Culture," Advances in Microbial Physiology, vol. 11, pp. cover and 165-212, 1974.

Jeffreys, Alec J. et al., "Hypervariable 'Minisatellite' Regions In Human DNA," Nature, vol. 314, pp. 67-73, Mar. 7, 1985.

Jermutus, Lutz, et al., "Recent Advances In Producing And Selecting Functional Proteins By Using Cell-Free Translation," Current Opinion in Biotechnology, vol. 9, pp. 534-548, 1998.

Ju, Li-Ya et al., "Application Of Silver Staining To The Rapid Typing Of The Polymorphism Of HLA-DQ Alleles By Enzymatic Amplification and Allele-Specific Restriction Fragment Length Polymorphism," Electrophoresis, vol. 12, pp. 270-273, 1991.

Kamentsky, Louis A. et al., "Spectrophotometer: New Instrument For Ultrarapid Cell Analysis," Science, vol. 150, pp. 630-631, Oct. 29, 1965.

Kanter, Evan et al., "Analysis Of Restriction Fragment Length Polymorphisms In Deoxyribonucleic Acid (DNA) Recovered From Dried Bloodstains," Journal of Forensic Sciences, vol. 31, No. 2, pp. 403-408, Apr. 1986.

Kodera, Yoh et al., "Pegylation Of Proteins And Bioactive Substances For Medical And Technical Applications," Prog. Polym. Sci., vol. 23, pp. 1233-1271, 1998.

Lane, P. G., "Analysis Of A Continuous-Culture Technique For The Selection Of Mutants Tolerant To Extreme Environmental Stress," Biotechnology and Bioengineering, vol. 65, No. 4, pp. 397-406, Nov. 20, 1999.

Lawrence, J. R. et al., "Optical Sectioning Of Microbial Biofilms," Journal of Bacteriology, vol. 173, No. 20, pp. 6558-6567, Oct. 1991.

Lee, L. Stafford et al., "Prolonged Circulating Lives Of Single-Chain Fv Proteins Conjugated With Polyethylene Glycol: A Comparison Of Conjugation Chemistries And Compounds," Bioconjugate Chem., vol. 10, pp. 973-981, 1999.

Levine, Leanna M. et al., "Measurement Of Specific Protease Activity Utilizing Fluorescence Polarization," Analytical Biochemistry, vol. 247, pp. 83-88, 1997.

Llopis, Juan et al., "Ligand-Dependent Interactions Of Coactivators Steroid Receptor Coactivator-1 And Peroxisome Proliferator-Activated Receptor Binding Protein With Nuclear Hormone Receptors Can Be Imaged In Live Cells And Are Required For Transcription," PNAS, vol. 97, No. 8, pp. 4363-4368, Apr. 11, 2000.

Marešová, H. et al., "A Chemostat Culture As A Tool For The Improvement Of A Recombinant *E. coli* Strain Over-Producing Penicillin G Acylase," Biotechnology And Bioengineering, vol. 75, No. 1, pp. 46-52, Oct. 5, 2001.

Mason, T. G. et al., "Shear Rupturing Of Droplets In Complex Fluids," Langmuir, vol. 13, pp. 4600-4613, 1997.

Mastrangelo, C. H. et al., "Vacuum-Sealed Silicon Micromachined Incandescent Light Source," IEDM, pp. 503-506, 1989.

Maule, John, "Pulsed-Field Gel Electrophoresis," Molecular Biotechnology, vol. 9, pp. 107-126, 1998.

Menchen, Steve et al., "Flowable Networks As DNA Sequencing Media In Capillary Columns," Electrophoresis, vol. 17, pp. 1451-1459, 1996.

Moldavan, Andrew, "Photo-Electric Technique For The Counting Of Microscopical Cells," Science, vol. 80, No. 2069, pp. 188-189, Aug. 24, 1934.

Monod, Jacques, "The Growth Of Bacterial Cultures," Annual Review of Microbiology, vol. III, pp. cover and 371-394, 1949.

Murray, Vincent et al., "Detection Of Polymorphisms Using Thermal Cycling With A Single Oligonucleotide On A DNA Sequencing Gel," Human Mutation, vol. 2, pp. 118-122, 1993.

Nagai, Yasuo et al., "A Fluorescent Indicator For Visualizing cAMP-Induced Phosphorylation In Vivo," Nature Biotechnology, vol. 18, pp. 313-316, Mar. 2000.

Nakamura, Yusuke et al., "Variable Number Of Tanden Repeat (VNTR) Markers For Human Gene Mapping," Science, vol. 235, pp. 1616-1622, Mar. 27, 1987.

Nielsen, Jens et al., Bioreaction Engineering Principles, Second Edition, pp. 2 cover pages and 42-45, 2003.

Novick, Aaron et al., "Description Of The Chemostat," Science, vol. 112, pp. 715-716, Dec. 15, 1950.

Novick, Aaron et al., "Experiments With The Chemostat On Spontaneous Mutations Of Bacteria," Proc. N. A. S., vol. 36, pp. 708-719, 1950.

O'Reilly, Marie-Anne J. et al., "The Technique Of Pulsed Field Gel Electrophoresis And Its Impact On Molecular Immunology," Journal of Immunological Methods, vol. 131, pp. 1-13, 1990.

Parker, Gregory J. et al., "Development Of High Throughput Screening Assays Using Fluorescence Polarization: Nuclear Receptor-Ligand-Binding And Kinase/Phophatase Assays," Journal of Biomolecular Screening, vol. 5, No. 2, pp. 77-88, 2000.

Poplawski, M. E. et al., "A Simple Packaging Process For Chemical Sensors," Solid-State Sensor and Actuator Workshop, Hilton Head, South Carolina, pp. 25-28, Jun. 13-16, 1994.

Qu, Mingbo et al., "Toxicity And Biodegradation Of Formaldehyde In Anaerobic Methanogenic Culture," Biotechnology and Bioengineering, vol. 55, No. 5, pp. 727-736, Sep. 5, 1997.

Roberts, Richard W. et al., "RNA-Peptide Fusions For The In Vitro Selection Of Peptides And Proteins," Proc. Natl. Acad. Sci. USA, vol. 94, pp. 12297-12302, Nov. 1997.

Rotman, Boris, "A Simplified Device For Continuous Growth Of Microorganisms," Journal of Bacteriology, vol. 70, pp. 485-486, 1955.

Rouhi, Maureen, "Sizing, Sorting DNA One Piece At A Time," C&EN, pp. 5-6, Jan. 11, 1999.

Seethala, Ramakrishna et al., "A Fluorescence Polarization Competition Immunoassay For Tyrosine Kinases," Analytical Biochemistry, vol. 255, pp. 257-262, 1998.

Shuler, Michael L. et al., "Chapter 6—How Cells Grow," Bioprocess Engineering Basic Concepts, Second Edition, pp. 2 cover pages and 155-200, 2002.

Sklar, Larry A. et al., Sample Handling For Kinetics And Molecular Assembly In Flow Cytometry, SPIE, vol. 3256, pp. 144-153, 1998.

Spicer, C. C., "The Theory Of Bacterial Constant Growth Apparatus," Biometrics, pp. 225-230, Jun. 1955.

Swart, Remco et al., "Recent Progress In Open Tubular Liquid Chromatography," Trends in Analytical Chemistry, vol. 16, No. 6, pp. 332-342, 1997.

Takahashi, Akiyuki et al., "Measurement Of Intracellular Calcium," Physiological Reviews, vol. 79, No. 4, pp. 1089-1125, Oct. 1999.

Tatari, Zohreh et al., "HLA-Cw Allele Analysis By PCR-Restriction Fragment Length Polymorphism: Study Of Known And Additional Alleies," Proc. Natl. Acad. Sci. USA, vol. 92, pp. 8803-8807, Sep. 1995.

Tawfik, Dan S. et al., "Man-Made Cell-Like Compartments For Molecular Evolution," Nature Biotechnology, vol. 16, pp. 652-656, Jul. 1998.

Taylor, Anne M. et al., "Microfluidic Multicompartment Device For Neuroscience Research," Langmuir, vol. 19, pp. 1551-1556, 2003.

Terry, Stephen C. et al., "A Gas Chromatographic Air Analyzer Fabricated On A Silicon Wafer," IEEE Transactions on Electron Devices, vol. ED-26, No. 12, pp. 1880-1886, Dec. 1979.

Todd, Paul et al., "Chapter 12—Cell Electrophoresis," Flow Chemistry and Sorting, John Wiley & Sons, pp. 5 cover pages and 217-229, 1979.

Umdanhowar, P. B. et al., "Monodisperse Emulsion Generation Via Drop Break Off In A Coflowing Stream," Langmuir, vol. 16, pp. 347-351, 2000.

Vahey, Paul G. et al., "Development Of A Positive Pressure Driven Micro-Fabricated Liquid Chromotographic Analyzer Through Rapid-Prototyping With Poly(dimethylsiloxane) Optimizing Chromatographic Efficiency With Sub-Nanoliter Injections," Talanta, vol. 51, pp. 1205-1212, 2000.

Van Dilla, M. A. et al., "Cell Microfluorometry: A Method For Rapid Fluorescence Measurement," Science, vol. 163, pp. 1213-1214, Mar. 14, 1969.

Veronese, F. M. et al., "Influence Of PEGylation On The Release Of Low And High Molecular-Weight Proteins From PVA Matrices," Journal of Bioactive and Compatible Polymers, vol. 14, pp. 315-330, Jul. 1999.

Veronese, Francesco M., "Peptide And Protein PEGylation: A Review of Problems And Solutions," Biomaterials, vol. 22, pp. 405-417, 2001.

Vogelstein, Bert et al., "Digital PCR," Proc. Natl. Acad. Sci. USA, vol. 96, pp. 9236-9241, Aug. 1999.

Volkmuth, W. D. et al., "DNA Electrodiffusion In A 2D Array Of Posts," Physical Review Letters, vol. 72, No. 13, pp. 2117-2120, Mar. 28, 1994.

Volkmuth, W. D. et al., "DNA Electrophoresis In Microlithographic Arrays," Nature, vol. 358, pp. 600-602, Aug. 13, 1992.

Ward, Keith B. et al., "Automatic Preparation Of Protein Crystals Using Laboratory Robotics And Automated Visual Inspection," Journal of Crystal Growth, vol. 90, pp. 325-339, 1988.

Webster, J. R. et al., "Monolithic Capillary Gel Electrophoresis Stage With On-Chip Detector," IEEE, pp. 491-496, 1996.

Whelen, A. Christian et al., "The Role of Nucleic Acid Amplification And Detection In The Clinical Microbiology Laboratory," Annu. Rev. Microbiol., vol. 50, pp. 349-373, 1996.

Wiebe, Marilyn G. et al., "Evolution Of A Recombinant (Gucoamylase-Producing) Strain Of *Fusarium venenatum* A3/5 In Chemostat Culture," Biotechnology and Bioengineering, vol. 73, No. 2, pp. 146-156, Apr. 20, 2001.

Wu, Chunhung et al., "Viscosity-Adjustable Block Copolymer For DNA Separation By Capillary Electrophoresis," Electrophoresis, vol. 19, pp. 231-241, 1998.

Xu, Xiang et al., "Detection Of Programmed Cell Death Using Fluorescence Energy Transfer," Nucleic Acids Research, vol. 26, No. 8, pp. 2034-2035, 1998.

Zaccolo, Manuela et al., "A Genetically Encoded, Fluorescent Indicator For Cyclic AMP In Living Cells," Nature Cell Biology, vol. 2, pp. 25-29, Jan. 2000.

Zalipsky, Samuel, "Chemistry Of Polyethyelene Glycol Conjugates With Biologically Active Molecules," Advanced Drug Delivery Reviews, vol. 16, pp. 157-182, 1995.

Zdeblick, Mark J. et al., "A Microminiature Electric-To-Fluidic Valve," Transducers '87, Proceedings of the 4th International Conference on Solid-State Sensors and Actuators, reprinted in Micromechanics and MEMS Classic and Seminal Papers to 1990, pp. 2 cover pages, 437-439, Jun. 1987.

\* cited by examiner

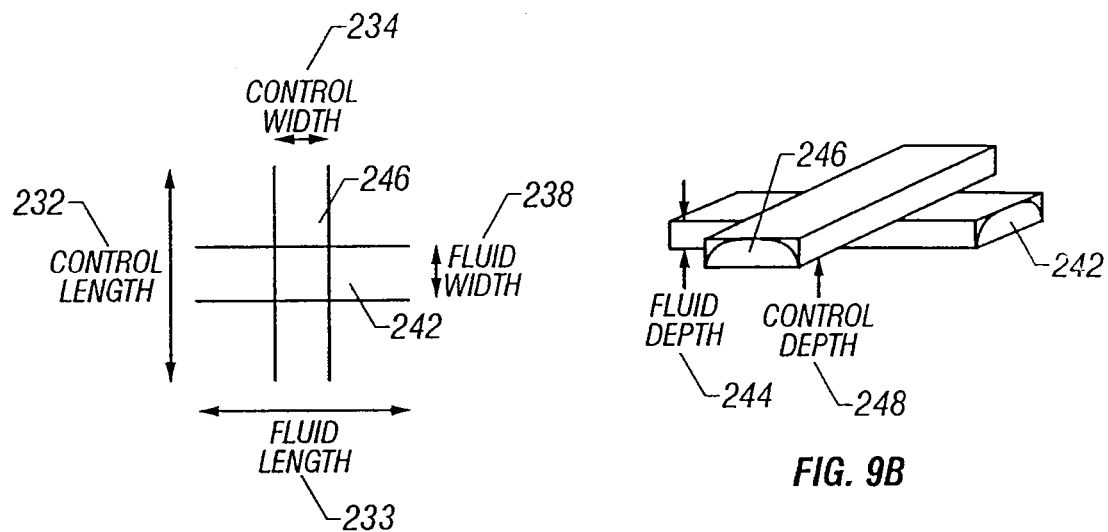
FIG. 9A
FIG. 9B
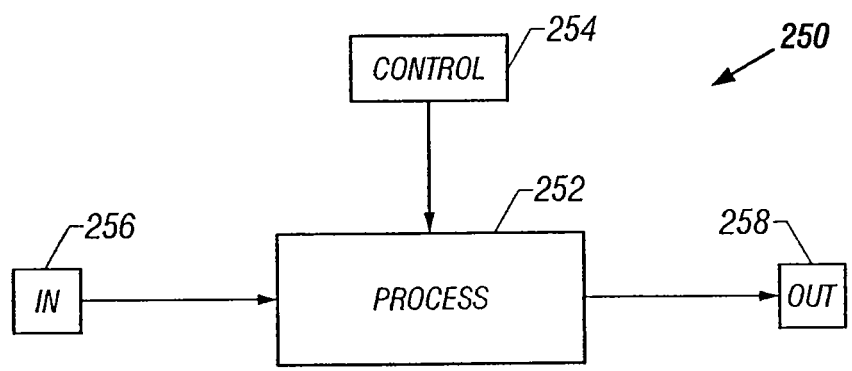
FIG. 10
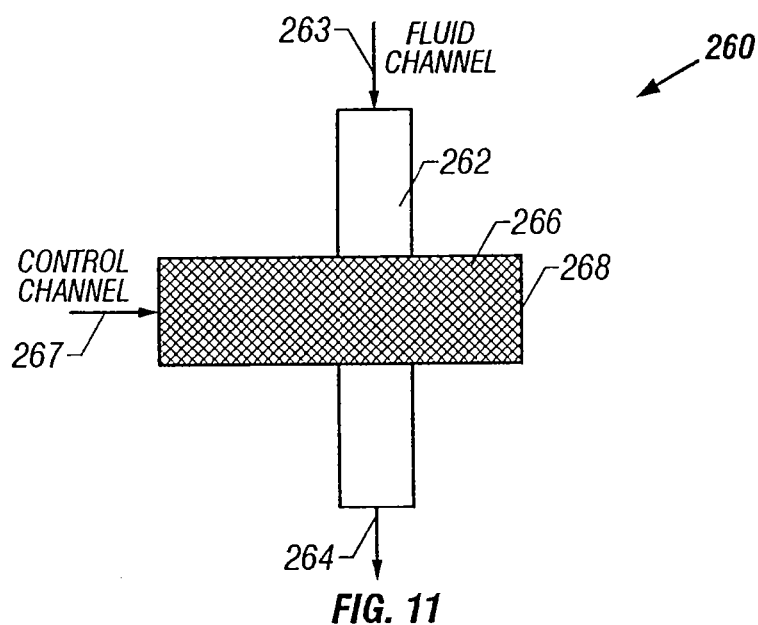
FIG. 11 a b c d e f

FIG. 17B  FIG. 18A

MICROFLUIDIC DESIGN AUTOMATION METHOD AND SYSTEM

CROSS-REFERENCES TO RELATED APPLICATIONS

This application is a division of U.S. patent application Ser. No. 09/894,857, now U.S. Pat. No. 6,829,753, filed Jun. 27, 2001, which claims the benefit of and incorporates by reference in its entirety U.S. Provisional Patent Application No. 60/214,595, filed Jun. 27, 2000.

This application also incorporates herein by reference in their entirety: U.S. patent application Ser. No. 09/894,862, now U.S. Pat. No. 7,062,418, and U.S. patent application Ser. No. 09/894,858, now U.S. Pat. No. 6,885,982, both filed Jun. 27, 2001.

The following applications are also incorporated herein by reference, each in its entirety:

PCT Patent Application No. PCT/US00/17740, filed Jun. 27, 2000 (U.S. patent application Ser. No. 09/605,520);

PCT Patent Application No. PCT/US99/13050, filed May 21, 1999; and

U.S. Provisional Patent Application No. 60/282,253, filed Apr. 6, 2001.

BACKGROUND OF THE INVENTION

The present invention generally relates to microfluidics and more particularly to the design of customized microfluidic systems using a microfluidic computer aided design system. Such customized microfluidic systems may be used, for example, for fluid analysis of biological samples.

Typically microfluidic systems for processing fluid samples employ a series of chambers each configured for subjecting the fluid sample to a specific processing step. As the fluid sample flows through the system sequentially from chamber to chamber, the fluid sample undergoes the processing steps according to a specific protocol. Because different protocols require different configurations, the design and manufacturing of such microfluidic systems can be time-consuming and costly.

Conventional computer aided design tools such as AutoCAD® are inadequate for the design and layout of microfluidic systems. For instance, AutoCAD® is a general tool, and has no drawing constraints and provides no specific microfluidic design information associated with a component.

Thus there is a need for computerized design techniques which allow the quick and easy formation of microfluidic systems with different configurations and utilizing different protocols.

SUMMARY OF THE INVENTION

The present invention provides for the design of a microfluidic system, including a microfluidic chip or circuit, using a microfluidic computer aided design (CAD) system. The microfluidic CAD system, henceforth referred to as the "MCAD" system, provides the user with the tools to design, analyze, and implement a customized microfluidic system using a plurality of building block microfluidic components. The MCAD system overcomes the disadvantages of conventional CAD tools by providing, for instance, drawing constraints, design information associated with components, I/O ports, and connectivity to I/O ports, as well as easy layout and manipulation of multilayered components.

In one embodiment the microfluidic system may include a network of single or multi-layer elastomeric structures. In an alternate embodiment some or all the structures may include rigid materials (e.g., silicon-based materials). In yet another embodiment some of the structures may include a mixture of flexible materials, (e.g., elastomeric materials) with the rigid material. Utilization of such an MCAD system can lead to quick and easy implementation of simple to highly complex networks for use in general microfluidic transfer control systems, biological diagnostics systems, etc.

In one embodiment of the present invention a microfluidic device or chip is created from a plurality of microfluidic components according to a design. First a template is selected. Next, the components are placed on the template, manually or automatically, using a placement tool. The components include multilayered components. The components are then routed, manually or automatically, using a routing tool based on preset design rule constraints to achieve a physical layout. Functional analysis (e.g., logical microfluidic flow simulation) and/or physical analysis, (e.g., dynamic microfluidic flow simulation) may then be performed on the physical layout. Following the optional functional analysis and/or physical analysis, the physical layout is used to create the chip layout file, which is later used for fabricating the microfluidic device or chip. In one embodiment of the present invention a microfluidic circuit design method is provided. The method includes developing synthesizable computer code for a design. Next, a microfluidic circuit schematic, including a plurality of symbols for microfluidic components, is generated either interactively or using the synthesizable computer code. A symbol may include at least one control channel and at least one fluid channel. The microfluidic circuit schematic is then functionally simulated. The microfluidic components are placed and routed on a template to form a physical layout. Then the physical layout is physically simulated using dynamic simulation models of the microfluidic components; and the physical layout is written to a layout file.

Another embodiment of the present invention provides a microfluidic circuit design system including one or more of the following: a synthesis module for synthesizing software of a design into a schematic having a plurality of connected symbols of microfluidic components; a design capture module for displaying and manipulating the schematic; a functional analysis module for functionally simulating selected microfluidic components of the schematic; a physical implementation module for placing and routing the microfluidic components into a physical layout according to the design; and a physical analysis module for physically simulating the components in the physical layout.

Another embodiment of the present invention is directed to a method, using a physical layout system, for laying out a microfluidic circuit including a plurality of microfluidic components, where the microfluidic components include multi-layered components. The method includes: placing a first component of the plurality of microfluidic components; placing a second component of the plurality of microfluidic components; and connecting the first component to the second component.

In another embodiment of the present invention a method is provided, using a computer system, for physically laying out a microfluidic circuit including a plurality of microfluidic components. The method includes: selecting a template; placing a first microfluidic component with an associated property, such as physical scaling, physical property, layer assignment, equations of motion, simulation data, macro logic functions, or functional definition, on the template; placing a second microfluidic component on the template; and connecting the first component to the second component. The connecting may include a design rule check.

In yet another embodiment of the present invention a microfluidic circuit physical layout method, using a computer, is provided. The method includes: selecting a template including an I/O port; placing a microfluidic component on the template, wherein the microfluidic component has a component control channel and a component fluid channel; and connecting the component control channel to the I/O port.

Another embodiment of the present invention includes a method for physical layout of a microfluidic system using a computer aided design tool. The microfluidic system includes a plurality of microfluidic components. First, a template is selected, including a plurality of layers. Next, a first symbol representing a first component of the plurality of microfluidic components is placed. The first symbol includes a first fluid channel symbol and a first control channel symbol. The first control channel symbol and the first fluid channel symbol are on different layers. Next, a second symbol representing a second component of the plurality of microfluidic components is placed. The second symbol includes a second fluid channel symbol. The first fluid channel symbol is connected or routed to the second fluid channel symbol.

An embodiment of the present invention provides a method for validating a physical layout of a microfluidic circuit design including a plurality of microfluidic components, the method includes placing and routing the plurality of microfluidic components on a template to form the physical layout of the microfluidic circuit design. Next, a dynamic simulation model is determined for each component of the plurality of microfluidic components on the template. Using the physical layout and dynamic simulation models for the plurality of microfluidic components, the physical layout is physically simulated.

An embodiment of the present invention provides a method for device implementation of a microfluidic circuit including a plurality of microfluidic components. The method includes placing and routing the plurality of microfluidic components on a template to form a physical layout of the microfluidic circuit design. Then the physical layout is written to a layout file to be used for manufacturing. Next, a mask is created for a die of a plurality of dies using the layout file, where the die includes the physical layout. The plurality of dies on a wafer are laid out, where the mask creates the die on the wafer.

An advantage of the present invention is the reduction in time needed to complete the design and implementation of a microfluidic circuit. For example, in one embodiment of the present invention, synthesis, schematic capture, and functional simulation allow an efficient and expedient process of creating and validating an initial design, the physical layout tool allows easy placement and routing of multilayered components on a predefined template, the physical simulation allows the reduction in errors before fabrication, and the die placement tool allows faster wafer mask generation.

The uses and results generated by the present invention include cell based assays (including micro cell sorting, genomic analysis, such as DNA sizing, hybridization, sequencing, quantification, and amplification); protein analysis, crystallization and purification; MS-interface; biochemical and electrophysiological assays, gene expressions; differential display analysis; integrated biological sample preparation; single molecule analysis; drug delivery; diagnostics; and other uses and products related to the chemical, biochemical, biological, electronic, computer, appliance, pharmaceutical, medical, or power industries.

These and other embodiments of the present invention are described in more detail in conjunction with the text below and attached figures.

BRIEF DESCRIPTION OF THE DRAWINGS

FIGS. 9a and 9b show simplified top plan view and perspective view of an on-off valve component of an embodiment of the present invention;

FIG. 10 shows an IDEF0 diagram representing a microfluidic component of an embodiment of the present invention;

FIG. 11 shows a microfluidic valve symbol of an embodiment of the present invention;

FIG. 17B shows a symbol for an interconnect bridge of one embodiment of the present invention;

FIG. 18A shows a simplified view of a crossing of two channels located on the same layer;

DESCRIPTION OF THE SPECIFIC EMBODIMENTS

Figure 1:
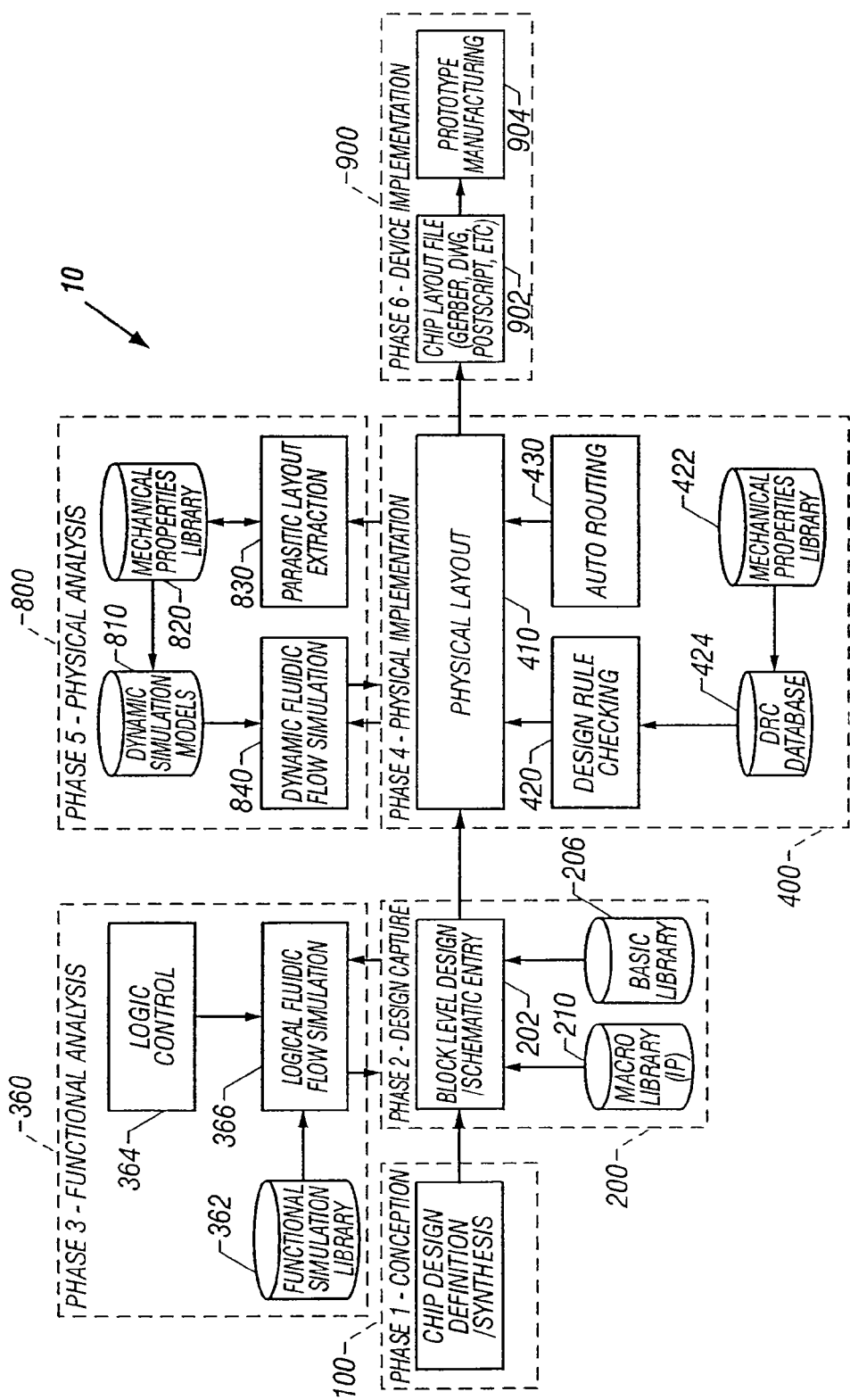
FIG. 1 shows a simplified block diagram of the MCAD system of an embodiment of the present invention.

Embodiments of the present invention are directed to the design of customized microfluidic systems using a microfluidic computer aided design (MCAD) system. The MCAD system provides the user with the tools to design, analyze, and implement a customized microfluidic system using a plurality of building block microfluidic components.

In one embodiment of the invention, the MCAD system includes a design capture module including a schematic entry tool for selecting and connecting microfluidic components according to a design. The system further includes a functional analysis module for functionally simulating selected microfluidic components of the design, a physical implementation module for arranging the microfluidic components into a physical layout according to the design, and a physical analysis module for physically simulating the microfluidic components in the physical layout.

In some embodiments, the modules comprise computer instructions or code stored in a computer-readable medium. The computer-readable medium is operatively coupled to a network (e.g., an internal computer bus, an external Local Area Network (LAN), or the Internet) to permit access to the instructions via the network.

The microfluidic components may be selected from a library or libraries having, for example, channels, pumps, valves, chambers, and layer interconnects (or vias). The library or libraries include normalized, custom, pre-defined, and/or user-defined, microfluidic components. The microfluidic components are connected according to preset design rules. The microfluidic components may be assigned physical scaling and physical properties. The selected components are typically active fluidic components.

The microfluidic components may include conventional microfluidic structures composed of hard, inflexible materials (such as silicon) or microfluidic structures made out of various layers of elastomer bonded together. An embodiment of the present invention uses a multi-layer soft lithography process to build integrated (i.e., monolithic) microfabricated elastomeric structures. Advantages of fabricating the elastomeric structures by binding together layers of soft elastomeric materials include the fact that the resulting devices are reduced by more than two orders of magnitude in size as compared to silicon-based devices. Further advantages of rapid prototyping, ease of fabrication, and biocompatibility are also achieved. Further details may be found in PCT Patent Application No. PCT/US00/17740, entitled "Microfabricated Elastomeric Valve And Pump Systems," filed Jun. 27, 2000; Hou-Pu Chou et al., "Integrated Elastomer Fluidic Lab-on-a-chip—Surface Patterning and DNA Diagnostics," Proceedings of the Solid State Actuator and Sensor Workshop, Hilton Head, S.C. (2000); Stephen R. Quake and Axel Scherer, "From Micro- to Nanofabrication with Soft Materials," Science 290: 153640 (2000); and M. A. Unger et al., "Monolithic Microfabricated Valves and Pumps by Multilayer Soft Lithography," Science 288: 113-116 (2000). These are incorporated herein by reference each in its entirety.

The selected microfabricated components of the design may be functionally simulated by applying control stimuli to the control channels of selected active fluidic components to show functional connectivity of the design. In one embodiment of the functional simulation, components of the design are represented by Boolean expressions with operands based on connection ports of the control channels of the active fluidic components. Actuation of the active fluidic components is simulated using control stimulus generated by a Boolean based language with timing constraints. The design may be modified based on results of the functional simulation.

The microfluidic components in the physical layout may be physically analyzed. The physical analysis may include, for instance, analyzing dynamic volumetric flow rates in the components, analyzing component volumes, and analyzing volumetric capacitances of interconnecting and routing channels in the physical layout. Physically simulating the components of the physical layout may include simulating actuation of dynamic fluid flow in the components using control stimulus generated by a Boolean based language. The physical layout may be modified based on results of the physical simulation. The physical layout may be written to a layout file to be used for manufacturing.

For the purposes of this application a channel, for example, a control channel or a fluid/fluidic channel, may contain either a gas or a liquid. In one embodiment the control layer has pressurized air and the fluid layer has a liquid substance. Other embodiments have other combinations of gas-gas, liquid-gas, or liquid-liquid in two or more channels.

FIG. 1 shows a simplified block diagram of the MCAD system 10 of an embodiment of the present invention. There are four primary phases (phases 1, 2, 4, and 6) and two secondary phases (phases 3 and 5). Design conception 100 is the first step (phase 1) where the desired functionality of the microfluidic circuit is determined. Once the functionality has been determined, the second primary step 200 (phase 2) is to capture the resulting circuit schematically using basic pre-defined components 206, macro components 210, or user-defined components. The components may be microfluidic multilayered structures with at least one control channel and at least one fluid channel, where the control channel controls the fluid (liquid or gas) flow through the fluid channel. These channels may contain either a liquid or a gaseous substance. The third primary step 400 (phase 4) is the physical implementation of the design and involves the physical layout (i.e., placing and routing the components making up the circuit) either manually or automatically, from a two and/or three dimensional perspective. The fourth, and final, primary step 900 (phase 6) is the actual creation of the microfluidic chip. The two optional secondary phases 360 and 800 are shown as well and are used at different points of the MCAD system 10. These secondary phases involve, respectively, the functional analysis and physical analysis of the described design and layout. Functional analysis 360 (phase 3) aides the designer in verifying the desired function or behavior of the design. Examples of functional analysis are connectivity analysis to determine if the components are connected together or control channel analysis to determine that the proper control channels are activated in the right sequence. Physical analysis 800 (phase 5) allows the designer to verify and analyze the dynamic performance of the design. While functional and physical analyses are not critical for simple low component count design, they become important for moderately complex to highly complex designs by minimizing the need to empirically test and redesign until the desired network is achieved.

Conception (Phase 1)

The microfluidic circuit or chip design begins with the conception 100 of the desired functionality, outputs, or results to be achieved by inputting fluids into the microfluidic circuit or chip (phase 1).

One specific embodiment employs a black box analysis in which the inputs and outputs are first determined. A computer program using a synthesis language may then be written to simulate the generation of the outputs from the inputs. The synthesis language can be run through a synthesis compiler to generate a microfluidic circuit having a plurality of interconnected microfluidic components or structures. The synthesis compiler may also optimize a part of or all of the microfluidic circuit according to some criteria, such as minimum area. In such an embodiment, the design capture (phase 2) in effect is automatically done by the synthesis tool with access to the macro library 210 and basic library 206.

A fluidic synthesis language is like a synthesis language in the electrical arts in that certain programming language constructs map to certain structures or combinations of structures. For example, in electronic circuit design, a Hardware Description Language (HDL), such as VHSIC HDL (VHDL) or Verilog, is used to simulate the behavior of a circuit design at an abstract level (e.g., at the Register Transfer Language (RTL) level). Then, the VHDL or Verilog code is used by a synthesis tool (e.g., a tool available from Synopsys Inc. of Mountain View, Calif.) to produce an optimized gate level description of the circuit. As a simple illustration the operators in Boolean logic, such as "not," "and," or "or," map to an inverter, AND gate, and OR gate. Thus a Boolean expression may be mapped (and optimized) to a respective set of hardware logic gates. In a more complicated example a "case statement" in VHDL may be synthesized into a gate level implementation of a Finite State Machine (FSM).

In an embodiment of the present invention various microfluidic structures or components represent various digital and analog functions. Examples are given in U.S. Provisional Patent Application Ser. No. 60/282,253, entitled "Microfabricated Fluidic Circuit Elements and Applications," filed Apr. 6, 2001, which is incorporated herein by reference in its entirety. Some of the microfluidic structures or components disclosed may be configured to imitate the functionality of semiconductor circuits, such as ON/OFF switches, resistors, capacitors, logic gates, latches, switching regulators, and devices that perform mathematical functions. The microfabricated fluidic logic gates include AND gates, OR gates, NOR gates, NAND gates, inverters, and numerous other Boolean and logic functions. In addition the microfluidic components may also perform analog functions such as amplification or regulation. For example, analog components include switching regulators, capacitors, pressure multipliers, and pressure sources.

Figure 2A:
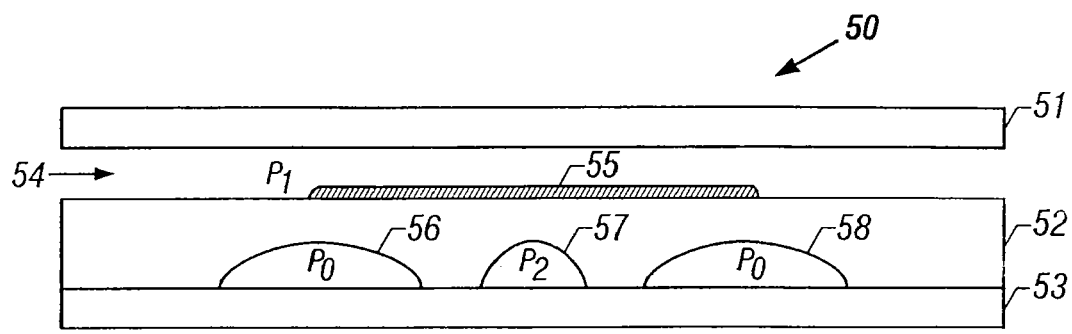
FIG. 2A is a simplified cross-sectional view of microfluidic switch along channel of an embodiment of the present invention.
Figure 2B:
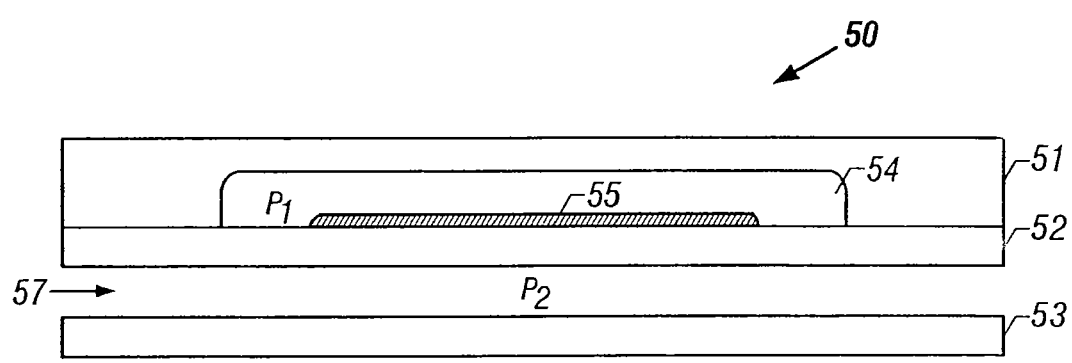
FIG. 2B is a simplified cross-sectional view of microfluidic switch along channel of an embodiment of the present invention.
Figure 3:
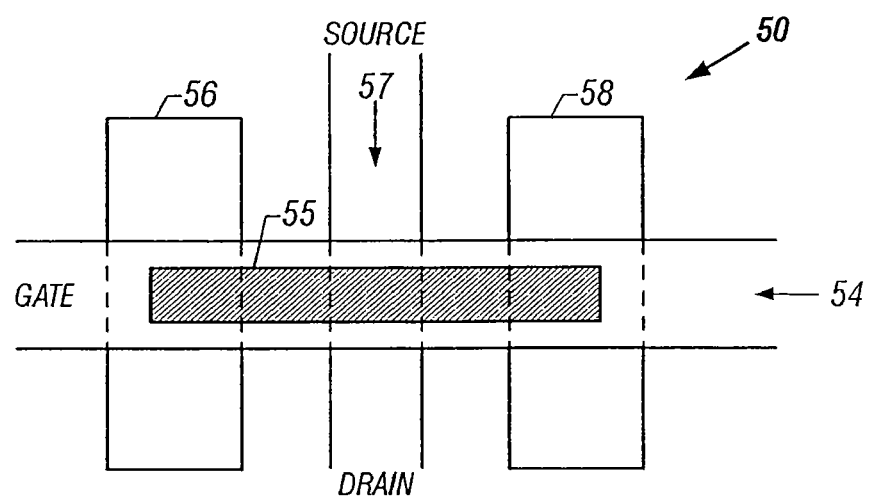
FIG. 3 is a simplified top down view of microfluidic switch of an embodiment of the present invention
Figure 5A:
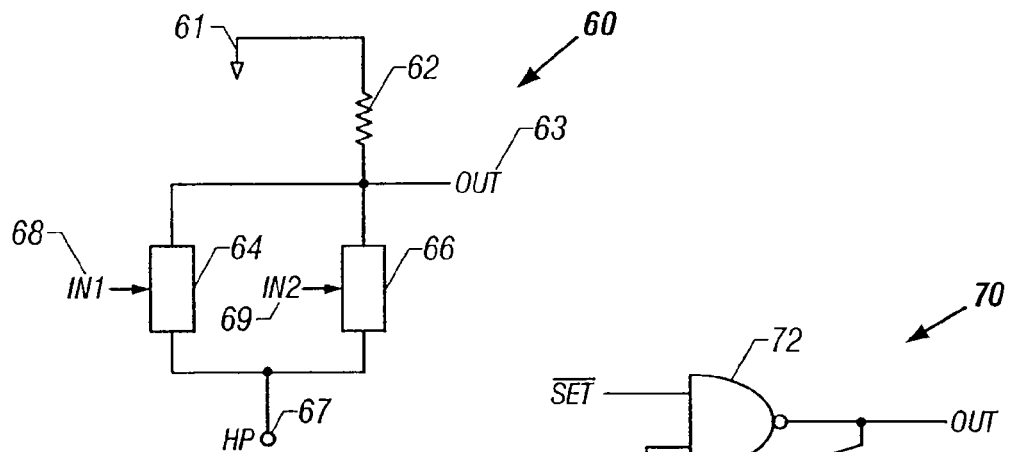
FIGS. 5A and 5B show an example of a microfluidic NAND gate of an embodiment of the present invention.
Figure 6A:
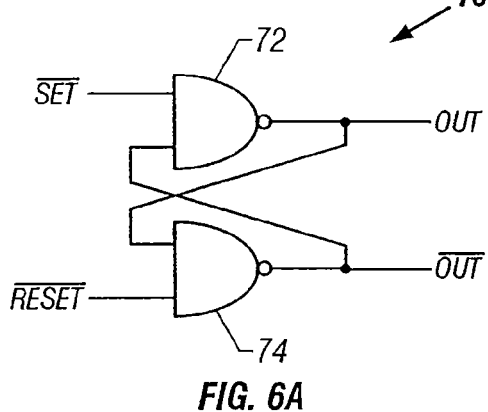
FIGS. 6A ands 6B show an example of a microfluidic S-R latch of an embodiment of the present invention.
Figure 5B:
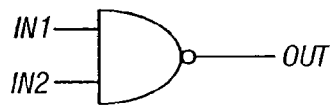
Figure 6B:
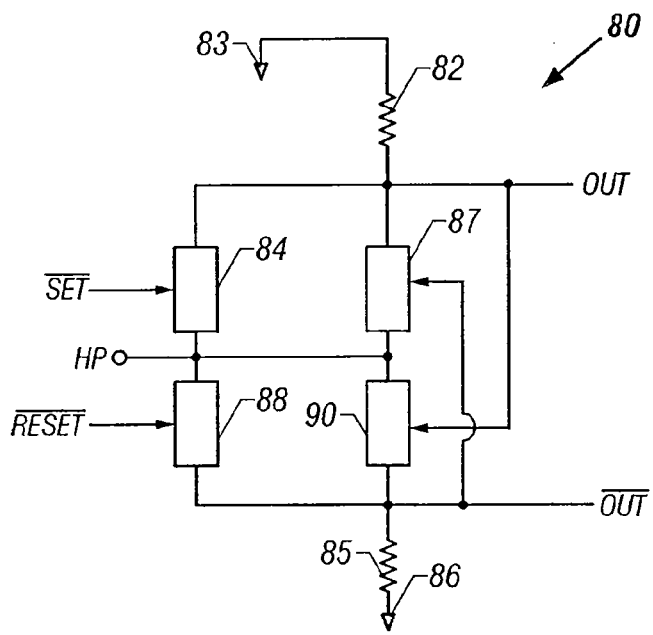

Microfluidic logic gates may perform the same Boolean logic function as electronic gates, but are substantially different both structurally and in the way they perform the logic function. As an illustration, FIGS. 2A, 2B, and 3 show the structure of a microfluidic ON/OFF switch. Symbols representing microfluidic devices are shown in FIGS. 4A-4K. FIG. 5A shows an example of a NAND gate. FIG. 6B shows an example of an S-R latch. FIGS. 5B and 6A show the symbols for the NAND gate and S-R latch.

A microfluidic ON/OFF switch is "open" during its ON state allowing fluid (liquid or gas) flow through the channel between the source and the drain. A fluidic switch is "closed" during its OFF state preventing fluid (liquid or gas) flow through the channel between the source and the drain. Microfluidic switches are opened and closed by changing the pressure in the gate of the switch either by liquid or gas pressure. The pressure in the gate of the switch does not need to be increased above or reduced below the pressure in the drain-to-source channel. This provides an advantage over prior art, because microfluidic switches of this embodiment of the present invention can be coupled together to control each other on a single chip to perform complex logic, mathematical, multiplexing, and latching functions.

An embodiment of a microfluidic switch is shown in FIGS. 2A-2B and 3. FIG. 2A is a cross-sectional view of microfluidic switch 50 along channel 54; FIG. 2B is a cross-sectional view of microfluidic switch 50 along channel 57; and FIG. 3 is a top plan view of microfluidic switch 50. Microfluidic switch 50 includes substrate 53, elastomeric layer 52, and elastomeric layer 51 as shown in FIG. 2A. As seen in FIG. 3, elastomeric layer 51 contains channel 54, and elastomeric layer 52 contains channel 57 and chambers 56 and 58. Channel 54 is coupled to the gate of the switch 50. Channel 57 is coupled between the source and the drain of the switch 50. Layers 51-53 may be formed and hermetically sealed using methods described in further detail in PCT Patent Application No. PCT/US00/17740, entitled "Microfabricated Elastomeric Valve and Pump Systems," filed Jun. 27, 2000, which designates the United States and is incorporated herein by reference in its entirety.

Layer 55 comprises a rigid material that is deposited on top of layer 52. Layer 51 may then be placed on top of layer 52 so that layer 55 is inside channel 54. Layer 55 is deposited on layer 52 so that it overlaps channel 57 and portions of chambers 56 and 58 as shown in FIG. 3. A fluid is passed through channel 54 at pressure P1. A fluid is passed through channel 57 at pressure P2. Channel 54 is perpendicular to channel 57. Chambers 56 and 58 contain fluid at ambient pressure P0.

When the pressure P1 in channel 54 is increased above P0, the radius of channel 54 expands and rigid layer 55 moves downwardly (with respect to FIGS. 2A-2B) applying pressure against channel 57 and chambers 56 and 58. As P1 increases, layer 55 presses down on the portion of channel 57 beneath layer 55 pinching channel 57 closed. Channel 57 is concave in shape making it more collapsible so that channel 57 makes a complete seal to completely block the flow of fluid therethrough when P1 is increased to a predetermined level.

The microfabricated fluidic structure of FIGS. 2A-2B and FIG. 3 functions as a switch that causes channel 57 to be opened or closed. When pressure P1 equals P0, channel 57 is open and fluid can flow therethrough. When pressure P1 is increased to a predetermined level in channel 54, channel 57 closes and the flow of fluid through channel 57 is blocked. Therefore, a fluidic switch is open when fluid is allowed to flow through a specific channel and closed when the flow of fluid through that channel is blocked.

Chambers 56 and 58 reduce the upward force that elastomer material in layer 52 applies to layer 55 when channel 54 expands so that channel 57 closes more quickly and completely. When channel 54 expands to close channel 57, fluid is displaced from the area of chambers 56 and 58 directly beneath channel 54 into adjacent portions of chambers 56 and 58. Chambers 56 and 58 allow channel 57 to be closed without having to increase the pressure in gate channel 54 above the pressure in channel 57. Therefore, switch 50 may be coupled with other microfluidic switches to perform logic functions and other functions, because switch 50 does not require a pressure drop from the gate channel 54 to the source-to-drain channel 57.

Figure 4A:
FIGS. 4A-4K show symbols representing microfluidic devices of an embodiment of the present invention.
Figure 4G:
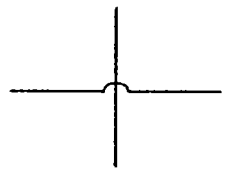
Figure 4B:
Figure 4H:
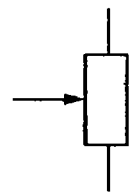
Figure 4C:
Figure 4I:
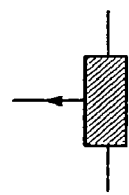
Figure 4D:
Figure 4E:
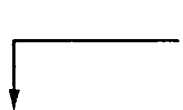
Figure 4J:
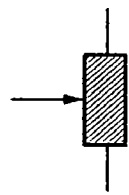
Figure 4F:

For illustrative purposes symbols representing a number of microfluidic devices are shown in FIGS. 4A-4K. The symbol of FIG. 4A represents a low flow resistance channel. The symbol of FIG. 4B represents a high flow resistance channel such as a long or a constricted channel. A fluidic resistor acts similarly to an electrical resistor. A fluidic resistor exists when there is a high pressure difference between two terminals and a low flow between them. The symbol of FIG. 4C represents a channel terminal. The symbol of FIG. 4D represents a high pressure source. The symbol of FIG. 4E represents an ambient exhaust terminal. The symbol of FIG. 4F represents a node where channels connect. The symbol of FIG. 4G represents two channels that cross but do not connect.

Figure 4K:
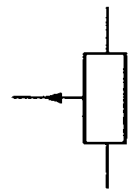

The symbol of FIG. 4H represents a pressure-actuated, normally open switch in which the pressure in the gate chamber is increased above ambient pressure to a high pressure in order to close the switch. The symbol of FIG. 4I represents a vacuum-actuated normally closed switch in which the pressure in the gate chamber is reduced from ambient pressure to a vacuum to open the switch. The symbol of FIG. 4J represents a pressure-actuated normally closed switch in which the pressure in the gate chamber is increased from ambient pressure to a high pressure to open the switch. The symbol of FIG. 4K represents a vacuum-actuated normally open switch in which the pressure in the gate chamber is reduced from ambient pressure to a vacuum to close the switch.

Some of the microfluidic devices of the present invention may be connected together to form logic gates that perform logic functions and Boolean algebra. Previously known microfluidic chips often perform logic functions off-chip using electrical circuitry and then route the output signal onto the microfluidic chip through macroscopic control lines which are cumbersome and take up a lot of space. Performing logic functions on chip using microfluidic logic gates can greatly reduce the number control lines routed onto the chip which advantageously saves space.

The bistable logic levels for the microfluidic logic gates are high pressure (HIGH) and low pressure (LOW). Each logic gate has a connection to a low pressure source (e.g., ambient pressure), and a connection to a high pressure source (e.g., higher than ambient pressure). In an alternate embodiment, each logic gate has a connection to ambient pressure and a connection to a vacuum. In this embodiment, LOW refers to the vacuum and HIGH refers to ambient pressure.

All Boolean functions can be constructed entirely from NAND gates or entirely from NOR gates. A NAND gate performs an AND function on a set of inputs and inverts the output. A NOR gate performs an OR function on a set of inputs and inverts the output.

An example of a NAND logic gate formed with microfabricated fluidic switches is shown in FIG. 5A. NAND gate 60 includes microfluidic resistor 62 which is coupled between an ambient exhaust terminal 61 and output terminal OUT 63. NAND gate 60 also includes pressure-actuated normally open microfluidic switches 64 and 66 which are coupled in parallel between OUT 63 and high pressure terminal HP 67. The gate of switch 64 is coupled to input terminal IN1 68, and the gate of switch 66 is coupled to input terminal IN2 69.

When either of inputs IN1 68 and IN2 69 is at ambient pressure (LOW), one of switches 64 or 66 is open, and fluid flows from the HP terminal 67 to the ambient exhaust 61 through the open switch(es) and resistor 62. The pressure at OUT 63 increases to high pressure (HIGH), because the resistance of resistor 62 is greater than the resistance of switches 64 and 66. When both inputs IN1 68 and IN2 69 are at high pressure (HIGH), both of switches 64 and 66 are closed and fluid flow to the HP terminal 67 is blocked. The pressure at OUT 63 diffuses through resistor 62 to the ambient exhaust terminal 61 causing the pressure at OUT 63 to decrease to ambient pressure (LOW).

A microfluidic NAND gate may comprise any number of input terminals greater than one. Each input terminal is coupled to the gate of a normally open switch coupled in parallel with switches 64 and 66 between OUT and the HP terminal. Of course, other configurations for the construction of NAND logic gates known to those of skill in the semiconductor circuit design art may be used to design a microfluidic NAND gate in which transistors are replaced with microfluidic switches. The symbol for a two input NAND gate is shown in FIG. 5B. The truth table for a two input NAND gate is shown in Table 1 below (wherein H denotes high pressure and L denotes low pressure):

TABLE 1

| IN1 | IN2 | OUT |
|---|---|---|
| H | H | L |
| H | L | H |
| L | H | H |
| L | L | H |

A microfluidic structure may also be used to construct Set-Reset (S-R) latches that have the same truth table as S-R latches constructed from electronic circuits. Latch 70 in FIG. 6A is one example of an S-R latch that is constructed with two cross-coupled NAND gates 72 and 74. NAND gate 72 has a first input terminal $\overline{SET}$ and a second input terminal coupled to the output terminal $\overline{OUT}$ of NAND gate 74. NAND 74 has a first input terminal $\overline{RESET}$ and a second input terminal coupled to the output terminal OUT of NAND gate 72.

Latch 70 operates as follows. A transitory LOW signal occurs when the $\overline{SET}$ or $\overline{RESET}$ input transitions from high pressure (HIGH) to ambient pressure (LOW) and then transitions back to high pressure (HIGH) again. When a transitory LOW occurs on the $\overline{SET}$ input, $\overline{OUT}$ goes HIGH and remains HIGH. When a transitory LOW signal occurs on the $\overline{RESET}$ input, $\overline{OUT}$ goes HIGH and remains HIGH. When the pressure at the $\overline{SET}$ and $\overline{RESET}$ inputs are both HIGH, outputs OUT and $\overline{OUT}$ remain in their previous states. An unstable condition exists at outputs OUT and $\overline{OUT}$ when the pressure at the $\overline{SET}$ and $\overline{RESET}$ inputs are both LOW.

An example of an S-R latch constructed with microfluidic cross-coupled NAND gates is shown in FIG. 6B. Latch 80 includes fluidic resistor 82 which is coupled between a first ambient exhaust terminal 83 and output terminal OUT, and fluidic resistor 85 which is coupled between a second ambient exhaust terminal 86 and output $\overline{OUT}$. Latch 80 also includes pressure-actuated normally open microfluidic switches 84 and 87 that are coupled in parallel between OUT and a high pressure terminal HP, and pressure-actuated normally open microfluidic switches 88 and 90 that are coupled in parallel between $\overline{OUT}$ and the HP terminal. The gate of switch 84 is coupled to input terminal $\overline{SET}$, the gate of switch 87 is coupled to the output terminal $\overline{OUT}$, the gate of switch 88 is coupled to input terminal $\overline{RESET}$, and the gate of switch 90 is coupled to output terminal OUT.

When the pressure at the $\overline{RESET}$ input remains HIGH and the pressure at the $\overline{SET}$ input transitions from HIGH to LOW, switch 88 is closed, switch 84 opens, and the pressure at $\overline{OUT}$ goes HIGH because it is coupled to the high pressure terminal HP through low resistance switch 84. Switch 90 is closed because $\overline{OUT}$ is HIGH, and the pressure at $\overline{OUT}$ goes LOW, because $\overline{OUT}$ is decoupled from the HP terminal. Switch 87 is open, because OUT is LOW. When the pressure at the $\overline{SET}$ input goes HIGH again, switch 84 closes. However, the pressure at OUT remains HIGH, because OUT is coupled to the HP terminal through switch 87 which remains open. The pressure at $\overline{OUT}$ remains LOW, because switch 90 remains closed.

When the pressure at the $\overline{SET}$ input remains HIGH and the pressure at the $\overline{RESET}$ input transitions from HIGH to LOW, switch 84 remains closed and switch 88 opens. The pressure at $\overline{OUT}$ goes HIGH, because $\overline{OUT}$ is coupled to the HP terminal through low resistance switch 84. Switch 87 is closed because $\overline{OUT}$ is HIGH, and the pressure at OUT goes LOW, because it is decoupled from the HP terminal. When the pressure at the $\overline{RESET}$ input goes HIGH again, switch 84 closes, but switch 90 remains open because OUT is LOW. Therefore, the pressure $\overline{OUT}$ remains HIGH keeping switch 87 closed, so that the pressure at OUT remains LOW.

When the pressures at $\overline{RESET}$ and $\overline{SET}$ are both HIGH, the pressures at OUT and $\overline{OUT}$ both remain at their previous logic states. The pressures at OUT and $\overline{OUT}$ are both HIGH when the pressures at $\overline{RESET}$ and $\overline{SET}$ are both LOW, which is considered an unstable output state because OUT and $\overline{OUT}$ cannot remain in that state when $\overline{RESET}$ or $\overline{SET}$ go HIGH. The truth table for latch 80 is shown in Table 2.

TABLE 2

| $\overline{SET}$ | $\overline{RESET}$ | OUT | $\overline{OUT}$ |
|---|---|---|---|
| H to L to H | H | H | L |
| H | H to L to H | L | H |
| H | H | Previous State | Previous State |
| L | L | H | H |

Microfluidic S-R latches can be used to provide a large number of arbitrary latched control signals from a small number of control lines that are multiplexed externally. Thus, having fluidic devices that perform the function of S-R latches on the fluidic chip also greatly reduces the number of control lines that need to be brought onto the chip from external sources, providing additional space saving.

In one embodiment of a microfluidic circuit, when it is desirable to perform logic functions on chip using microfluidic logic gates rather than conventionally using electrical circuitry and then routing the output signal onto the microfluidic chip through macroscopic control lines, the Boolean equations, which may include timing, are first determined. These Boolean equations can be simulated to test functionality (phase 3) and then can be used, either manually or automatically, to generate the circuit.

A Hardware Description Language (HDL) may be used to model both the control channels and the fluid channels of a microfluidic circuit. In one embodiment a digital HDL, such as VHDL or Verilog, is used to model (and/or synthesize) the control channels, which perform the logical control functions of the microfluidic circuit. An analog HDL such as Verilog-A or VHDL-AMS may be used to model (and/or synthesize) the fluid channels of the microfluidic circuit. Since VHDL-AMS can model mixed digital-analog designs, VHDL-AMS may be used to model (and/or synthesize) both the digital control functions of the control channels as well as the analog fluid flow of the fluid channels. Since a component includes at least one control channel and at least one fluid channel in this embodiment, VHDL-AMS can model (and/or synthesize) the control function of the control channel, for example, ON/OFF, the fluid flow through the fluid channel, and the interaction between the control channel and the fluid channel for the component.

In an embodiment VHDL or Verilog code is written which allows the testing of the control logic via simulation using a commercial VHDL or Verilog tool. Next the control logic is synthesized and optimized using a commercial VHDL or Verilog synthesis tool, but using microfluidic logic gates rather than digital logic gates.

An illustrative simple example is the synthesis of a microfluidic D-latch using VHDL, a microfluidic S-R latch (FIG. 6A) and microfluidic NAND gates (FIG. 5B). A D-latch has the following truth table (Table 3):

TABLE 3

| D | En | Q |
|---|---|---|
| H | H | H |
| L | H | L |
| H | L | Previous State |
| L | L | Previous State |

Figure 7A:
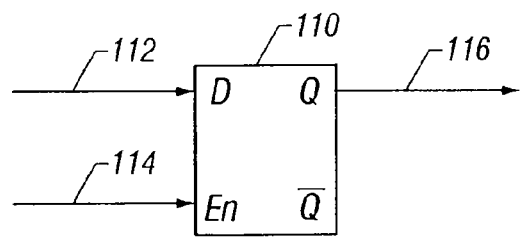
FIG. 7A shows a symbol for a D-latch of an embodiment of the present invention.

FIG. 7A shows a symbol for a D-latch 110. The D 112 input is the data input and the En 114 input is the enable input that enables or disables the latch 110. The output of the latch is given by Q 116. Knowing the function of the D-latch, the next step is to determine the structure of the D-latch. In this case how the D-latch component is constructed from NAND gate sub-components is determined (FIG. 5A). The following synthesizable VHDL code may be used to automatically generate at the design capture level 200 (phase 2), a schematic of a microfluidic network of connected microfluidic NAND gates:

```
entity LATCH is
    port (En, D,: in std_logic; Y: out std_logic);
end entity LATCH;
architecture GATE of LATCH is
    begin
        P1: process (En, D)
            begin
                if (En = '1') then
                    Y <= D;
                end if;
            end process P1;
end architecture GATE;
```

The above VHDL code shows that if the enable line (En 114) is "1" or H, then the output Q 116 gets the input D 112, otherwise the output Q 116 remains unchanged. This code infers a D-latch and generates the network of NAND gates in FIG. 7B, when executed by a synthesis tool.

Figure 7B:
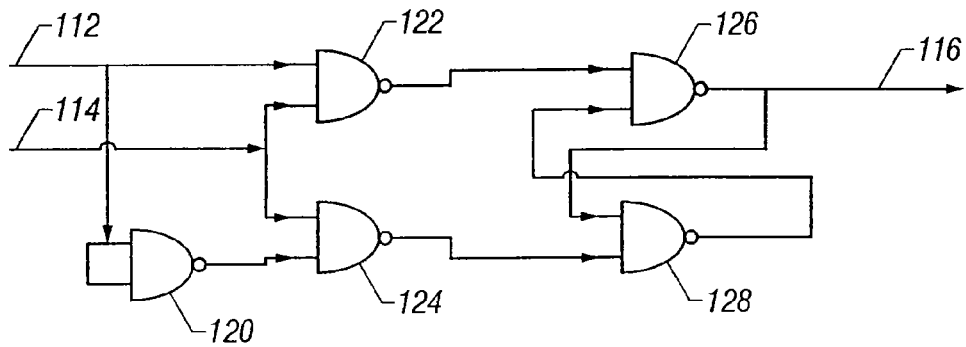
FIG. 7B shows the gates synthesized from the above VHDL code example of an embodiment of the present invention

FIG. 7B shows the gates synthesized from the above VHDL code example of an embodiment of the present invention. Each NAND gate (FIG. 5A) includes two pressure actuated normally open switches (FIG. 4H) and a high flow resistance channel (FIG. 4B). The inputs are D 112 and En 114 which go to a NAND gate 122. The input D 112 also goes through an inverter 120 to be input along with En 114 into NAND gate 124. The outputs of NAND gates 122 and 124 are the inputs into a S-R latch having NAND gates 126 and 128, where the output of NAND gate 122 is the $\overline{\text{SET}}$ and the output of NAND gate 124 is the $\overline{\text{RESET}}$ of S-R latch in FIG. 6A. The output D 116 is the output of NAND gate 126 and the D-latch 110.

Thus the example of FIGS. 7A and 7B shows how synthesizable code may be used to generate a microfluidic network of microfluidic components, where the components may be automatically chosen from a library, such as, Macro Library 210 and Basic Library 206 and placed on a schematic 202 by a synthesis CAD tool. Since the VHDL code is executable and has the D-latch function represented by an "if (En='1') then Y<=D" statement, microfluidic simulation of the control logic may be done using the VHDL code in a conventional VHDL simulator. In addition the VHDL statement "Y<=D" may be-changed to "Y<=D after 5 µsec" to incorporate timing aspects. This simulation allows the verification of the control logic for the microfluidic circuit and is part of the Functional Analysis 360 (phase 3).

Using the above fluidic D-latch (or an equivalent D-Flip Flop with the enable replaced by a clock) and fluidic NAND gate, a Finite State Machine (FSM) can be built, for example, a one-hot FSM. Thus in one embodiment of the present invention a microfluidic computer may be built. With the components made of organic rather than inorganic material a biological computer may also be constructed. Other synthesizable designs using a Hardware Description Language can be found in Douglas J. Smith, "HDL Chip Design, A Practical Guide for Designing, Synthesizing and Simulating ASIC's and FPGAs using VHDL or Verilog," Doone Publications, Madison, Ala. 1997 which is incorporated herein by reference.

In addition to digital circuits, the above-referenced Provisional Patent Application No. 60/282,253, entitled "Microfabricated Fluidic Circuit Elements And Applications," filed Apr. 6, 2001, discloses analog circuits, for example, switching regulators, capacitors, pressure multipliers, and pressure sources. In an embodiment techniques similar to those used for the synthesis of microwave circuits, such as given in U.S. Pat. No. 5,031,111, entitled "Automated Circuit Design Method," by Chao, et. al, filed Aug. 8, 1988, may be used with microfluidic components in place of microcells.

In another embodiment VHDL-AMS (Analog and Mixed Signal) (i.e., IEEE Standard 1076.1-1999 (http://www.vhdl.org/analog) or Verilog AMS) may be used for the synthesis and simulation of analog, and/or mixed digital/analog systems at several abstraction levels (e.g., functional, behavioral, macrocell/RTL, and device levels). Thus with the use of microfluidic components described above, VHDL-AMS is used in one embodiment of the present invention to simulate a mixed signal or analog design for functional analysis 360 (phase 3) and to synthesize the design from the VHDL-AMS programming code to connected microfluidic components (i.e., automatically generate phase 2) displayed on a schematic entry tool.

The following example is of VHDL_AMS code for a valve (see "VHDL-AMS Code For A Electrostatically Driven Micropump," by Feng Cao, Sep. 28, 1999, Microfluidic Operations and Network Architectural Characterizations (MONARCH) Project, Department of Electrical and Computer Engineering, Copyright 1999, Duke University):

```
packagefluidic_system is
    SUBTYPE    pressure IS real;
    SUBTYPE flow_rate IS real;
    NATURE fluidic is
        pressure ACROSS
        flow_rate THROUGH
        fluidic_ref REFERENCE;
end package fluidic_system;
library ieee;
use work.fluidic_system.all;
use ieee.math_real.all;
entity valve is
    generic ( EffectiveMass : real;
        DampConst : real;
        SpringConst : real;
        area : real;
        mu : real;
        density : real;
        length : real );
    port ( terminal p, m : fluidic );
end entity valve;
architecture config of value is
    constant pi : real :=3.14159;
    quantity freq0, y, ydot : real;
    quantity valvepres across valveflow through p to m;
begin
    ydot == y'dot;
    y == ( 1.4e–6*valvepres – 2.36e–6*ydot'dot – 0.00259*y'dot )/
    155.0;
    absy == (y + abs(y))/2.0;
    if y < 0.0   use valveflow == 0.0;
    else
        if valvepres > 0.0      use
            valveflow == mu*4.0*length*sqrt(2*valvepres/density)*
            absy;
        else
            valveflow == –mu*4.0*length*sqrt(2*valvepres/density)*
            absy;
        end use;
    end use;
end architecture config;
```

Design Capture (Phase 2)

Once the design has been conceptually defined, it can then be captured with a schematic entry tool 202 that is used to select the components and connect between the input/output ports of components, or the schematic may be automatically generated using a synthesis language, as described above.

Figure 8:
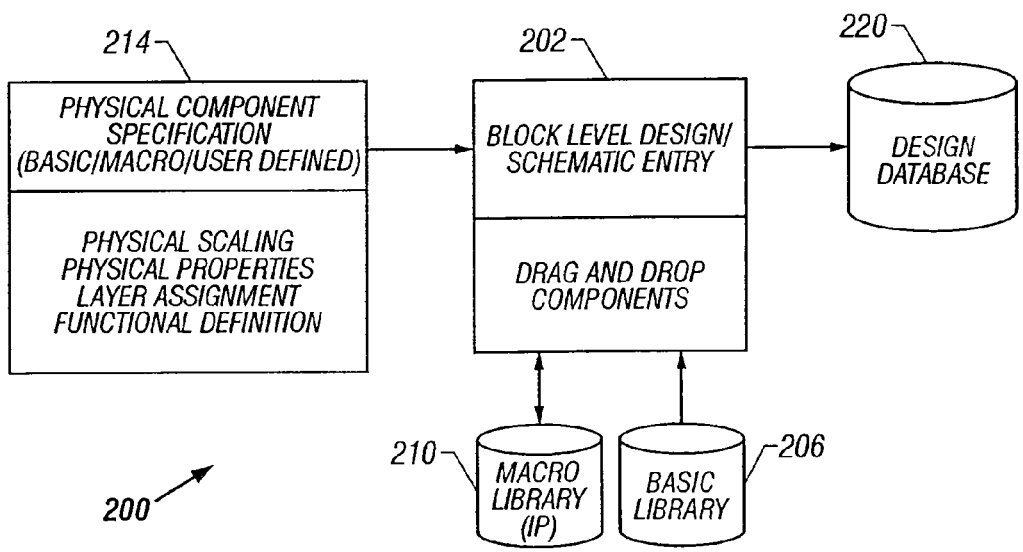
FIG. 8 shows a simplified block diagram of phase 2, design capture, of an embodiment of the present invention.

FIG. 8 shows a simplified block diagram of phase 2, design capture 200, of an embodiment of the present invention. For manual creation of the design, schematic entry 202 enables the quick creation of designs through the use of library components in libraries 206 and 210. There are basic library components 206, for example, valves, pumps, lenses, mixing chambers, input chambers, output/waste chambers, or interconnects (or vias). A via is a vertical connection through one or more layers. The basic library components 206 are components which are either user or pre-defined. There are also macro library 210 components, for example, a cell sorter macro or a DNA fingerprint macro. The library components may or may not be normalized.

Examples of library components used in this embodiment of the present invention are given in the above-mentioned PCT Patent Application No. PCT/US00/17740, entitled "Microfabricated Elastomeric Valve and Pump Systems," filed Jun. 27, 2000 and in Provisional Patent Application No.60/282,253, entitled "Microfabricated Fluidic Circuit Elements And Applications," filed Apr. 6, 2001 which are incorporated herein by reference. Examples of microfluidic components and structures are summarized in Appendices A and B.

In one embodiment each component in the libraries 206 and 210 has a physical component specification 214. The specification may have, for example, one or more of the following: designation of the channel as a control or fluid channel, physical scaling of channels (length, width, depth), control or fluid channel attributes, such as if a channel end is open or closed, or if a channel is square or rounded, physical properties, such as, thermal, conductivity, viscosity, or magnetic properties, layer assignment, a functional description (digital or analog), a component and/or a fixed element name, and/or a design rule specification for physical layout.

FIGS. 9a and 9b show the top plan view and perspective view of an on-off valve component of an embodiment of the present invention. The top plan view shows the control length 232 and control width 234 of the control channel 246 and the fluid width 238 and fluid length 233 of the fluid channel 242. The perspective view shows the fluid depth 244 of the fluid channel 242 and the control depth 248 of the control channel 246. The channels 242 and 246 are semi-rounded.

One example of the Physical Component Specification 214 for the on-off valve in FIGS. 9a and 9b includes:
Physical dimensions (nm)
  Fluid Channel Width
  Fluid Channel Depth—Linked by assigned layer
  Fluid Channel Depth_I—Independent of layer depth
  Fluid Channel Length
  Control Channel Width
  Control Channel Depth—Linked by assigned layer
  Control Channel Depth_I—Independent of layer depth
  Control Channel Length
Element Attributes
  Control Channel Left End (0-close, 1-open)
  Control Channel Right End (0-close, 1-open)
  Fluid Channel Left End (0-close, 1-open)
  Fluid Channel Right End (0-close, 1-open)
  Control Channel Profile (0-rounded [default-blue], 1-square)
  Fluid Channel Profile (0-rounded [default-blue], 1-square)
  Layer assignment (integer number 0-n, where n is a positive integer)
  Fluid Channel Layer-n
  Control Channel Layer-n+1 or n−1
  Component Name Assignment (for example, any alpha string up to 64 bytes long excluding whitespace and "/" and "\")
  CompName
  Fixed Element Name
  ElementName The On-Off valve component may be represented by a block diagram such as FIG. 10 or a schematic symbol to be displayed in FIG. 12. The valve symbol in FIG. 12 may be in Basic Library 206 and dragged and dropped onto a schematic entry 202 active drawing area 316 such as that shown in FIG. 11.

FIG. 10 shows an IDEF0 diagram representing a microfluidic component of an embodiment of the present invention. IN 256 is the input into process 252, which responsive to control 254 outputs out 258. This may represent, for example, a valve in which the input, IN 256, is transferred to the output, OUT 256, if the CONTROL 254 turns the PROCESS 252 on. Note that FIG. 10, when representing a valve, is a more abstract representation of FIG. 11.

FIG. 11 shows a microfluidic valve symbol of an embodiment of the present invention. The fluid channel 262 has input end 263 and output end 264. The control channel 266 has input end 267 and a closed output end 268. When fluid (liquid or gas) flows in the control channel 266, the fluid channel 262 it is shut off and the fluid (liquid or gas) stops flowing, i.e., the valve 260 is turned on. Otherwise, the valve 260 is normally off (i.e., open) and the fluid (liquid or gas) in the fluid channel 262 keeps flowing. The valve in FIG. 11 is a multilayered symbol. The fluid channel is on a different layer from that of the control channel. From FIG. 12, for illustration purposes, let layer 1 335 represent the control layer and layer 0 334 represent the fluid layer. Then with layer 0 334 selected and layer 1 unselected the fluid channel 262 is displayed and can be connected to another fluid channel. With layer 0 334 unselected and layer 1 selected the control channel 266 is displayed and can be connected to another control channel.

Figure 12:
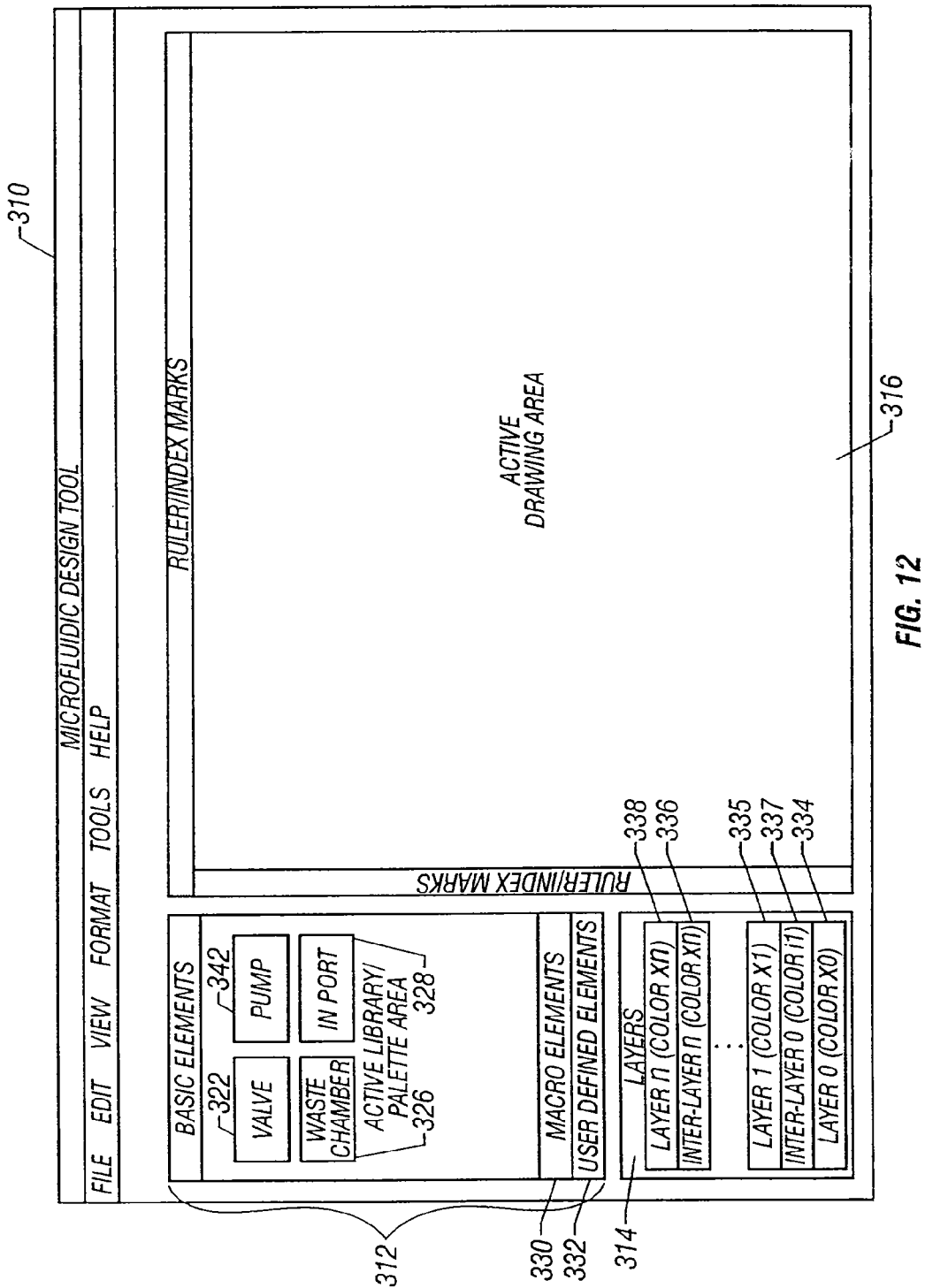
FIG. 12 illustrates a schematic capture display window of embodiment of the present invention.

FIG. 12 illustrates a schematic capture display window 310 according to an embodiment of the present invention. The window 310 includes an area showing the library components 312, an area 314 showing the layers selected and an active drawing area 316 were the component symbols from active library area 320 are dragged and dropped and connected together. The layered area 314 is used when there are multi-layered component symbols in library components area 312. The layered area 314 controls which layer(s) in the active drawing area 316 is/are active. If, for example, only one layer is active then only the components or parts of components on that layer are displayed and can be modified or acted upon. The layers include major layers, for example, layer n 338, layer 1 335, and layer 0 334, and sub-layers, for example, inter-layer n 336 and inter-layer 0 337. The sub-layers are layers in between the major layers. For ease of viewing each layer may have its own associated color for the channels on that layer.

Figure 13A:
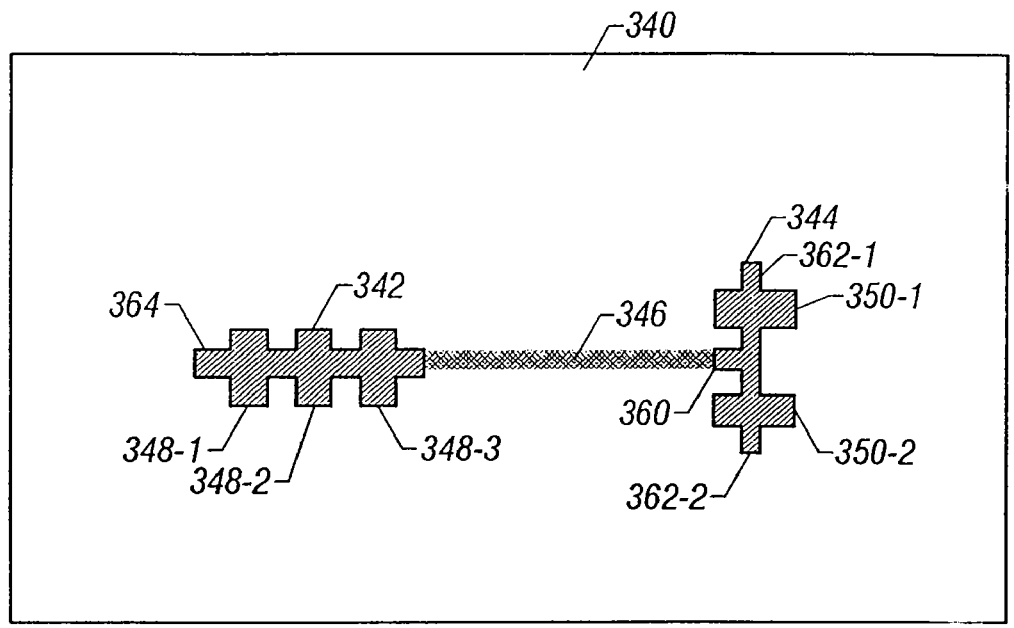
FIG. 13A shows an example of a peristaltic pump connected to a T-switch in an expanded drawing area of FIG. 12 of an embodiment of the present invention.

FIG. 13A shows an example of a peristaltic pump 342 connected to a T-switch 344 in an expanded drawing area 340 of the window 310 of FIG. 12 in an embodiment of the present invention. The peristaltic pump 342 is a basic component that allows the active control of fluid in either direction. Each of the control channels 348-1, 348-2, and 348-3, are pressurized (and depressurized) in some order to create a pumping effect in the fluid channel 364. The T-switch 344 represents a basic component that is used to direct the incoming flow 360 in the fluidic channel to none or one of two channels, 362-1 or 362-2, based on the state of the control channels 350-1 and 350-2. The peristaltic pump 342 is first selected from the active library/palette area 320 and dragged and dropped into the drawing area 316. Next the T-switch is selected and dragged and dropped into the drawing area 316. The peristaltic pump 342 is then connected to the T Switch 344 via a fluid channel 346. The function of the microfluidic network in FIG. 13A is to pump a fluid into one of two directions 362-1 or 362-2.

Figure 13B:
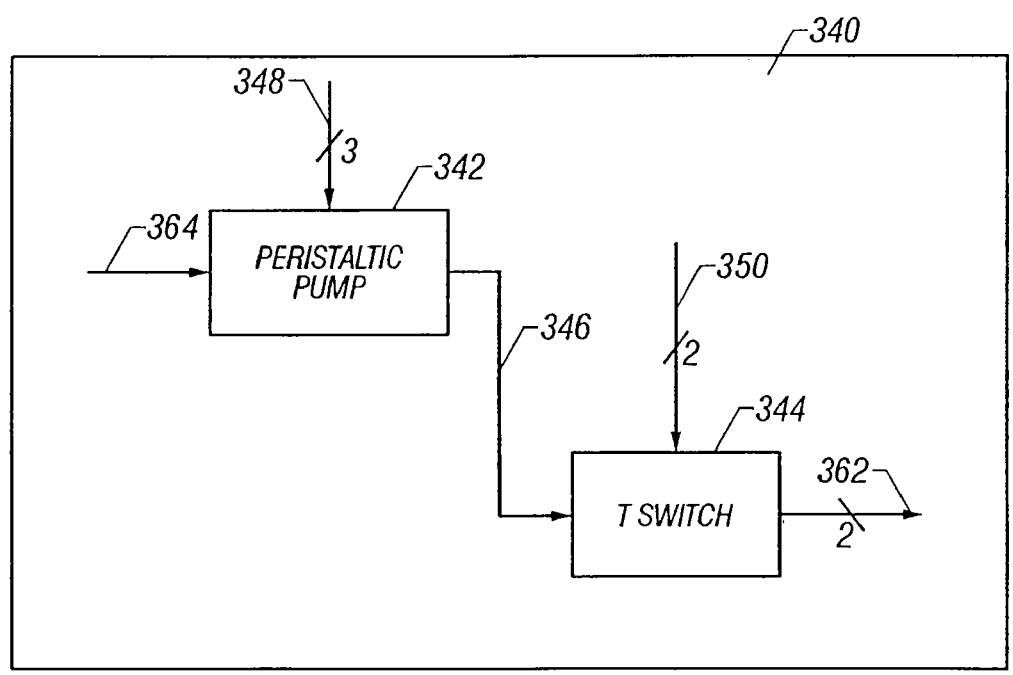
FIG. 13B shows an example of using IDEF0 blocks to perform schematic capture in another embodiment of the present invention.

FIG. 13B shows an example of using IDEF0 blocks to perform schematic capture in another embodiment of the present invention. The peristaltic pump 342 has input 364 and control bus 348 having three control lines. The output of the peristaltic pump 342 is connected via line 346 to the T-switch 344. The T-switch 344 has a control bus 350 having two lines and an output bus 362 having two lines. The microfluidic network schematically captured in FIG. 13B is the same as that of FIG. 13A, but with more abstract symbols.

As shown in FIG. 8, from the schematic entry 202, a design database 220 is produced that represents the interconnected components. This design database 220 serves as input into the functional analysis 360 and the physical implementation 400.

Functional Analysis (Phase 3)

After completion of the schematic design entry, a good design practice to reduce the number of design iterations is to functionally simulate the design. Functional simulation of microfluidic circuits involves application of control signals to the active components of the design and shows the functional/static behavior of the design without regard to the dynamic behavior of the fluid within the device. Examples of active fluidic components include valves and pumps which act on the fluid. A fixed channel is an example of a passive fluidic component. Functional libraries 362 for the component models are provided for each component (FIG. 1). In one embodiment the component functional models are computer programs written in C, C++, VHDL, Verilog, Verilog-A, VHDL-AMS, or Verilog-AMS, and are executed by a commercial simulator, such as from Synopsys, Inc. of Mountain View, Calif., or Cadence Design Systems, Inc. of San Jose, Calif.

Figure 14:
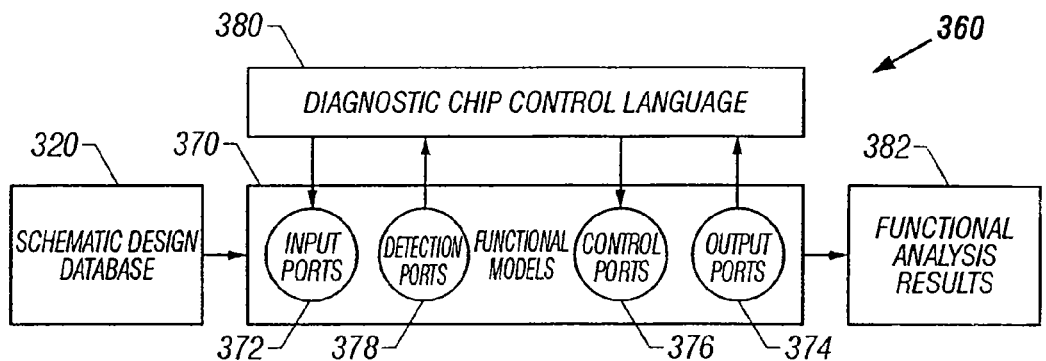
FIG. 14 shows a simplified block diagram for the connected component functional models of the functional analysis of the MCAD system of an embodiment of the present invention.

FIG. 14 shows a block diagram for the connected component functional models of the functional analysis 360 of the MCAD system 10 according to an embodiment of the present invention. Components are extracted from the schematic design database 220 and are used to select the associated component functional models from the functional simulation library 362 (FIG. 1). These component functional models are connected together as given by the schematic design database 220 for the microfluidic circuit being simulated.

In one embodiment of the present invention, the logical fluidic flow simulation 366 simulates the control logic of the active microfluidic components (FIG. 1). The purpose is to give an initial validation of the logic control 364 and to insure proper connectivity in the microfluidic circuit. In this case the functional models in the functional simulation library 362 includes models defined as Boolean expressions with operands based on the control port(s) 376 of the active component which control connections to the input ports 372 and the output ports 374. Valid Boolean operators are as follows: *=AND, +=OR, ^=XOR, !=NOT.

For example, a simple valve component with a single input port and a single output port and a control port can be defined as follows:

Input=I, Output=O, Control=C

Functional Model Valve

Port I: input

Port O: output

Port C: control

O=I*C

When C=H (or '1'), then the output O gets the input I. When C=L (or '0'), then O =L regardless of the value of the input I.

Logical fluidic flow simulation 366 of the logic control 364 of the testing apparatus that will actuate the active components (FIG. 1) is created using the diagnostic device control language or diagnostic chip control language (DCCL) 380, as shown in FIG. 14. The DCCL 380 is a simple Boolean based language with timing constraints that can generate control signals to simulate actuation of the device's active components and read and log data from detection ports 378 of the functional models 370. Any additional physical characteristics of the control and input signals can be included for the physical simulation but are ignored in the functional simulation. Consequently, the same DCCL program can be used in the actual testing when the device is ultimately fabricated and put into use by the user. The results of the simulation are shown in the functional analysis results 382 and are displayed as a series of square waves that indicate valve position, path connectivity, detection, control signal generation, etc.

In another embodiment the functional models are VHDL or Verilog models. A valve can be represented by the VHDL expression:

O<=I and C after 5 µsec;

where "and" is a Boolean operator and there is a delay of 5 µsec before the result of the and operation is assigned to O. The DCCL of the above embodiment is represented in this embodiment as a typical VHDL test bench. As seen in FIG. 14 the test bench supplies over time the inputs to some of the input ports 372, primarily to the input ports 372 associated with the inputs to the microfluidic circuit given by the connected functional models 370. The test bench analyzes the output ports 374 associated with the outputs of the microfluidic circuit given by the connected functional models 370. The test bench also monitors intermediate points in the connected functional models 370 by monitoring various detection ports 378. The functional analysis results 382 may be displayed by a commercial VHDL simulator as timing diagrams or waveforms.

In yet another embodiment VHDL-AMS or Verilog-AMS is used to represent the Functional Models 370. The inputs into the control ports 376 are typically digital, while the functional transformation of values from the input ports 372 to the output ports 374 are given by analog functions. Thus a first order dynamic analysis may be done. This allows an intermediary analysis between the static connectivity analysis and the physical analysis 800 given by phase 6 (FIG. 1).

In a further embodiment an analysis of the fluid flow only may be performed in a way similar to that for passive microfluidics (see "Passive Microfluidics-Ultra-Low-Cost Plastic Disposable Lab-On-A-Chips," by Bernard H. Weigl, et. al., in Proceedings of Micro Total Analysis Systems 2000, Dordrecht, Netherlands: Kluwer Academic Publishers, 2000, p. 299). Assuming the fluid is flowing through the fluid channels and the pertinent control channels are turned on, the microfluidic circuits may be represented by analog electrical components, such as capacitors, resistors, and inductors, to predict fluid flow rates. Diffusion and chemical reactions may be calculated using finite element analysis. Thus an initial analysis of the fluid flow and fluid mixing through the fluid microcircuits may be obtained. This again is neither a static nor a full dynamic analysis, but somewhere in between, i.e., an intermediary analysis.

Physical Implementation (Phase 4)

Figure 15:
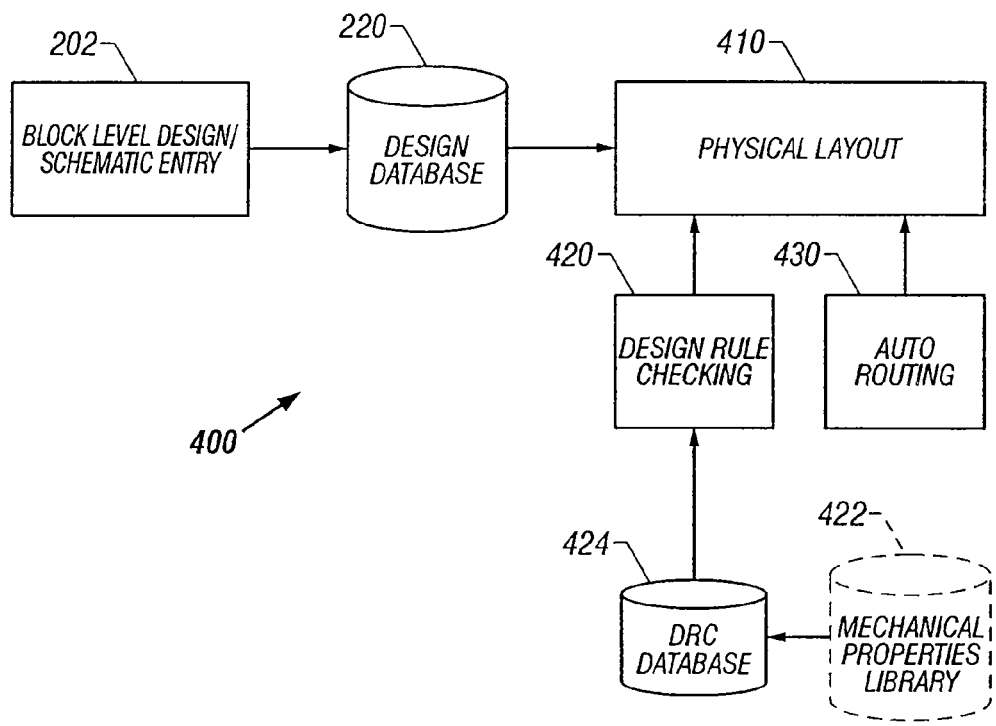
FIG. 15 shows a simplified block diagram of the physical implementation of an embodiment of the present invention.

Once the schematic design has been completed and functionally tested, the physical implementation of the schematic into a physical layout takes place. FIG. 15 shows a block diagram of the physical implementation 400 according to an embodiment of the present invention. The design database also is developed based on the schematic entry 202, as shown in FIG. 8 and described above. The design database 220 represents the interconnected components which are then assigned to physical layers, via a place and route routine, either automatically or manually.

While a tool such as AutoCAD® from Autodesk, Inc. of San Rafael, Calif., may be used to physically lay out a microfluidic circuit, it has several disadvantages. AutoCAD® has no drawing constraints as it is a general tool. Hence, for example, a control channel can overlap a fluid channel causing an unwanted parasitic valve. While this tool is capable of multiple layers, components are typically drawn on one layer only. Manipulation of a multilayered component presents serious difficulties. AutoCAD® does not have the concept of an I/O port and connectivity to an I/O port. Again since AutoCAD® is a general CAD program, there is no design information associated with a component such as functional information. Embodiments of the present invention overcome these disadvantages of AutoCAD® and other similar tools, and provide a system in which a microfluidic circuit can be easily and efficiently created using multilayered microfluidic components on a physical layout. There are two primary aspects to the physical layout 410 of the microfluidic circuit or system or device. The first is component placement and the second is the routing of the interconnections between the placed components.

Components can be either manually or automatically placed in the MCAD system's placement tool. The placement tool includes one or more of the following functions: allowing the grouping of components by connectivity by layer and/or by cross layer (3D grouping); placing components based on design rule constraints (DRC) in the DRC database 424 from set mechanical properties per layer provided in the mechanical properties library 422; performing design rule checking 420; allowing for grid and gridless placement of components; highlighting DRC errors; performing layer to layer shrinkage compensation for placements; and/or reading and writing the DWG, DXF, or other appropriate file formats.

Examples of DRC's include checks on I/O placement, channel size mismatch, dangling channels, overlapping components & channels, and channel spacing.

Figure 16A:
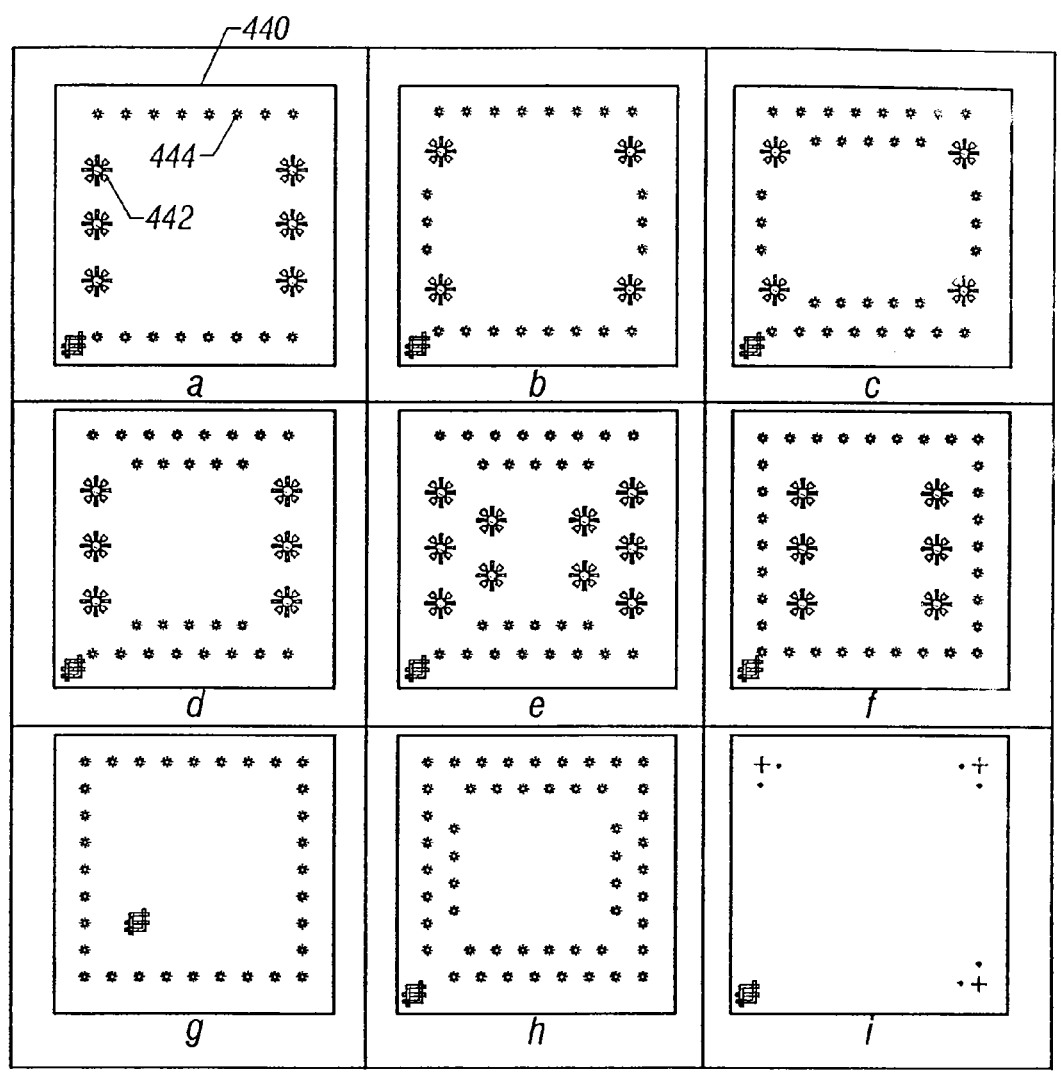
FIGS. 16A and 16B give examples of pre-defined templates of an embodiment of the present invention.
Figure 16B:
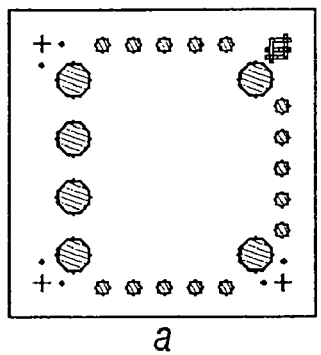
Figure 16B:
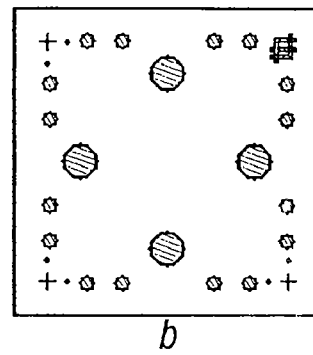
Figure 16B:
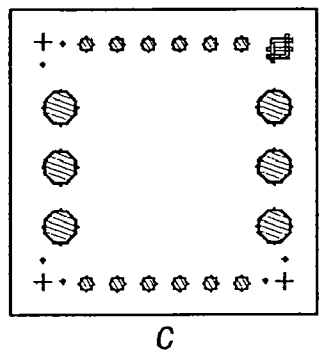
Figure 16B:
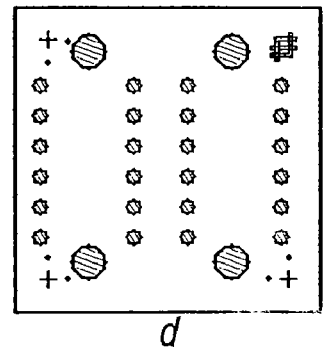
Figure 16B:
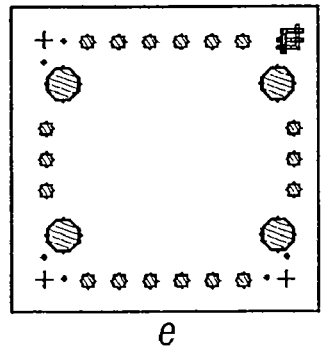
Figure 16B:
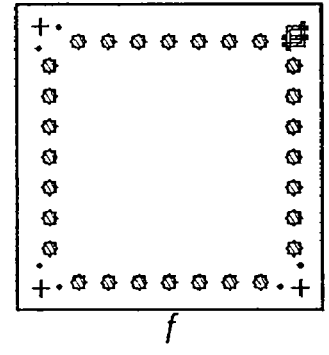

An I/O placement rule may restrict a user to a set of pre-defined templates having pre-defined I/O ports. FIGS. 16A and 16B give examples of pre-defined templates of an embodiment of the present invention. For example, a template 440 may correspond to a microfluidic chip that is approximately a 20 mm×20 mm square in size and about 4 mm thick. The I/O ports 442 and 444 correspond to a large via about 3 mm and a small via about 625 μm, respectively. In an alternative embodiment the user may create his/her own template and may place the I/O ports on the user-designed template.

A channel size mismatch rule allows checks for component channels (i.e., channels that are part of the component) to connecting channel having size mismatch and channel-to-channel size mismatch.

A dangling channel checking rule checks for two or more unconnected ports per component channel (only one end of a component channel need be connected) and for only one connected port on a user drawn channel (both ends of channels must be connected).

An overlapping channels rule allows checking for overlapping user drawn fluidic and control channels. There is an error for any overlapping channels. If there is auto-bridging then one or both channels are re-shaped at and within a predefined distance of the overlap point and no error occurs. Other overlapping components & channels rules check for overlapping channels on the same layer and overlapping components on the same layer or on another layer. Again if there is auto-bridging, two overlapping channels on the same layer may be corrected by routing one channel to another layer and back again using vias.

A channel spacing rule checks for minimum spacing between adjacent channels of a predetermined width. For example, there may be required a minimum of 30 μm between adjacent 120 μm width channels, a minimum of 50 μm between adjacent 100 μm width channels, and a minimum of 70 μm between adjacent 80 μm width channels, Next the interconnections between the placed components can be either manually or automatically done in the MCAD system's routing tool. The routing tool includes one or more of the following functions: definition of routing cross-sectional profiles; auto-routing 430 for similarly pitched components—grid or gridless; optimization of routing corners: right angle, radius, etc.; relocation of routing to other layers; layer to layer shrinkage compensation; and/or auto-bridging either intra or inter layer, where inter-layer bridging is done using vias.

In an embodiment of the present invention there are two types of bridging performed by the auto routing 430 (FIG. 15). The first type is an interconnect bridge channel which is used when a control channel on one layer overlaps a fluid channel on an adjacent layer. The interconnected bridge channel prevents the fluid channel from being closed when the control channel is activated. The second type is needed, when there is a crossing between a first and a second channel on the same layer. This type of bridge uses vias to reroute the first channel to another layer to detour around the second channel.

Figure 17A:
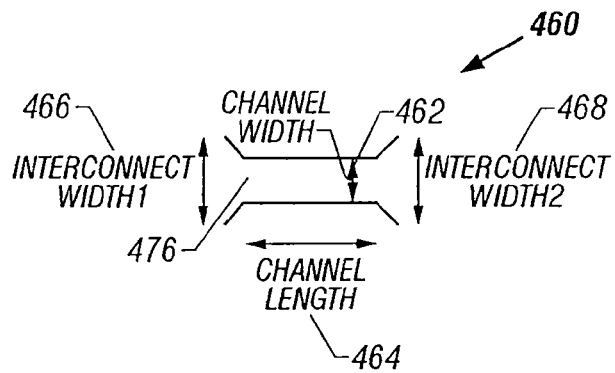
FIG. 17A shows the physical dimensions for an interconnect bridge channel of an embodiment of the present invention.

FIG. 17A shows the physical dimensions for an interconnect bridge channel 460 of an embodiment of the present invention. The interconnect bridge channel has channel width 462 and channel length 464. Both ends of the interconnect bridge channel have widths greater than the middle portion with one end having interconnect width 466 and the other and having interconnect width 468.

FIG. 17B shows a symbol for an interconnect bridge of one embodiment of the present invention. The fluid channel 470 is on a first layer with ends 472 and 474. The control channel 476 is on a second adjacent layer with ends 480 and 478. The control channel 476 is an interconnect bridge similar to that shown in FIG. 17A and it overlaps the fluid channel 478 at overlap area 482. The control channel 476 goes from a first channel width at end 478 through a taper element to a narrow channel width and through a taper element back to the first channel width at end 480. The fluid channel 470 is tapered in the middle near overlap area 482. The tapering is done to reduce the ability of the control channel to inhibit the flow in the fluid channel 470. The control channel 476 when activated does not stop the flow through fluid channel 470 and thus effectively bridges the fluid channel 470.

FIG. 18A shows a crossing of two channels located on the same layer. In order to get from point 485 to point 488 and from point 486 to point 489 without going around any of the points, channels 490 and 492 must cross. In order to prevent this crossing, channel 490 must be detoured to another layer (alternately channel 492 could be detoured).

Figure 18B:
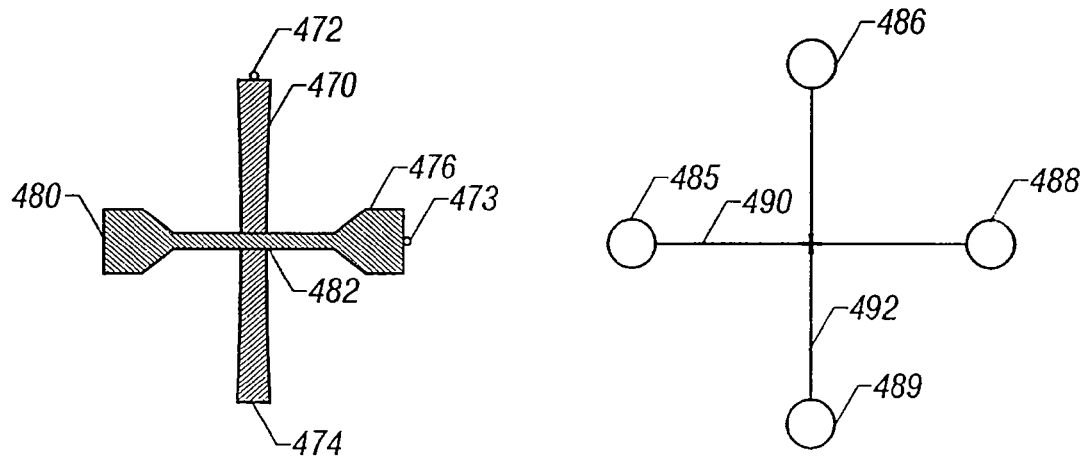
FIG. 18B shows a simplified view of an interconnect bridge channel using vias of an embodiment to of the present invention.
Figure 18B:
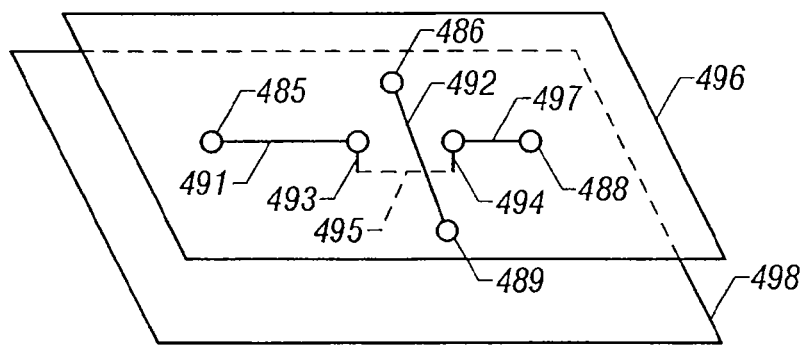

FIG. 18B shows an interconnect bridge channel using vias of an embodiment to of the present invention. From point 485 channel 491 on layer 496 is detoured through a via 493 to an adjacent layer 498 to channel 495. Channel 495 on layer 498 goes underneath channel 492 and then goes backup through via 494 to channel 497 to point 488. Thus channel 492 is bridged using another, but not necessarily adjacent, layer. In another embodiment channel 492 is detoured around channel 490.

Figure 19:
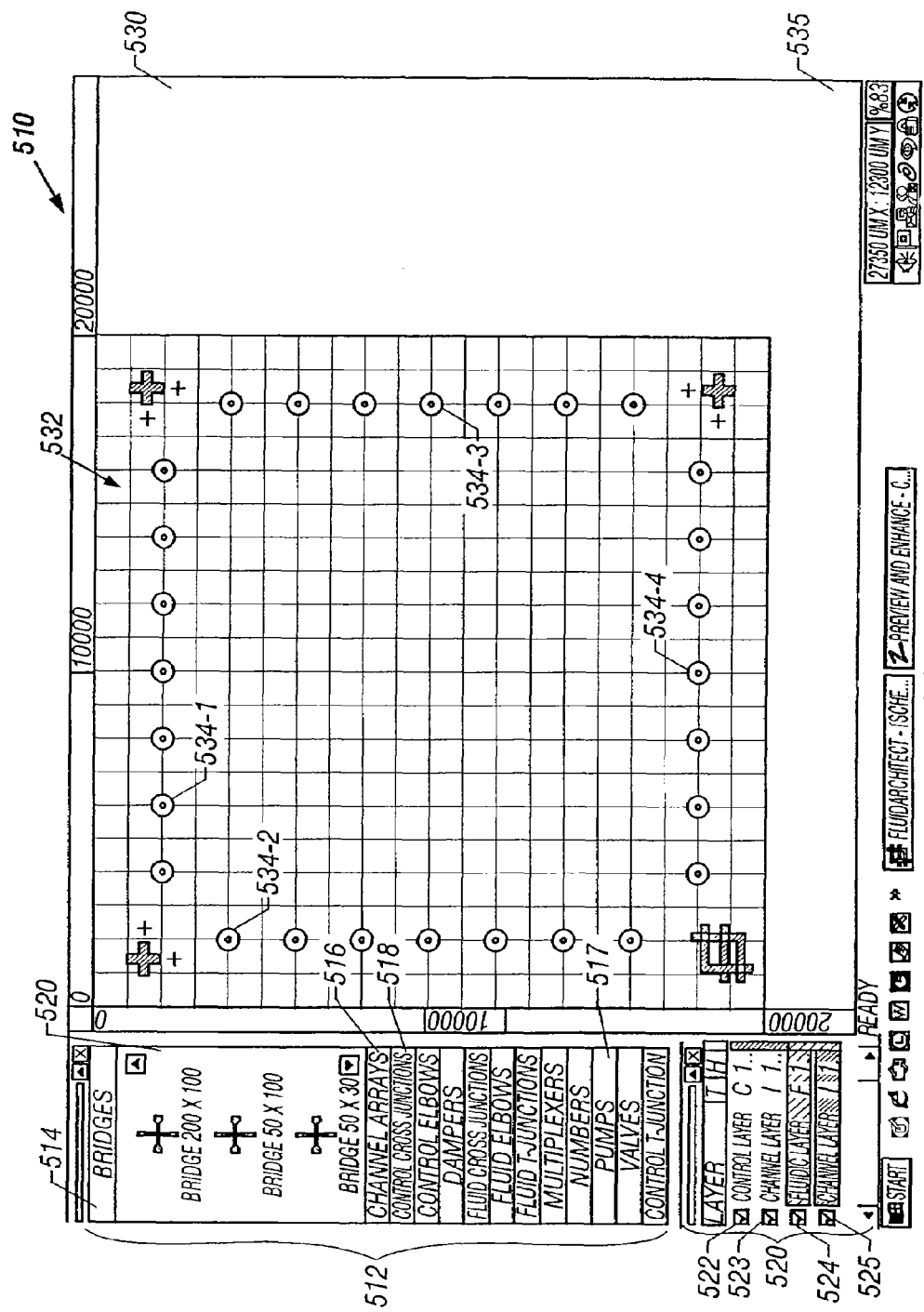
FIG. 19 shows a physical layout tool of one embodiment of the present invention.

FIG. 19 shows a physical layout tool according to one embodiment of the present invention. Typically, the difference between the design schematic capture 200 (phase 2) and the physical layout schematic 400 (phase 4) is that the former shows interconnected functional components without regard to placement on a template, while the latter takes into account the physical location on a template. In the physical layout 410, the physical characteristics of a microfluidic component are just as important as the functional characteristics of a component (both active and passive). In a schematic capture the symbols representing a component may be abstracted (e.g., FIG. 10) and the symbols are placed and connected, and no physical routing takes place. Also the placement in the schematic is not necessarily related to where the microfluidic component is physically located in the manufactured microfluidic chip or device. In a physical layout where the microfluidic component is placed is related to where the component is physically located. And routing places channels between microfluidic components to physically connect them.

For this embodiment, phase 1 to phase 3 are not performed and the user begins with phase 4. In this embodiment, the basic library 206 and macro library 210, which together include the components for the physical layout 410, feed the layout tool 510 directly and the schematic entry 202 is bypassed. In FIG. 19 the layout tool 510 displayed includes a component library area 512, a layer area 520, an active drawing area 530 and status bar 535.

The component library area 512 includes the library components, represented by symbols, that are available for the layout design. To select the portion of the library desired, one simply left clicks on the title of the portion (e.g., bridges 514, channel arrays 516, or pumps 517), and the components are displayed (e.g., active area 520 of bridges 514). If more than one component is present in the active area the up or down button is used to scroll through them. Once the proper component is found, one may left click the mouse button and hold and drag the component into the active drawing area 530 and release the button to place the component in a desired location.

Figure 20:
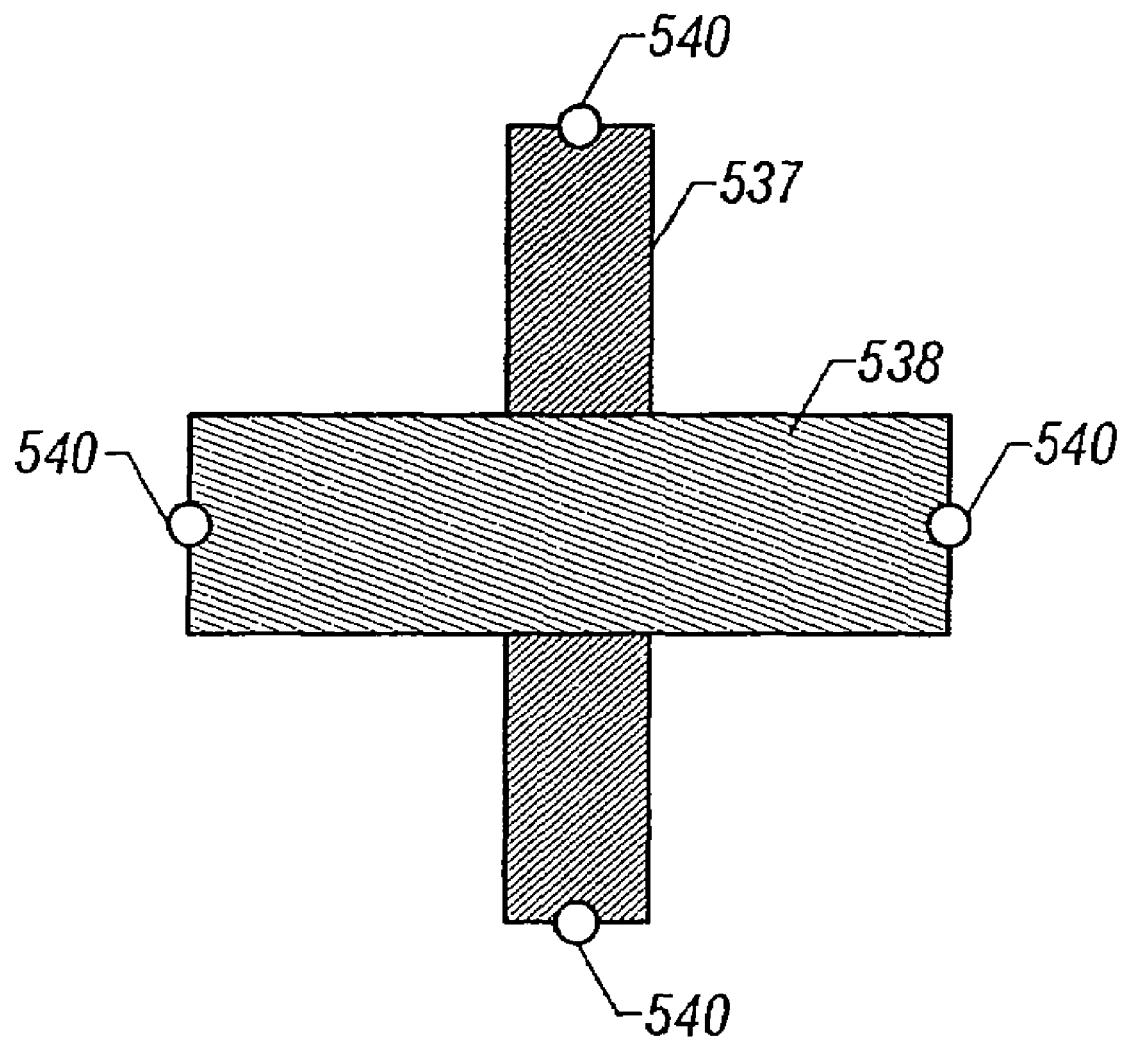
FIG. 20 shows a symbol for a microfluidic valve of one embodiment of the present invention.

A library component is typically composed of channels. Some components have channels only on one layer while some have channels on two or more layers. FIG. 20 shows a symbol for a microfluidic valve of one embodiment of the present invention. The black line 537 represents a fluid channel present on the fluidic layer while the gray line 538 represents a channel on the control layer. The colors have been picked for illustration purposes only and other colors such as blue for a fluid channel and red for a control channel are equally acceptable. The connection ports 540 are points where connections from other components or channels are allowed to be made with the valve component. Additional examples of the symbols or icons for the microfluidic components are provided in Appendices A and B which are herein incorporated by reference.

The layer area 520 in FIG. 19 indicates the coloring/shading of the layers as well as the different channel heights that are available in the particular layer. For example, control layer 522 and fluidic layer 524 are selected and thus both fluidic and control channels are shown in active drawing area 530. There are two categories of layers: primary layers, e.g., control layer 522 and fluidic layer 524, and channel layers, e.g., 523 and 525, in FIG. 19. The primary layer has a type, such as control or fluid, and includes one or more channel layers, e.g., control layer 522 has one channel layer 523, and fluid layer 524 has one channel layer 525. Channel layers inherit their type from their parent primary layer. Channel layers own channels, for example, drawn by the user or by auto-routing, in the active drawing area 530. Channels in a component, when placed on the drawing area 530, are linked to these user (or auto-route) drawn channels in the corresponding channel layer via the associated primary layer.

The active drawing area 530 is where components from the component library area 512 are placed and connected together using the drawing tools. In one embodiment the active drawing area includes a predefined template 532. The predefined template 532 has a plurality of I/O ports, for example 534-1, 534-2, 534-3, and 534-4. the components in component library area 512 are placed and connected on this template 532. Also connections are made from the connected components to the I/O ports.

The status bar 535 has two modes for the drawing area 530. One mode for the drawing area is the select mode (shown in FIG. 19) and the other is the channel drawing mode (not shown). In the select mode the status bar includes the following information: (1) Left Status Box: Component Name; (2) Center Status Box: Absolute Cursor Location (in microns); and (3) Right Status Box: Percentage Zoomed In. In the drawing mode (not shown) the status bar includes the following information: (1) Left Status Box: Length of channel drawn (in microns); (2) Center Status Box: Absolute Cursor Location (in microns); and (3) Right Status Box: Percentage Zoomed In.

Figure 21:
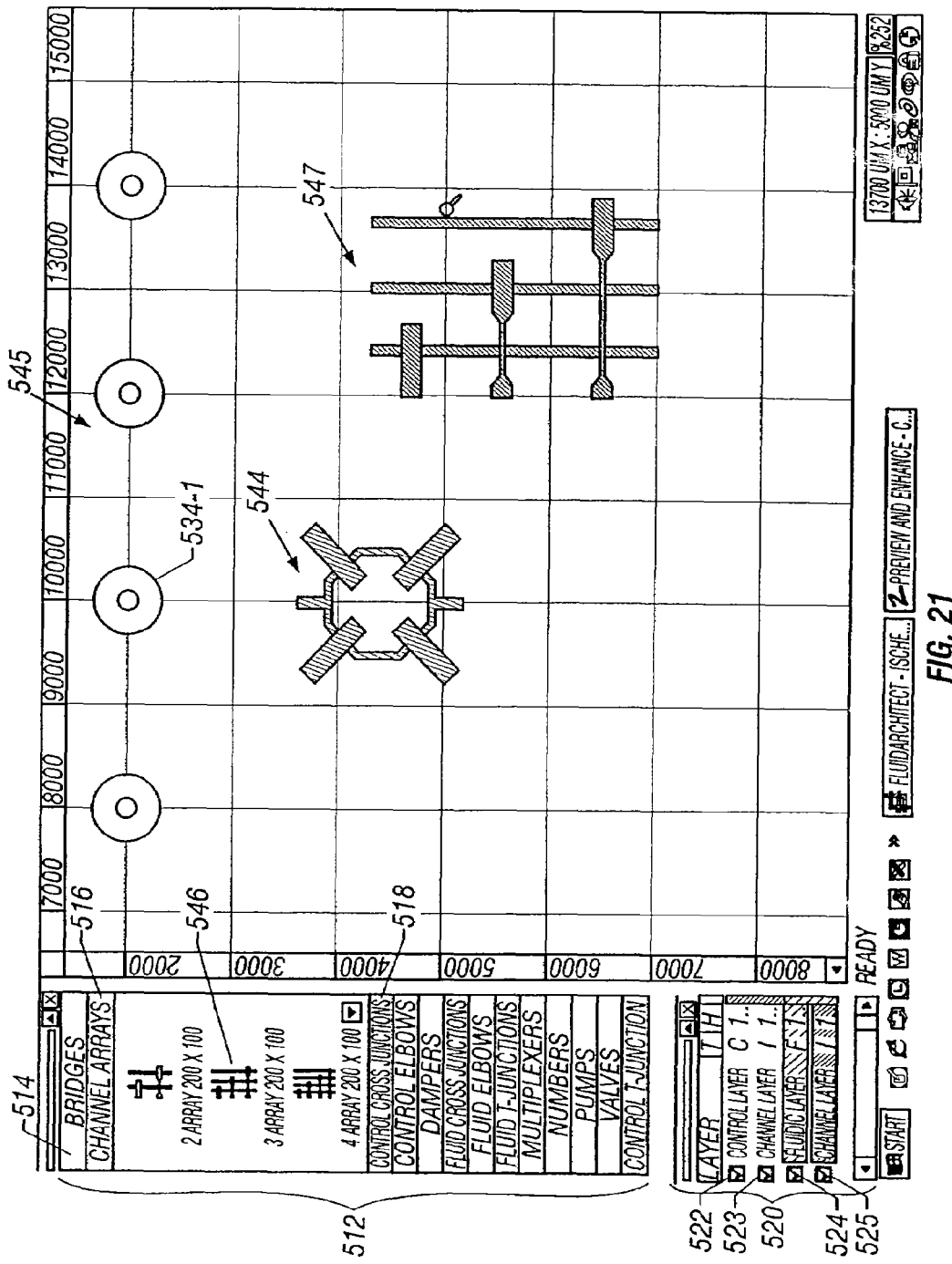
FIG. 21 shows two components of an embodiment of the present invention.
Figure 23:
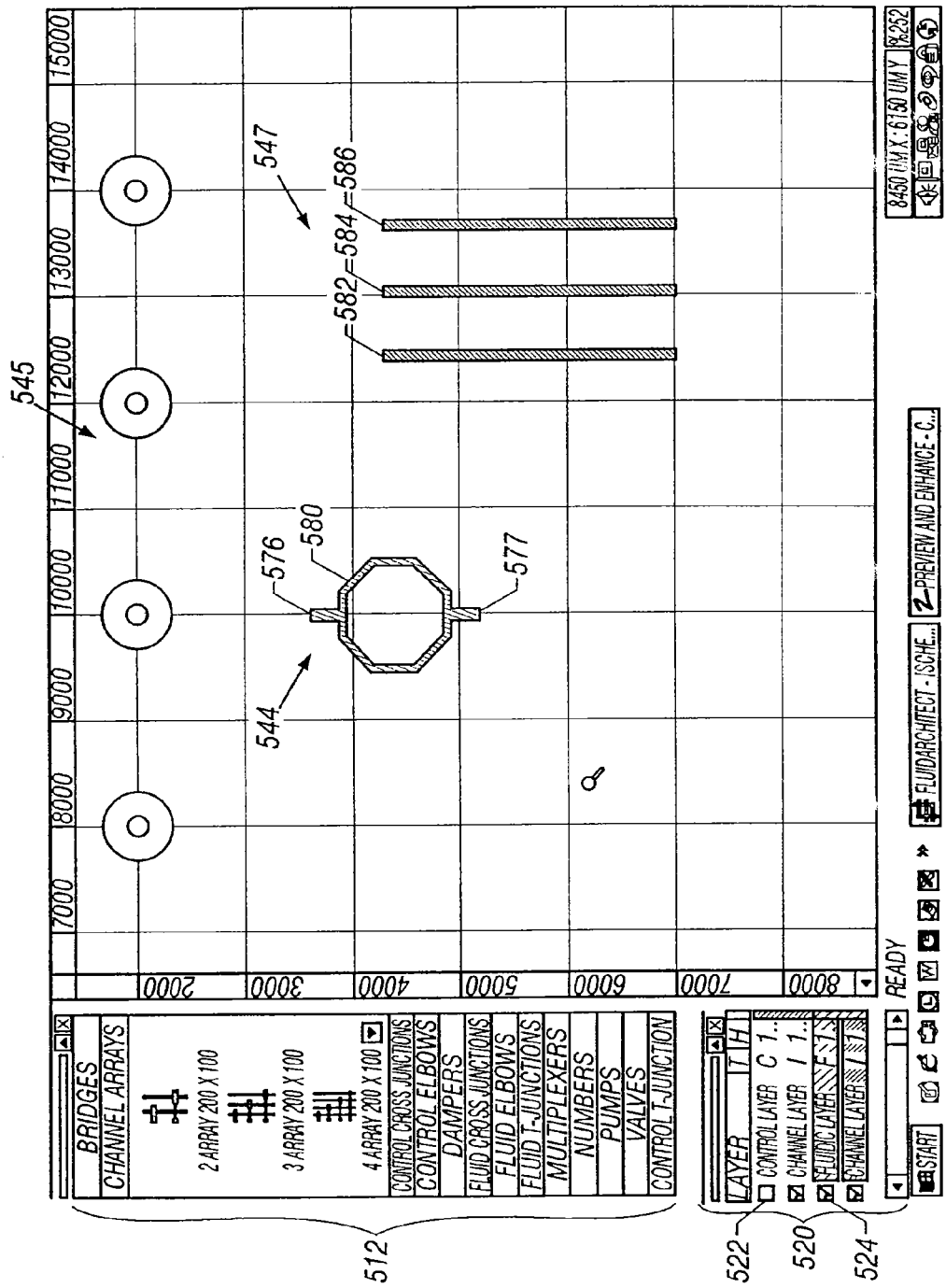
FIG. 23 shows the fluid channels for the fluid layer for the two components of FIG. 21.

FIG. 21 shows two components of an embodiment of the present invention. The two components shown on an expanded template area 545 are a rotary pump 544 and a channel array 547. The rotary pump 544 shown has a fluid channel 580 and two fluid ports 576 and 577 (FIG. 23). The rotary pump 544 is provided for mixing and incubating solutions by employing one or more pumps to flow solution around a circular flow channel. See, e.g., Stephen R. Quake and Axel Scherer, "From Micro- to Nanofabrication with Soft Materials," Science 290: 1536-40 (2000). The three channel array 547 provides a set of individually addressable flow lines 582, 584, and 586 (FIG. 23). The number of control lines is equal to the number of fluid lines for this array component. The flow of the liquid within the array can be controlled by actuating the necessary control lines.

Figure 22:
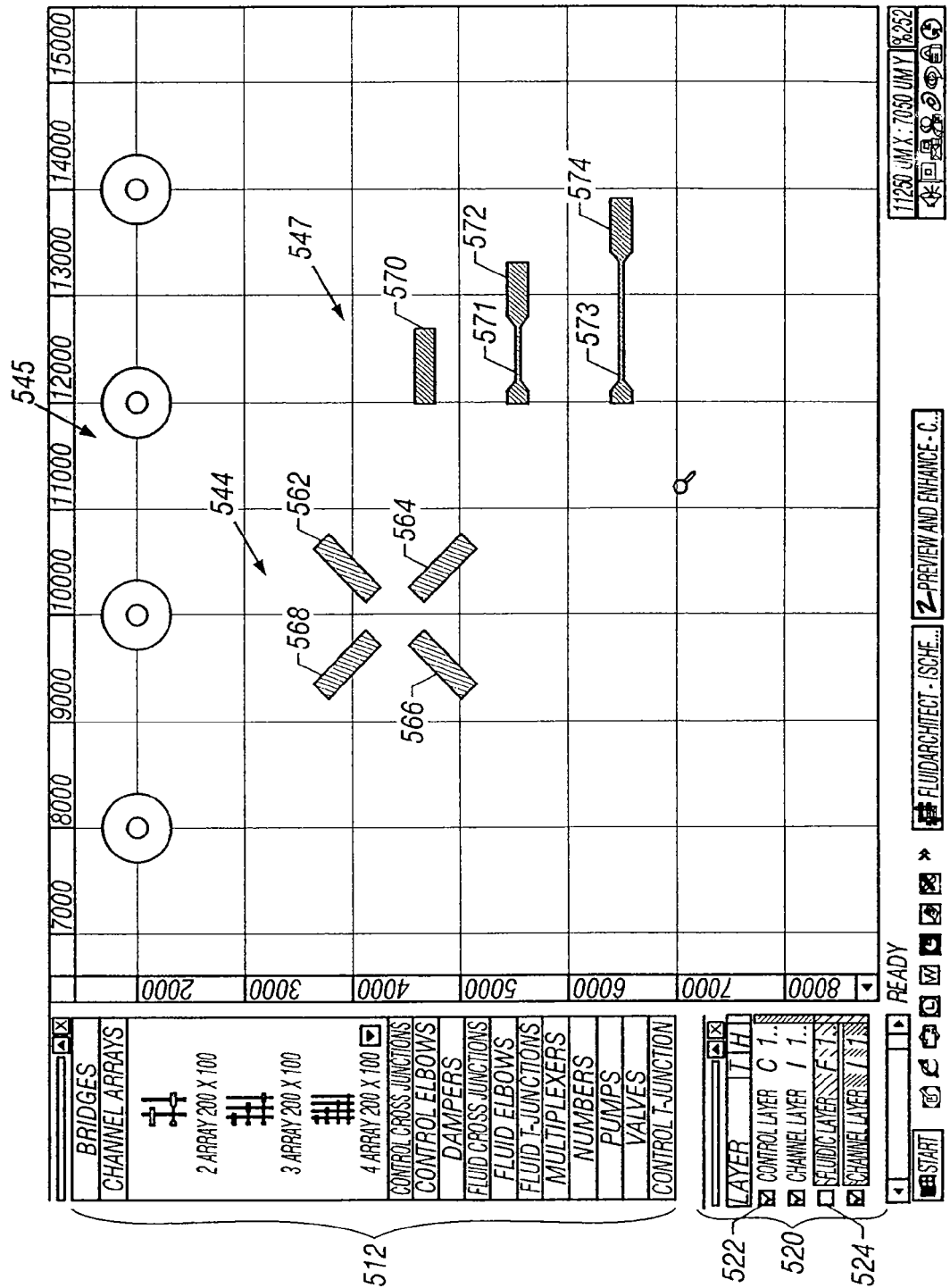
FIG. 22 shows the control channels on the control layer for the two components of FIG. 21.

FIG. 22 shows the control channels on the control layer for the two components of FIG. 21. In the layer area 520 the fluidic layer 524 is not selected and the control layer 522 is selected. This allows only the channels on the control layer to be viewed on the active drawing area 530. For the rotary pump 544 the control channels are 562, 564, 566, and 568. For the channel array 547 the three control channels are 570, 572, and 574. Channels 572 and 574 have narrow channel regions 571 and 573, so that the fluid channel 582 in the case of control channel 572 and the fluid channels 582 and 584 in the case of control channel 574 are not shut when control channel 572 or 574 is activated.

FIG. 23 shows the fluid channels for the fluid layer for the two components of FIG. 21. In the layer area 520 the fluidic layer 524 is selected and the control layer 522 is not selected. This allows only the channels on the fluid layer to be viewed on the active drawing area 530. For the rotary pump 544 there is one fluid channel 580 with two I/O ports 576 and 577. For the channel array 547 there are three fluid channels 582, 584, and 586.

Figure 24:
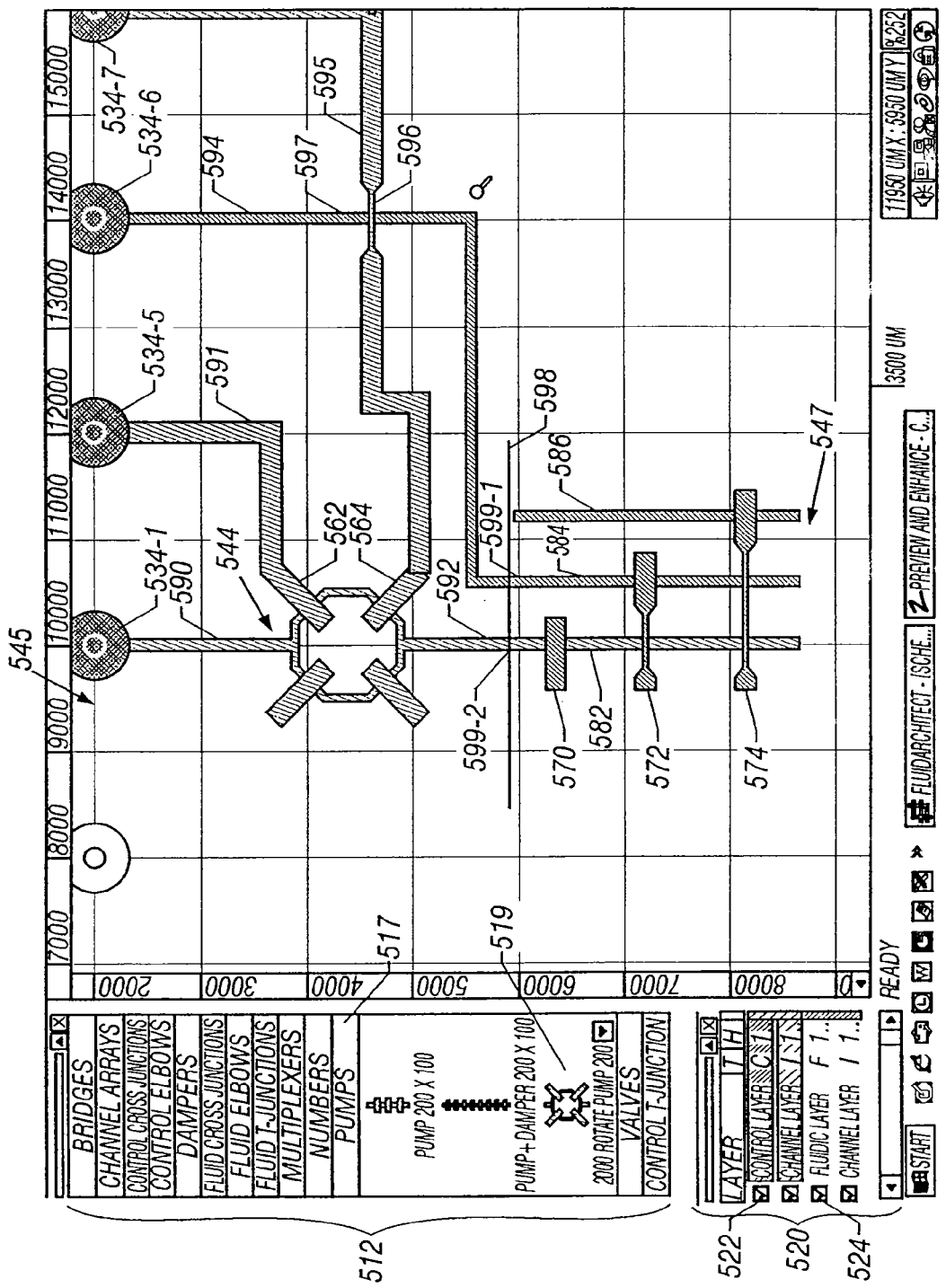
FIG. 24 shows a partially connected layout of a microfluidic circuit having a rotary pump and a channel array of an embodiment of the present invention.

FIG. 24 shows a partially connected layout of a microfluidic circuit having a rotary pump 544 and a channel array 547 according to an embodiment of the present invention. In the layer area 520 both the control layer 522 and the fluidic layer 524 have been selected. Hence both control and fluid channels are displayed on expanded template area 545. I/O port 534-1 is connected to the array pump 544 via fluid channel 590. Rotary pump 544 is connected to channel array 547 via the fluid channel 592. Channel array 547 also receives input from I/O port 534-6 via fluid channel 594. Control channels for rotary pump 544 include control channel 591 from I/O port 534-5 and control channel 595 from I/O port 534-7. Control channel 595 is tapered to a narrow channel 596 to bridge fluid channel 594 (interconnect bridge of FIG. 17B). Fluid channel 594 may also be tapered to a narrow fluid channel 597 to further insure that control channel 595 does not shut off fluid channel 594 when control channel 595 is activated.

In one embodiment, if a user tries to draw a control channel 598 as shown in FIG. 24, a design rule check gives an error that valves are formed at the overlap points 599-1 and 599-2. The user is not allowed to add control channel 598 to expanded template area 545. In another embodiment interconnect bridges would automatically be formed at overlap points 599-1 and 599-2.

Figure 25:
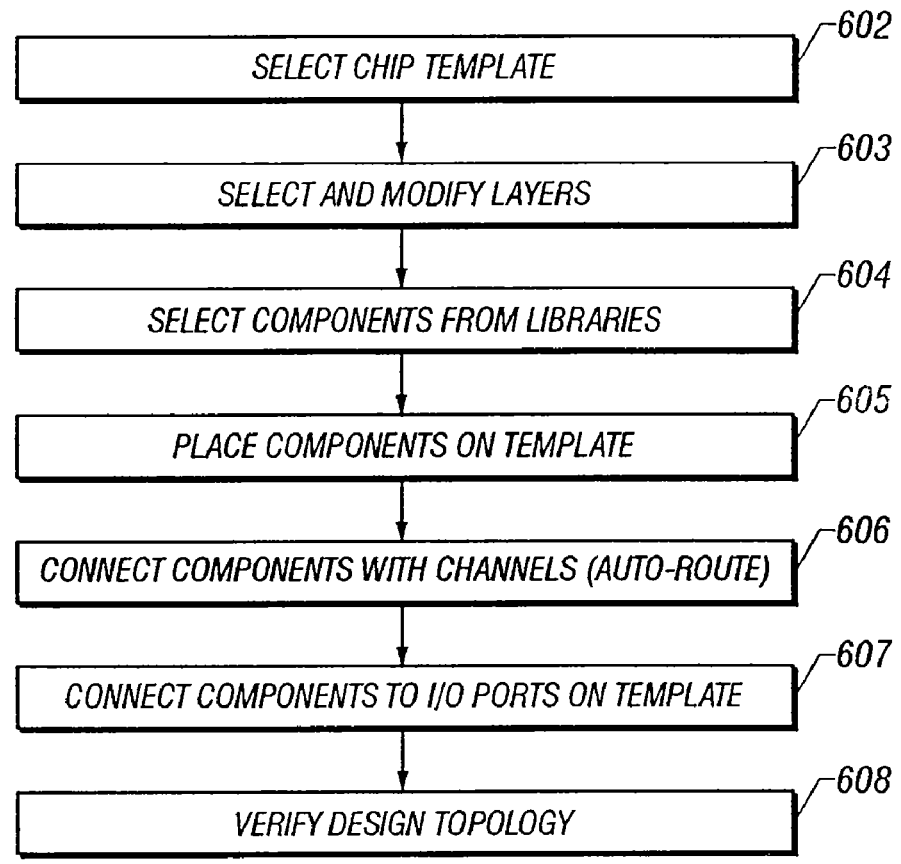
FIG. 25 shows a simplified flowchart having the steps involved in the physical layout of a microfluidic circuit of an embodiment of the present invention.

FIG. 25 shows a flow chart having the steps involved in the physical layout of a microfluidic circuit according to an embodiment of the present invention. At step 602 a chip template is selected from, for example, a plurality of templates such as those shown in FIGS. 16A and 16B. The layers, including the control and fluid layers, are selected and modified (step 603). At step 604 components are selected from the component library area 512 (FIG. 19). At step 605 these components are placed on the template. The placed components are connected (step 606), either manually or via an auto-route routine by channels. For example, the components' control channels are first connected together on the control layer using control channels. Next the components' fluid channels are connected together on the fluid layer using fluid channels. At step 607 some of the components are connected to the I/O ports on the template. At step 608, the design topology of the microfluidic circuit may be manually or automatically verified.

In one embodiment the control channels are not connected to the fluid channels. In another embodiment, although the control channels may be on different layers than the fluid channels, they may be connected to the fluid channels by vias.

Figure 26:
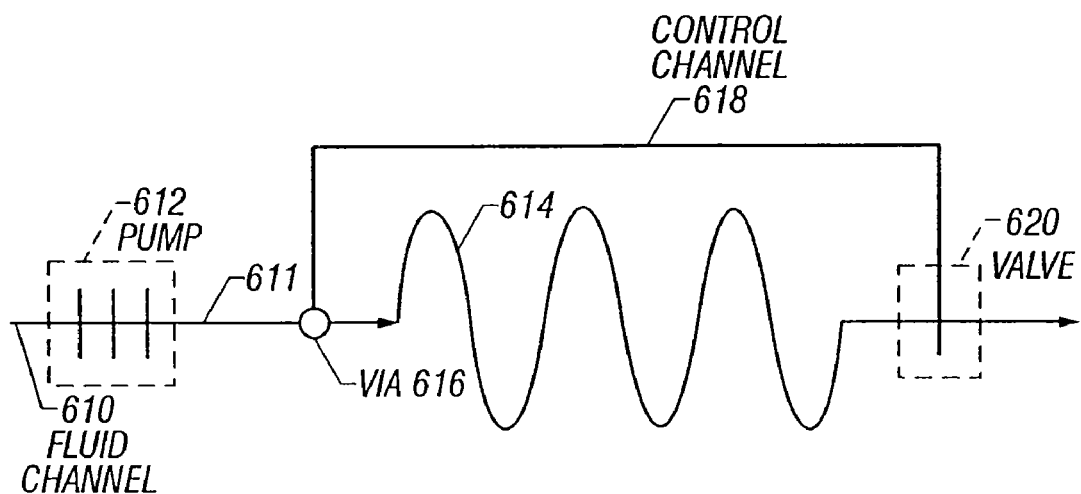
FIG. 26 shows a simplified view of a pressure oscillator structure of one embodiment of the present invention.

FIG. 26 shows a pressure oscillator structure of one embodiment of the present invention. The pressure oscillator operates analogously to oscillator circuits frequently employed in the field of electronics. The pressure oscillator includes a fluid channel 610 which has an initial portion 611 proximate to a pressure source 612, and a serpentine portion 614 distal from pressure source 612. Initial portion 611 is in fluid communication, through via 616, with control channel 618 formed above the level of fluid channel 610. At a location more distal from pressure source 612 than via 616, control channel 618 overlaps, but is separated from, fluid channel 610, thereby forming a valve 620.

The pressure oscillator structure operates as follows. Initially, pressure source 612 provides pressure along fluid channel 611 and control channel 618 through via 616. Because of the serpentine shape of flow channel 614, pressure is lower in region 614 as compared with control channel 618. At valve 620, the pressure difference between serpentine flow channel portion 614 and overlying control channel 618 eventually causes valve 620 to close. Owing to the continued operation of pressure source 612, however, pressure begins to build up in serpentine flow channel portion 614 behind closed valve 620. Eventually the pressure equalizes between control channel 618 and serpentine flow channel portion 614, and valve 620 opens. Given the continuous operation of the pressure source 612, the above-described build up and release of pressure will continue indefinitely, resulting in a regular oscillation of pressure. Such a pressure oscillation device may perform any number of possible functions, including but not limited to, timing.

Figure 27:
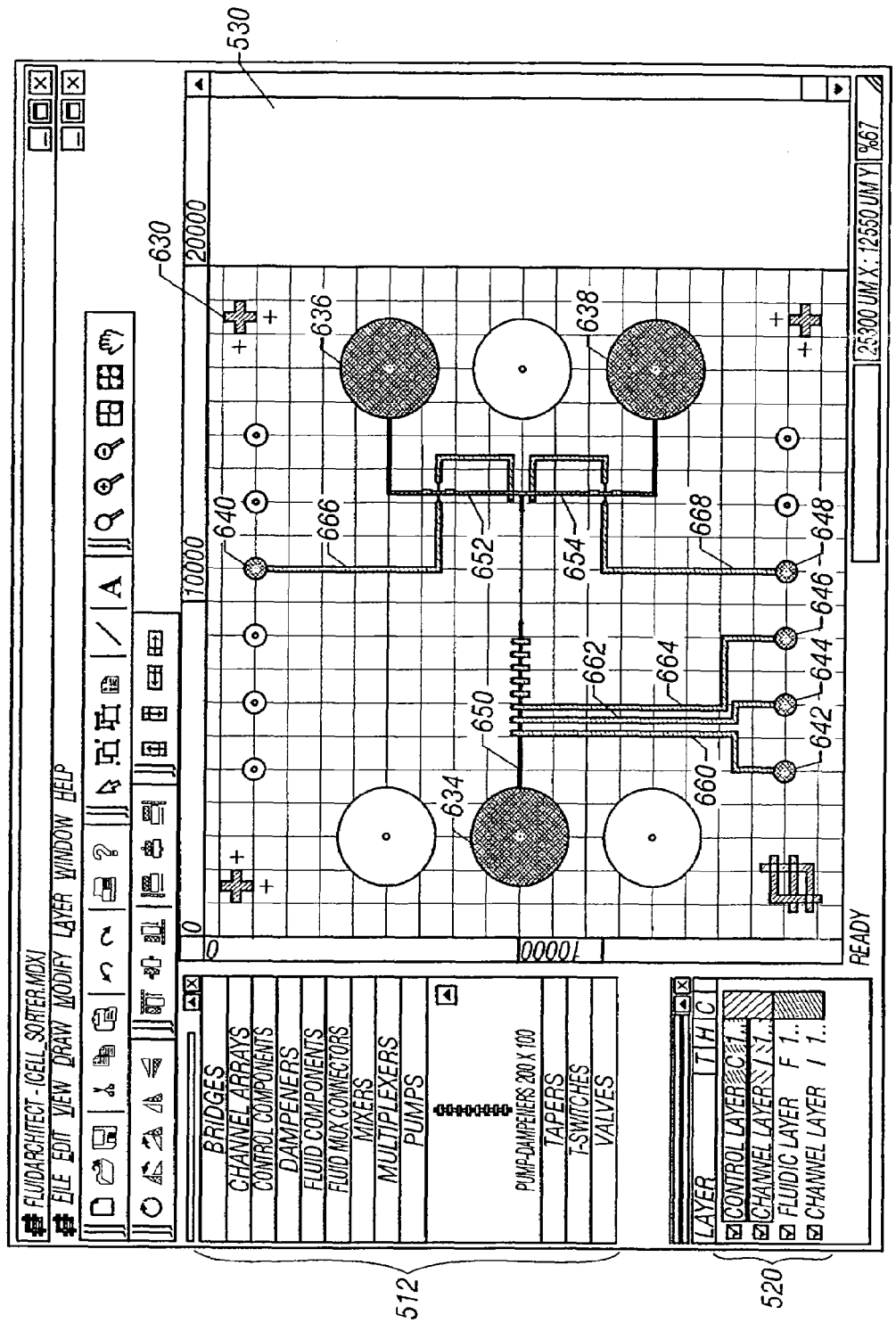
FIG. 27 shows a physical layout of a cell sorter of an embodiment of the present invention.
Figure 28A:
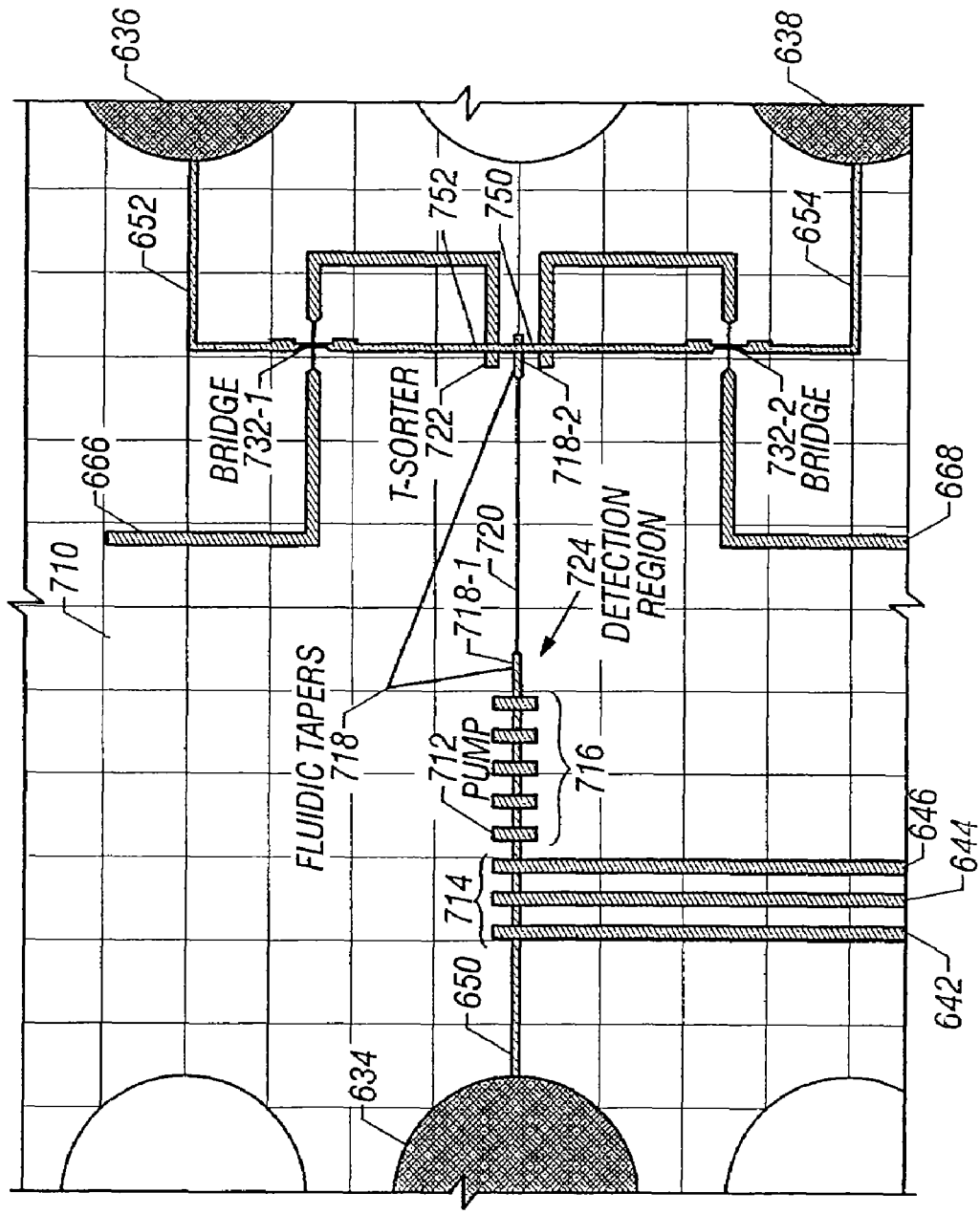
FIG. 28 shows an expanded view of the physical layout of the cell sorter of an embodiment of the present invention.
Figure 28B:
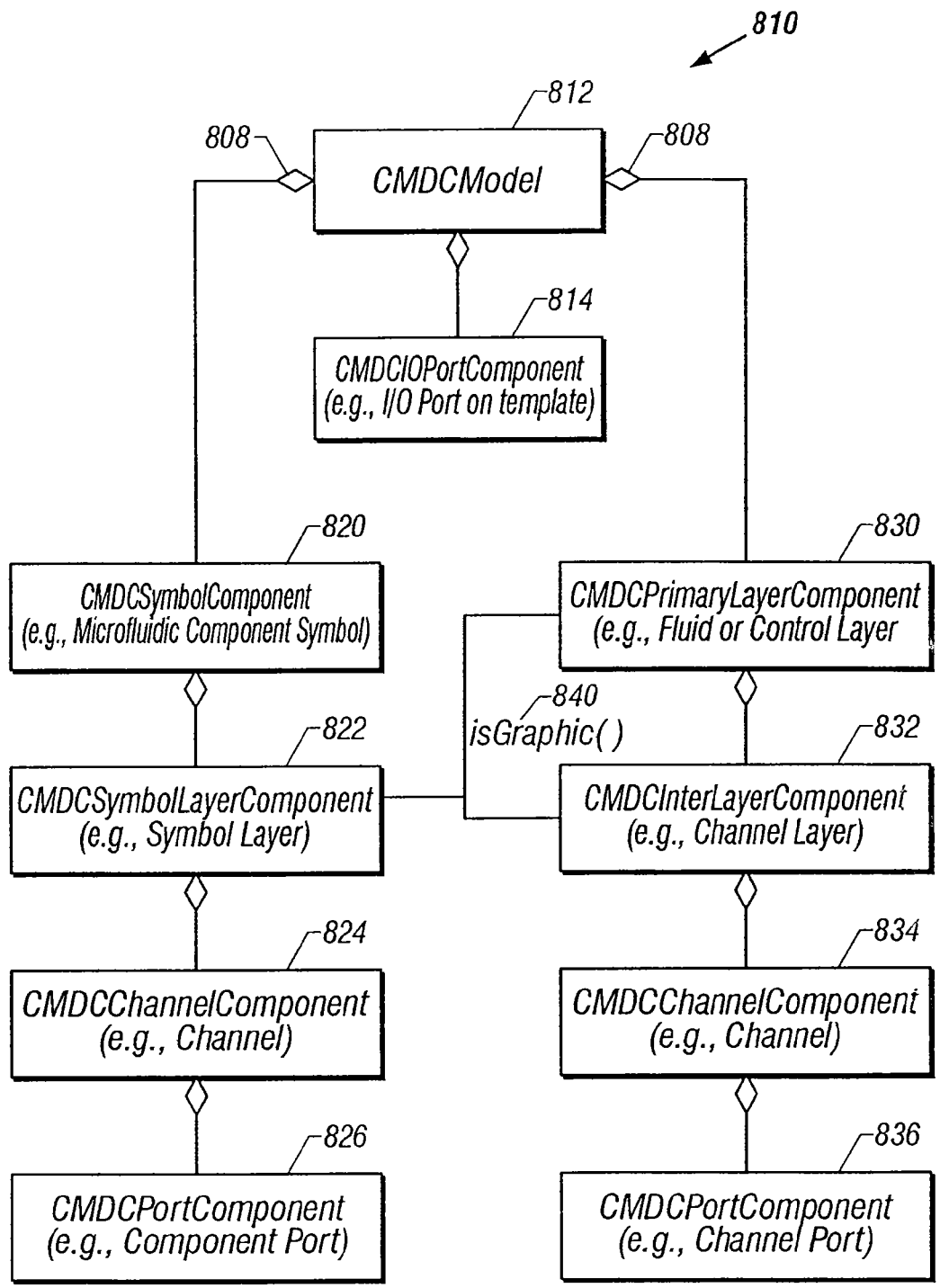

An illustration of an application developed using the physical layout tool of FIG. 19 and the steps of FIG. 25 is a cell sorter shown in FIGS. 27 and 28.

FIG. 27 shows a physical layout of a cell sorter of an embodiment of the present invention. The template 630 is located in active drawing area 530 and has one fluid input port 634, two fluid output ports 636 and 638, and five control input ports 642, 644, 646, 648, and 640. Fluid input port 634 is connected to fluid channel 650. Fluid channel 650 forks to fluid channel 652 and fluid channel 654. Fluid channel 652 is connected to output port 636 and fluid channel 654 is connected to output port 638. Input control port 642 is connected to control channel 660. Input control port 644 is connected to control channel 662. Input control port 646 is connected to control channel 664. Input control port 648 is connected to control channel 668. Input control port 640 is connected to control channel 666.

FIG. 28 shows an expanded view 710 of the physical layout of the cell sorter of an embodiment of the present invention. A pump 712 includes a peristaltic pump 714 and a damper element 716. The pump 712 includes a peristaltic pump 714 which is composed of three individual valves with control channels 642, 644, and 646. The liquid within the fluid channel 650 is pumped by sequentially actuating the individual valves. The damper element 716 is used to provide a smoother flow of pumped fluid. The membrane of the damper element 716 will deflect and absorb the energy caused by the closing of the valves of the peristaltic pump 714. The fluid from fluid input port 634 is pressurized by pump 712 and enters, via a fluidic taper 718-1, a narrow channel 720 which is a detection region 724. The narrow channel 720 is connected to a T-sorter 722 by another fluidic taper 718-2. The fluid in the T-sorter 722 either proceeds to the fluid output port 636 or the fluid output port 638, depending on whether control channel 666 or control channel 668 is activated.

The microfluidic circuit of FIGS. 27 and 28 is laid out according to the steps given in FIG. 25 as follows. First a template 630 is selected (step 602) and placed in drawing area 530. The template has six large I/O ports (e.g., I/O ports 634, 636, and 638 of 3 mm in size) and 12 small I/O ports (e.g., I/O ports 640, 642, 644, 646, and 648 of 625 μm in size). Next at step 603 the layers are selected in layer area 520. From the component library area 512 (FIG. 19), one pump 712, one T-sorter 722, two fluidic tapers 718, and two interconnect bridges 732-1 and 732-2, are dragged and dropped on the template 630 as shown in FIG. 28 (steps 604 and 605). Step 606 has two parts, and involves first connecting the fluid channels of the components by drawing fluid channels on the fluid layer, and second connecting the control channels of the components on the control layer (in this case the connections are only to the template's I/O ports). When the fluid layer is selected, the pump 712 is connected to a first fluid taper 718-1, and via a narrow channel 720 to a second fluid taper 718-2 (see FIG. 28). The narrow fluid channel is created by drawing a normal fluid channel with default width of, for example 100 μm, and then selecting a new channel width of, for example, 30 μm. The second fluid taper 718-2 is connected to the T-sorter 722. At step 607 the T-sorter's fluid channels are connected to I/O ports 636 and 638 on the fluid layer using fluid channels 652 and 654. The control channels of the pump 712 and T-sorter 722 are connected to the I/O ports, 642, 644, 646, 640, and 648, using control channels, 660, 662, 664, 666, and 668, drawn on the control layer. In the case of the T-sorter 722, interconnect bridges 732-1 and 732-2 are used, so that control channels 666 and 668 can bridge the fluid channels 652 and 654 without creating parasitic valves. At step 608 the microfluidic circuit on template 630 is checked for errors. For example a DRC may be done. In an alternative embodiment of the present invention, after the components have been placed on the template 630 (step 605), an auto-routing routine may connect the components with channels (step 606). In another embodiment the design rule checks may be done interactively as each entry in active drawing area 530 is made.

The operation of the sorting device in accordance with one embodiment of the present invention is as follows. The sample is diluted to a level such that only a single sortable entity would be expected to be present in the narrow channel 720 at any time. Assume, for the sake of illustration, that the sortable entity is either size A or size B and that size A entities are collected at fluid output port 636 and size B entities are collected at fluid output port 638. Pump 712 (three control valves and five damping elements) is activated by flowing a fluid through control channels 642, 644, and 646 as described above. The sortable entity enters via input port 634 and moves via fluid channel 650. The sortable entity is pushed by the pump 712 into the narrow channel 722. The narrow channel width is selected such that the sortable entities can move only in a single file manner through this channel. Hence if there happen to be two sortable entities in the narrow channel 722, one must follow the other. The narrow channel 722 serves as a detection region 724, where an external detection system, such as an optical measurement system, is used to determine if the detected sortable entity is size A or size B. The bridge components 732-1 and 732-2 are used to allow crossing of the fluid lines by the control lines without creating a parasitic valve. The bridge components are also used to create an area clear of channels for the detection region 724. If the sortable entity is size A then control channel 668 is activated and control line 666 is deactivated. This turns on the valve 750 and turns off valve 752. Hence the size A entity flows to fluid output port 636. If the sortable entity is size B then control channel 666 is activated and control line 668 is deactivated. This turns on the valve 752 and turns off valve 750. Hence the size B entity flows to fluid output port 638.

Sorting in accordance with the above embodiment would avoid the disadvantages of sorting utilizing conventional electrokinetic flow, such as bubble formation, a strong dependence of flow magnitude and direction on the composition of the solution and surface chemistry effects, a differential mobility of different chemical species, and/or decreased viability of living organisms in the mobile medium. For more detailed discussions of cell sorting by microfabricated devices, see A. Y. Fu et al, "A Microfabricated Fluorescence-Activated Cell Sorter," Nature Biotechnology 17: 1109-1111 (1999); H. P. Chou et al., "A Microfabricated Device for Sizing and Sorting DNA Molecules," Proc. Nat'l Acad. Sci. 96: 11-13 (1999); S. Quake et al., "Disposable Microdevices for DNA Analysis and Cell Sorting," Proc. Solid-State Sensor and Actuator Workshop," Hilton Head, S.C., Jun. 8-11, 1998, pp. 11-14; and H. P. Chou et al., "Microfabricated Devices for Sizing DNA and Sorting Cells, Micro- and Nanofabricated Structures and Devices for Biomedical Environmental Applications," Paul L. Gourley, Editor, Proceedings of SPIE Vol. 3258, 181-7 (1998).

Further details on the physical layout tool is given by the User's Manual in Appendix C, which is herein incorporated by reference.

Physical Analysis (Phase 5)

Once the design has been completed, placed, and routed, a simulation indicating the dynamic performance can be performed under physical analysis 800 (phase 5). As shown in FIG. 1, dynamic simulation models 810 of the components are based on the physical attributes as well as the chosen material properties for the layer in which the component is placed, as provided in the mechanical properties library 820. Fluid characteristics are also taken into account as well as the control signal's actual actuation pressures. The physical analysis 800 in the MCAD system 10 includes one or more of the following: dynamic volumetric flow rates, volumetric capacitances of components, volumetric capacitances of interconnect/routing channels, parasitic layout extraction 830 and/or parasitic components.

In one embodiment the dynamic fluidic flow simulation 840 is performed using ANSYS/Multiphysics (coupled field structural-fluid) and ANSYS/FLOTRAN™ (computational fluid dynamics) tools of ANSYS Inc. of Canonsburg, Pa. (www.ansys.com/products/html/multiphysics.htm and (www.ansys.com/products/flotran.htm). The ANSYS tools can perform laminar flow simulations and coupled physics simulations, such as dynamic fluidic and mechanical simulations, for microfluidic systems. Using this tool, dynamic simulation models 810 are first developed, taking into account the mechanical/structural properties of the model's associated component (mechanical properties library 820). Next using the dynamic simulation models 810 as connected and laid out in the physical layout 410, a dynamic fluidic flow simulation circuit model for the microfluidic circuit of the physical layout 410 is developed. Parasitic or coupling effects between different channels, which are typically second order effects, optionally, may be incorporated into the dynamic fluidic flow simulation circuit model. The ANSYS/Mutiphysics tool is then used to simulate the dynamic fluidic flow simulation circuit model using a variety of test inputs. Both the final outputs and intermediate test points of the circuit model are analyzed to determine if the proper results are achieved. If not, then the physical layout 410 is modified and the associated modified dynamic fluidic flow simulation circuit model is again simulated. This iterative design process is continued until the desired results are achieved.

In another embodiment the dynamic fluidic flow simulation 840 may employ the DCCL 380 used in the functional analysis 360 as shown in FIG. 14.

Device Implementation (Phase 6)

Once the design has been placed and routed, the physical layout 410 of phase 4 will write out the desired chip layout files 902 to manufacture a prototype 904 of the microfluidic circuit as seen in FIG. 1. The DWG/DXF files written from the physical layout 902 can be converted to a manufacturing format, for example, Gerber, HPGL, EPS, DXF, GDS II, or Postscript, for use in device implementation 900. The layout files are then used for mask layout generation of a chip or die. Several masks are then used in step 904 to set up a wafer for manufacturing.

Figure 29:
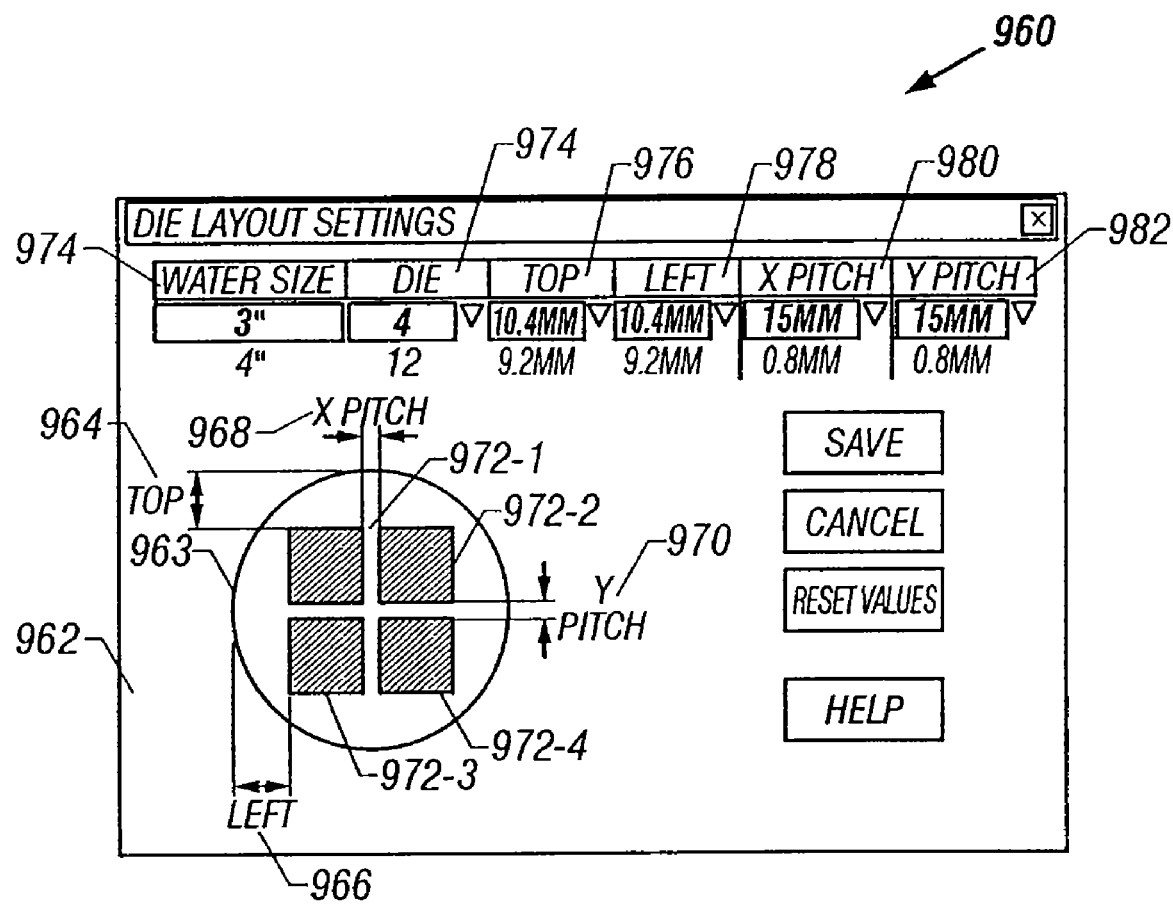
FIG. 29 shows a display for setting up the die layout on a wafer of an embodiment of the present invention.

FIG. 29 shows a display for setting up the die layout on a wafer of an embodiment of the present invention. The die layout settings window 960 has a screen 962 which displays the die layout on a wafer 963. The screen 962 includes, a top displacement 964 from the edge of the wafer 963, a left displacement 966 from the wafer edge, an X pitch 968, a Y pitch 970 and dies, 972-1, 972-2, 972-3, and 972-4. Each die may include a microfluidic circuit such as that shown in FIG. 27. The window 960 also has a table which indicates setting values, including: wafer size 974 (e.g., 3 or 4 inches), number of dies per wafer 974 (e.g., 4 or 12), top displacement 976 (e.g., 10.4 mm or 9.2 mm), left displacement 978 (e.g., 10.4 mm or 9.2 mm), an X pitch 980 (e.g., 15 mm or 0.8 mm), and a Y pitch 982 (e.g., 15 mm or 0.8 mm).

The wafer is then manufactured (step 904) and the resulting microfluidic device is ready for either one-time use (disposable) or for continuous reuse (semi-permanent test device).

The MCAD system 10 can be implemented and executed in a variety of ways. For instance, it can be implemented as a computer-aided design (CAD) program for design, analysis, and implementation of the elastomeric circuits or networks. The CAD program can be provided separately to individual users or distributed over networks such as the Internet so that it can be centrally maintained and controlled.

Although the above functionality has generally been described in terms of specific hardware and software, it Would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

What is claimed is:

1. A method for validating a physical layout of a microfluidic circuit design comprising a plurality of microfluidic components, said method comprising:
    providing said plurality of microfluidic components on a template to form said physical layout of said microfluidic circuit design;
    extracting a netlist information from said physical layout;
    connecting said plurality of microfluidic components automatically; and
    physically simulating said physical layout by using a dynamic simulation model for each component of said plurality of microfluidic components on said template and said netlist information, wherein physically simulating said physical layout comprises simulating actuation of dynamic fluid flow in the components using control signals generated by a Boolean based language.

2. The method of claim 1 wherein physically simulating said physical layout uses a commercially available computer software with a capability to perform laminar computational fluidic dynamic and coupled physics simulations.

3. The method of claim 1 wherein physically simulating said physical layout comprises at least one of analyzing dynamic volumetric flow rates in the components, analyzing component volumes, and analyzing volumetric capacitances of interconnecting and routing channels in the physical layout.

4. The method of claim 1 further comprising modifying the physical layout based on results of the physical simulation.

5. The method of claim 1 further comprising modifying the design based on results of the physical simulation.

6. The method of claim 1 further comprising writing the physical layout to a layout file to be used for manufacturing.

7. The method of claim 6 wherein said layout file is in a format selected from the group consisting of Gerber, Postscript, EPS, DXF, GDS II, and HPGL (Hewlett-Packard Graphics Language).

8. A method for device implementation of a microfluidic circuit comprising a plurality of microfluidic components, said method comprising:
    providing said plurality of microfluidic components on a template to form a physical layout of said microfluidic circuit design;
    connecting said plurality of microfluidic components automatically, wherein the microfluidic components have associated VHDL-AMS or Verilog-AMS models;
    writing said physical layout to a layout file to be used for manufacturing;
    selecting a pattern for a die to be repetitively laid out on a wafer, said die comprising said physical layout; and
    automatically laying out said pattern on said wafer by using said layout file.

9. The method of claim 8 wherein said layout file is in a format selected from the group consisting of Gerber, Postscript, EPS, DXF, GDS II, and HPGL (Hewlett-Packard Graphics Language).

10. A microfluidic circuit design method comprising:
    developing synthesizable computer code for a design;
    generating a microfluidic circuit schematic, comprising a plurality of symbols for microfluidic components, using said synthesizable computer code;
    functionally simulating said microfluidic circuit schematic;
    placing and routing on a template said microfluidic components to form a physical layout;
    connecting said plurality of microfluidic components automatically, wherein the microfluidic components have associated VHDL-AMS or Verilog-AMS models;
    physically simulating said physical layout using dynamic simulation models of said microfluidic components; and
    writing to a layout file said physical layout.

11. The microfluidic circuit design method of claim 10 further comprising laying out a die comprising said design on a wafer by using a mask of said layout file.

12. The method of claim 10 wherein the microfluidic components are selected from the group consisting of channels, pumps, valves, chambers, oscillators, and layer interconnects.

13. The method of claim 10 wherein the microfluidic components are selected from normalized, custom, pre-defined, and user-defined components.

14. The method of claim 10 wherein the microfluidic components are routed according to preset design rules.

15. The method of claim 10 wherein the microfluidic components are assigned physical properties.

16. The method of claim 10 wherein the microfluidic components are active fluidic components.

17. A microfluidic circuit design system comprising:
    a synthesis module for synthesizing software of a design into a schematic having a plurality of connected symbols of microfluidic components;
    a design capture module for displaying said schematic;
    a functional analysis module for functionally simulating selected microfluidic components of the schematic;
    a physical implementation module for placing and routing said microfluidic components into a physical layout according to said design;
    a physical layout module including an auto-routing module for connecting said microfluidic components automatically; and
    a physical analysis module for physically simulating the components in the physical layout, wherein physically simulating said physical layout comprises simulating actuation of dynamic fluid flow in the components using control signals generated by a Boolean based language.

18. The system of claim 17 wherein the modules comprise instructions stored in a computer-readable medium.

19. A system for physically laying out a microfluidic circuit having a plurality of microfluidic components, comprising:
    a library module comprising information associated with said plurality of microfluidic components;
    a design rule checking module having a plurality of layout rules, wherein said design rule checking module is configured to perform at least one check on I/O placement, channel size mismatch, and dangling channels; and
    a physical layout module for placing and routing said plurality of microfluidic components on a template using said information and said plurality of layout rules, wherein said physical layout module includes an auto-routing module for connecting said plurality of microfluidic components automatically.

20. The method of claim 19 wherein said plurality of microfluidic components include channels, pumps, valves, chambers, and layer interconnects.

21. A system for analyzing a micro fluidic circuit having a plurality of microfluidic components, comprising:
   a physical layout comprising said plurality of microfluidic components, after placement and routing on a template;
   an auto-routing module for connecting said plurality of microfluidic components automatically;
   a model library comprising dynamic simulation models for said plurality of microfluidic components, wherein the microfluidic components have associated VHDL-AMS or Verilog-AMS models; and
   a dynamic microfluidic simulator for simulating said physical layout using said dynamic simulation models.

22. A computer program product stored in a computer readable medium for validating a physical layout of a microfluidic circuit design comprising a plurality of microfluidic components, said computer program product comprising:
   code for providing said plurality of microfluidic components on a template to form said physical layout of said micro fluidic circuit design;
   code for connecting said plurality of microfluidic components automatically;
   code for extracting a netlist information from said physical layout; and
   using a dynamic simulation model for each component of said plurality of microfluidic components on said template and said netlist information, code for physically simulating said physical layout, wherein physically simulating said physical layout comprises simulating actuation of dynamic fluid flow in the components using control signals generated by a Boolean based language.

23. A computer program product stored in a computer readable medium for device implementation of a microfluidic circuit comprising a plurality of microfluidic components, said computer program product comprising:
   code for providing said plurality of microfluidic components on a template to form a physical layout of said microfluidic circuit design;
   code for connecting said plurality of microfluidic components automatically, wherein the microfluidic components have associated VHDL-AMS or Verilog-AMS models;
   code for writing said physical layout to a layout file to be used for manufacturing;
   code for selecting a pattern for a die to be repetitively laid out on a wafer, said die comprising said physical layout; and
   code for automatically laying out said pattern on said wafer by using said layout file.

* * * * *